United States Patent
Kido et al.

(10) Patent No.: US 7,978,240 B2
(45) Date of Patent: Jul. 12, 2011

(54) ENHANCING IMAGE QUALITY IMAGING UNIT AND IMAGE SENSOR

(75) Inventors: Toshihito Kido, Matsubara (JP); Jun Minakuti, Sakai (JP); Haruki Nakayama, Suita (JP); Dai Shintani, Izumi (JP); Tsutomu Honda, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 1044 days.

(21) Appl. No.: 11/541,835

(22) Filed: Oct. 2, 2006

(65) Prior Publication Data

US 2007/0076269 A1    Apr. 5, 2007

(30) Foreign Application Priority Data

Oct. 3, 2005  (JP) ................................ 2005-289834
Dec. 15, 2005 (JP) ................................ 2005-362383
Feb. 6, 2006  (JP) ................................ 2006-028169

(51) Int. Cl.
  *H04N 3/14*    (2006.01)
  *H04N 5/335*   (2006.01)
  *H04N 9/04*    (2006.01)
  *H04N 9/83*    (2006.01)

(52) U.S. Cl. ..................................... 348/276; 348/228.1

(58) Field of Classification Search .......... 348/272–280, 348/228.1
See application file for complete search history.

(56) References Cited

U.S. PATENT DOCUMENTS

| | | | |
|---|---|---|---|
| 6,847,397 B1 * | 1/2005 | Osada | 348/273 |
| 7,307,657 B2 * | 12/2007 | Miyahara | 348/228.1 |
| 2006/0017829 A1 * | 1/2006 | Gallagher | 348/276 |

FOREIGN PATENT DOCUMENTS

| | | |
|---|---|---|
| JP | SHO62-141284 U | 9/1987 |
| JP | 3-13192 A | 1/1991 |
| JP | 2000-253412 A | 9/2000 |
| JP | 2003-60992 A | 2/2003 |
| JP | 2003-318375 A | 11/2003 |

OTHER PUBLICATIONS

Japanese Notice of Reasons for Rejection dated Oct. 26, 2010, for counterpart Japanese Application No. 2005-362383, together with an English translation thereof.

* cited by examiner

*Primary Examiner* — Gevell Selby
(74) *Attorney, Agent, or Firm* — Sidley Austin LLP

(57) ABSTRACT

There is provided an imaging unit: including an image sensor with a number of pixels arranged in a matrix, the pixels having color pixels where color filters are disposed, and white pixels where the color filters are not disposed; a sampling circuit section for sampling pixel signals generated in the image sensor; and a main controller for controlling the image sensor and/or the sampling circuit section to sample the pixel signals generated in the white pixels or the pixel signals generated in the color pixels sequentially in a time-series manner.

3 Claims, 42 Drawing Sheets

FIG.8A
PIXEL SIGNALS TO BE OUTPUTTED FROM IMAGE SENSOR

| 1 | G₁ | 2 | R₁ | 3 | G₂ | 4 | R₂ | 5 | G₃ | 6 | R₃ | 7 | G₄ | 8 | R₄ | 9 | 10 | 11 | 12 | 13 | 14 | 15 | 16 | 17 | 18 | 19 | 20 | ... |

FIG.8B
PIXEL SIGNALS TO BE SAMPLED BY FIRST SAMPLING CIRCUIT

| 1 | 2 | 3 | 4 | 5 | 6 | 7 | 8 | 9 | 11 | 13 | 15 | 17 | 19 | ... |

FIG.8C
PIXEL SIGNALS TO BE SAMPLED BY SECOND SAMPLING CIRCUIT

| G₁ | R₁ | G₂ | R₂ | G₃ | R₃ | G₄ | R₄ | 10 | 12 | 14 | 16 | 18 | 20 | ... |

⎧⎨⎩ 8 PIXELS   ⎧⎨⎩ 8 PIXELS

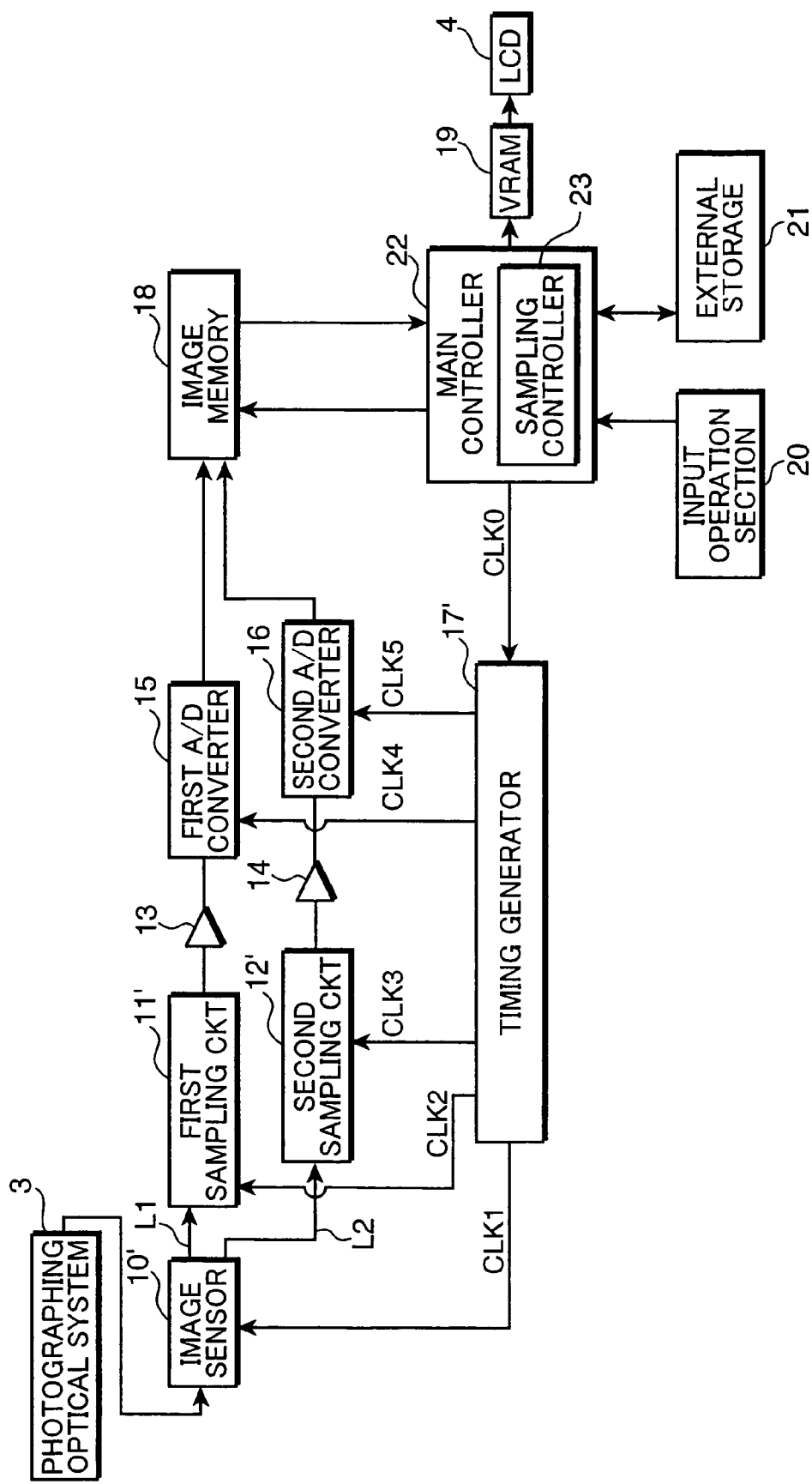

FIG.11A PIXEL SIGNALS TO BE SAMPLED BY FIRST SAMPLING CIRCUIT
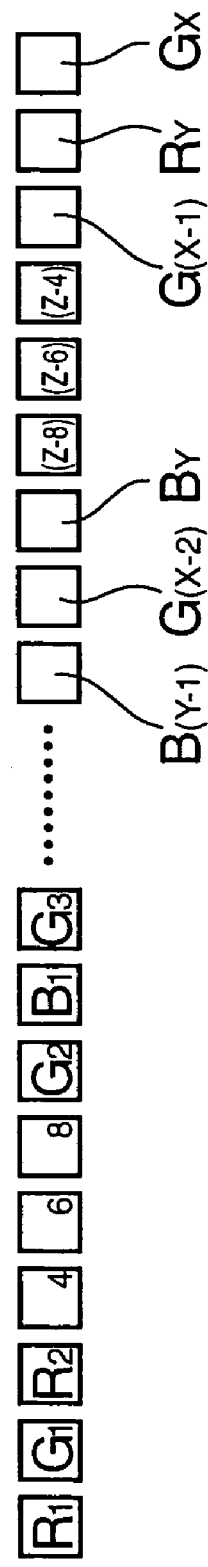
FIG.11B PIXEL SIGNALS TO BE SAMPLED BY SECOND SAMPLING CIRCUIT
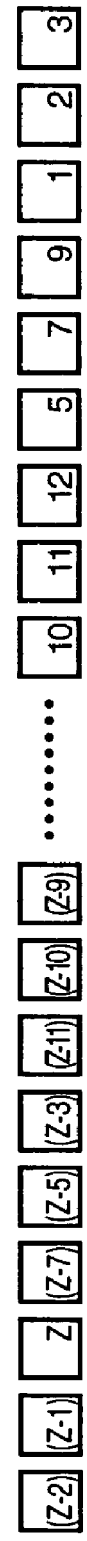

[UNIT: μm]

[UNIT: μm]

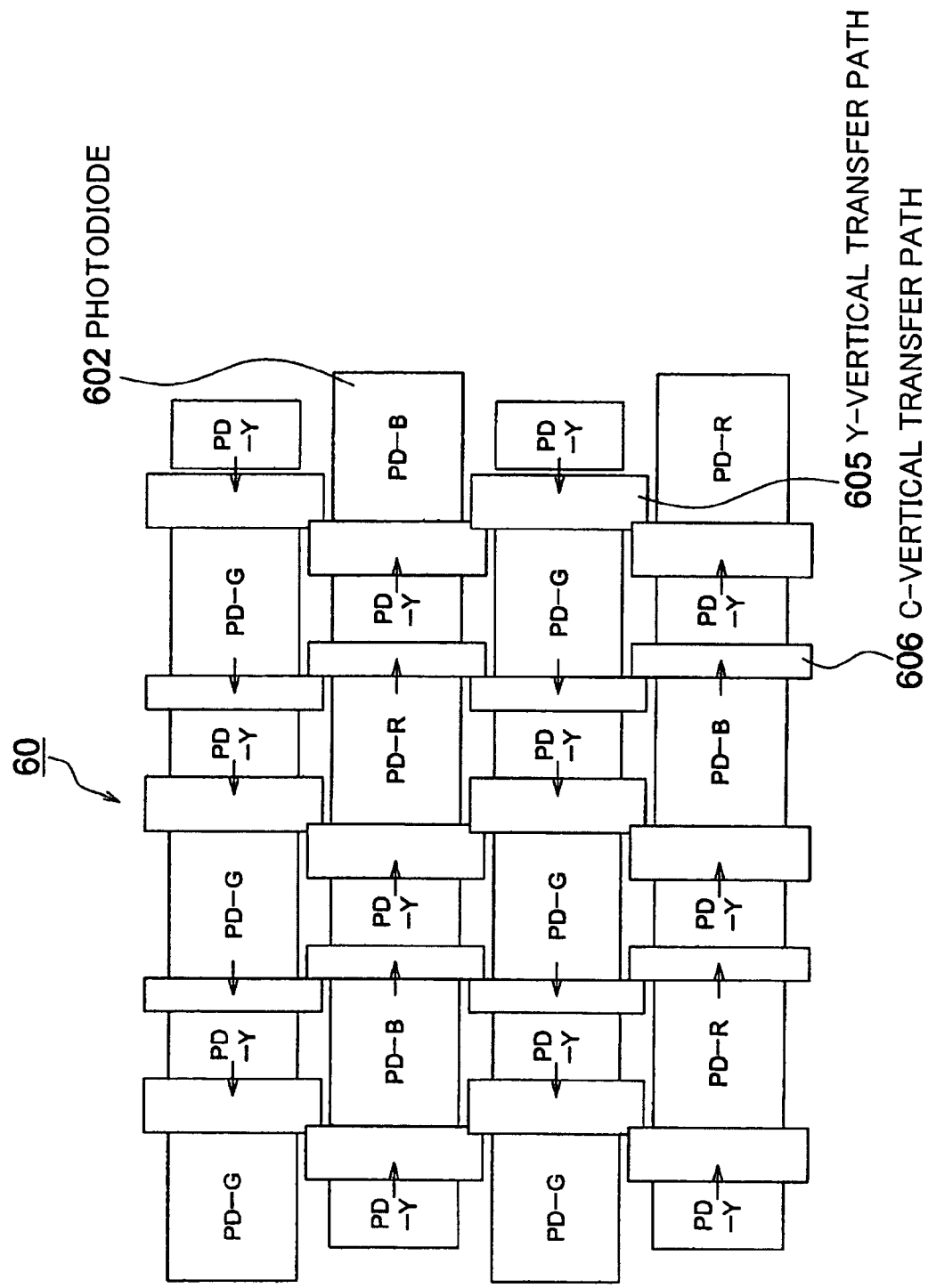

ENHANCING IMAGE QUALITY IMAGING UNIT AND IMAGE SENSOR

This application is based on Japanese Patent Application No. 2005-289834, No. 2005-362383, and No. 2006-28169 filed on Oct. 3, 2005, Dec. 15, 2005, and Feb. 6, 2006, respectively, the contents of which are hereby incorporated by reference.

BACKGROUND OF THE INVENTION

1. Field of the Invention

The present invention relates to an imaging unit and an image sensor capable of enhancing image quality.

2. Description of the Related Art

In recent years, as multi-functional, high-quality, and compact image sensing apparatuses such as digital cameras and digital video cameras have been developed, high-resolution and super-fine performances are required for image sensors used in the image sensing apparatuses. Thus, a demand for high-pixel and high-density image sensors has been increasing.

A high pixel density image sensor has a drawback that the photoelectric conversion amount per pixel is decreased as the area of one pixel is decreased. As a result, the sensitivity is lowered, and the signal level of a pixel output is lowered, which lowers an S/N ratio (signal-to-noise ratio). The lowered S/N ratio greatly affects image reproducibility and image quality. Accordingly, it is required to enhance the sensitivity in order to realize high-quality image formation. Various approaches have been proposed to enhance the sensitivity in the technical field of image sensors.

In a solid-state image sensor provided with photodiodes arranged in a two dimensional matrix, there is proposed a method for enhancing luminance resolution without an influence of color information concerning an object image (see Japanese Unexamined Patent Publication No. 2003-318375) by providing a filter arrangement that luminance filters Y e.g. a transparent filter or a white color filter, having a large light transmittance, are disposed on checker-patterned photodiodes among the photodiodes of the image sensor to enhance the sensitivity, while conventional color filters of R (red), G (green), and B (blue) are disposed on the rest of the photodiodes to obtain color information, and by using signal charges generated by the photodiodes on which the luminance filters Y having the high sensitivity are disposed, as luminance signals.

In the approach disclosed in the publication, there is a sensitivity difference of three times or more between the pixels (hereinafter, called as "white pixels") where the luminance filters Y are disposed, and the pixels (hereinafter, called as "color pixels") where the color filters are disposed. If an exposure control is performed under the same conditions for the color pixels and the white pixels with use of the solid-state image sensor having the above pixel configuration, signal charges generated in the white pixels are saturated, and signal charges generated in the color pixels are exceedingly small. Accordingly, an image signal where a luminance signal and a chrominance signal are kept in a well-balanced state cannot be obtained, thereby making it difficult to form a high-quality image.

SUMMARY OF THE INVENTION

It is an object of the present invention to provide a technology that is free from the above problems residing in the prior art.

It is an object of the present invention to provide a technology that enables to prevent or suppress image degradation of a photographic image resulting from a large sensitivity difference between color pixels and white pixels in using an image sensor provided with the color pixels on which different kinds of color filters are disposed, and the white pixels on which luminance filters are disposed.

According to an aspect of the invention, an imaging unit comprises: an image sensor including a number of pixels arranged in a matrix, the pixels having color pixels where color filters are disposed, and white pixels where the color filters are not disposed; a sampling circuit section for sampling pixel signals generated in the image sensor; and a controller for controlling the image sensor and/or the sampling circuit section to sample pixel signals generated in white pixels or pixel signals generated in color pixels sequentially in a time-series manner.

These and other objects, features and advantages of the present invention will become more apparent upon reading the following detailed description along with the accompanying drawing.

BRIEF DESCRIPTION OF THE DRAWING

FIG. 8A is a diagram showing the order of pixel signals to be outputted from the image sensor in the embodiment 1-1.

FIG. 8B is a diagram showing the order of pixel signals to be sampled by a first sampling circuit in the embodiment 1-1.

FIG. 8C is a diagram showing the order of pixel signals to be sampled by a second sampling circuit in the embodiment 1-1.

FIG. 9 is a block diagram showing an electrical configuration of an image sensing apparatus in the embodiment 1-2.

FIG. 11A is a diagram showing the order of pixel signals to be sampled by a first sampling circuit in the embodiment 1-2.

FIG. 11B is a diagram showing the order of pixel signals to be sampled by a second sampling circuit in the embodiment 1-2.

FIG. 49 is a diagram schematically showing an altered arrangement of a CCD area sensor with a Bayer matrix in the embodiment 3-1.

DETAILED DESCRIPTION OF THE PREFERRED EMBODIMENTS OF THE INVENTION

Figure 1:
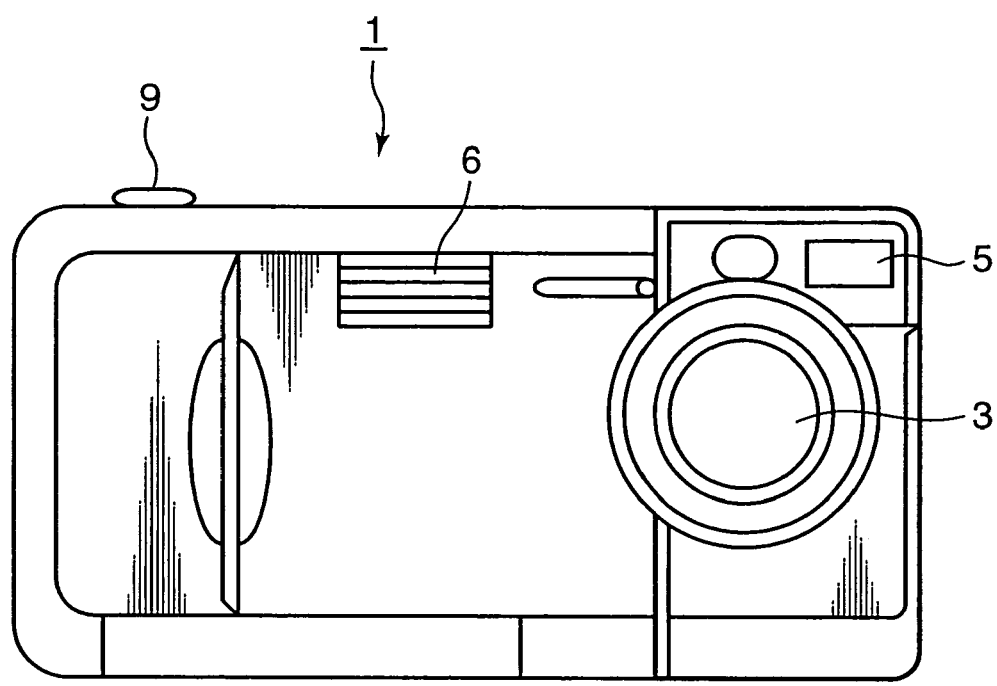
FIG. 1 is a front view of an image sensing apparatus to which the invention is applied.

In the following, embodiments of the invention are described referring to the drawings. The embodiments are substantially classified into:

(1) a first embodiment directed to control of a sampling timing of pixel signals outputted from color pixels and pixel signals outputted from white pixels;

(2) a second embodiment directed to control of exposure times for color pixels and white pixels; and (3) a third embodiment directed to mechanical improvements on an image sensor.

In the following, various embodiments are described with respect to each of the first through the third embodiments.

First Embodiment

Embodiment 1-1

Figure 2:
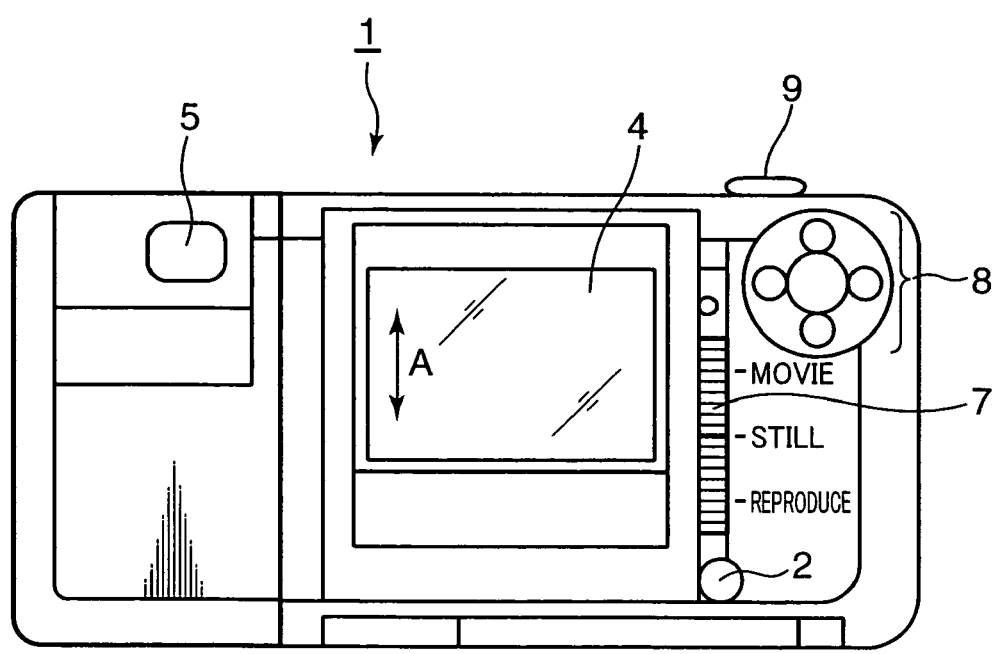
FIG. 2 is a rear view of the image sensing apparatus.

FIG. 1 is a front view of an image sensing apparatus 1 to which the invention is applied, and FIG. 2 is a rear view of the image sensing apparatus 1. As shown in FIGS. 1 and 2, the image sensing apparatus 1 includes a power source button 2, a photographing optical system 3, an LCD (Liquid Crystal Display) 4, an optical viewfinder 5, a built-in flash 6, a mode setting switch 7, a quadruple switch 8, and a shutter button 9.

The power source button 2 is adapted to switch over the power of the image sensing apparatus 1 between on-state and off-state. The photographing optical system 3 includes a zoom lens and an unillustrated mechanical shutter, and is adapted to form an optical image of an object onto an imaging surface of an image sensor 10 (see FIG. 3) such as a CCD (Charge Coupled Device) sensor.

The LCD 4 is adapted to display a live-view image or an image to be recorded in an external storage 21 (see FIG. 3), or to reproduce and display the image recorded in the external storage 21. The live-view image is a series of images that are displayed on the LCD 4 at a predetermined cycle i.e. 1/30 second during a period until an object image is recorded. The live-view image displayed on the LCD 4 shows a status of the object substantially on a real time basis so that a user can confirm the status of the object through the LCD 4. An organic electroluminescent display device or a plasma display device may be used in place of the LCD 4.

The optical viewfinder 5 defines an area of the object image to be photographed so that the user can optically observe the object image within the area. The built-in flash 6 is adapted to irradiate illumination light onto the object by firing unillustrated flashlight onto the object if an exposure amount to the image sensor 10 is insufficient or under a like condition.

The mode setting switch 7 is a switch for allowing the user to switch over the mode of the image sensing apparatus 1 between a still image photographing mode of photographing a still image of the object, a moving image photographing mode of photographing a moving image of the object, and a playback mode of reproducing and displaying the photographic image recorded in the external storage 21 on the LCD 4. The mode setting switch 7 is a 3-contact slide switch which is slidably movable in vertical directions. Setting the mode setting switch 7 to a lower position brings the image sensing apparatus 1 to the playback mode, setting the mode setting switch 7 to a middle position brings the image sensing apparatus 1 to the still image photographing mode, and setting the mode setting switch 7 to an upper position brings the image sensing apparatus 1 to the moving image photographing mode.

Although not described in detail, the quadruple switch 8 is a switch for setting a menu mode to designate various functions, moving the zoom lens in an optical axis direction, correcting an exposure, feeding frames of images to be reproduced on the LCD 4, or performing a like operation.

The shutter button 9 is a button which is depressed in two stages i.e. halfway depressed state and a fully depressed state, and is adapted to designate a timing on exposure control. As mentioned above, the image sensing apparatus 1 has the still image photographing mode of photographing a still image, and the moving image photographing mode of photographing a moving image. When the shutter button 9 is not depressed while the image sensing apparatus 1 is in the still image photographing mode or the moving image photographing mode, an optical image of the object is captured every 1/30 sec., and a live-view image is displayed on the LCD 4.

In response to halfway depressing of the shutter button 9, while the image sensing apparatus 1 is in the still image photographing mode, the image sensing apparatus 1 is brought to a photographing standby state where an exposure control value i.e. a shutter speed and an aperture value are settable. In response to fully depressing of the shutter button 9, an exposure operation for an image recording by the image sensor 10 is started to generate an image of the object to be recorded in the external storage 21.

In response to fully depressing of the shutter button 9 while the image sensing apparatus 1 is in the moving image photographing mode, an exposure operation for an image recording is started, pixel signals are cyclically read out, and images are sequentially generated based on the pixel signals. In response to fully depressing of the shutter button 9 again, the exposure operation for the image recording is suspended.

Figure 3:
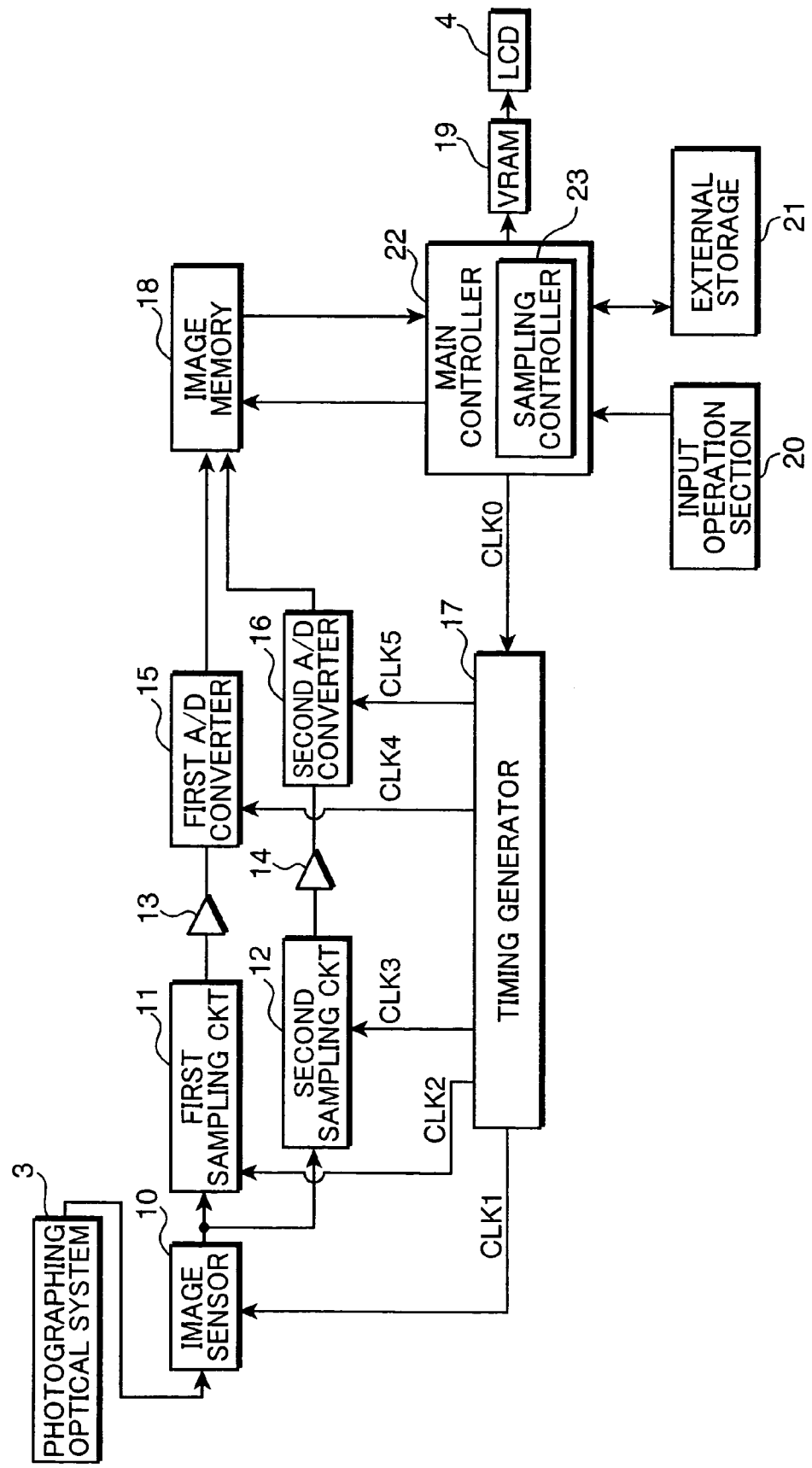
FIG. 3 is a block diagram showing an electrical configuration of an image sensing apparatus in the embodiment 1-1.

FIG. 3 is a block diagram showing an electrical configuration of the image sensing apparatus 1. Elements in FIG. 3 which are identical or equivalent to those in FIGS. 1 and 2 are indicated by the same reference numerals.

The image sensing apparatus 1 includes the photographing optical system 3, the LCD 4, the image sensor 10, a first sampling circuit 11, a second sampling circuit 12, a first amplifier 13, a second amplifier 14, a first A/D converter 15, a second A/D converter 16, a timing generator 17, an image memory 18, a VRAM (Video Random Access Memory) 19, an input operation section 20, the external storage 21, and a main controller 22.

The photographing optical system 3 in FIG. 3 corresponds to the photographing optical system 3 in FIG. 1. As described above, the photographing optical system 3 includes the zoom lens and the mechanical shutter. The LCD 4 in FIG. 3 corresponds to the LCD 4 in FIG. 2.

The image sensor 10 is a CCD color area sensor provided with a number of photoelectric conversion devices e.g. photodiodes (hereinafter, called as "pixels") arranged in a two dimensional matrix.

Figure 4:
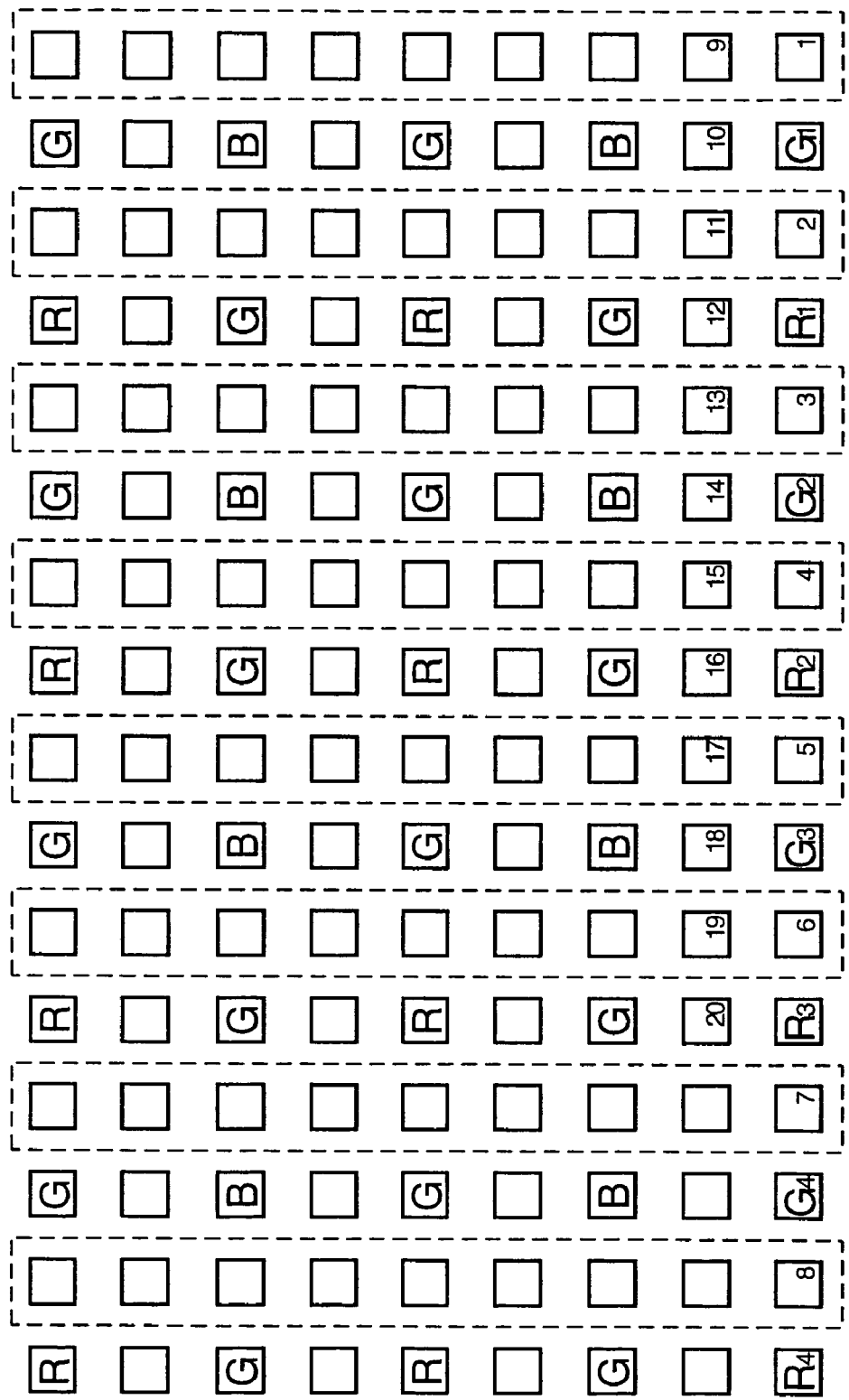
FIG. 4 is a diagram showing an arrangement pattern on color pixels and white pixels in the embodiment 1-1.

The image sensor 10 in this embodiment includes, as shown in FIG. 4, pixels (hereinafter, called as "colorpixels") where color filters of R (red), G (green), and B (blue) having spectral characteristics different from each other are disposed on a light receiving plane of the image sensor 10, and pixels (hereinafter, called as "white pixels" where the color filters are not disposed. The white pixels are shown by the pixels without indication of "R", "G", and "B" in FIG. 4. The color pixels of R, G, and B are regularly distributed relative to the white pixels.

Figure 5:
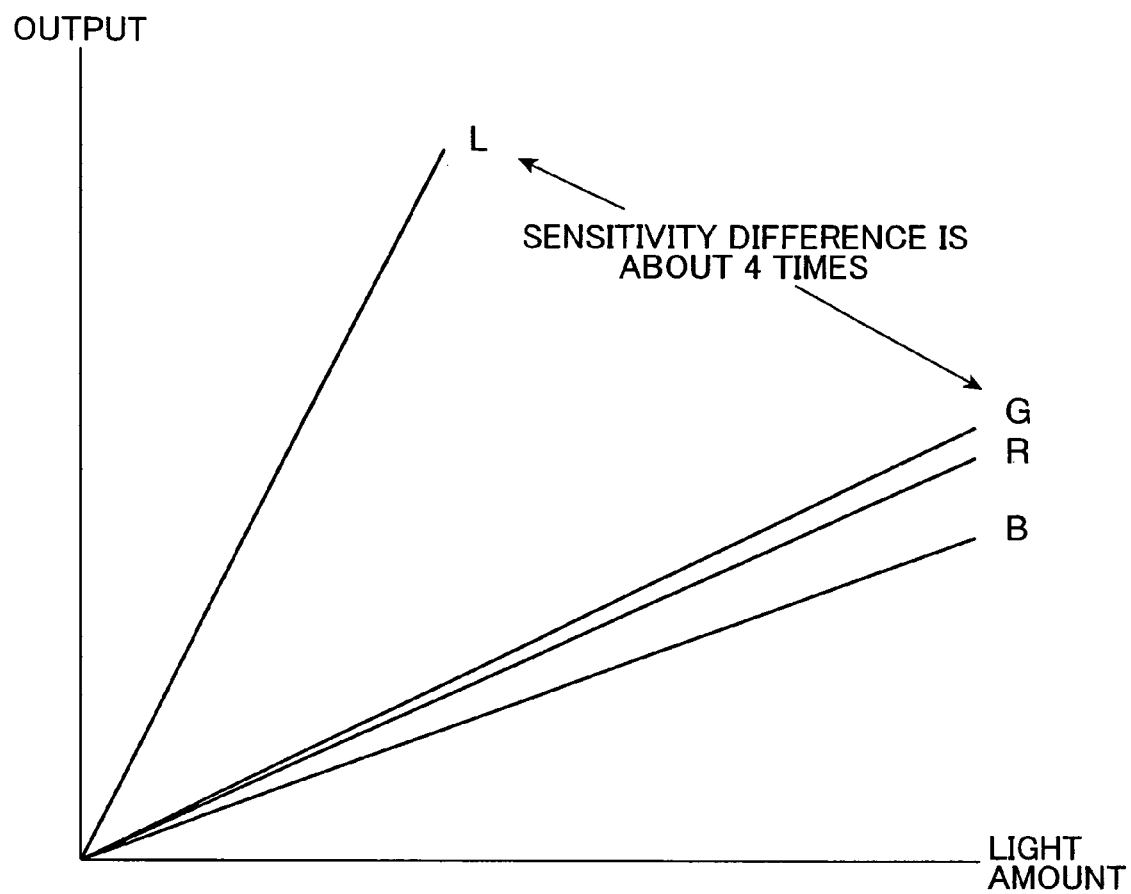
FIG. 5 is a graph for describing a sensitivity difference between white pixels and color pixels in the embodiment 1-1.

Specifically, concerning the pixel arrangement example shown in FIG. 4 depicting a part of a light receiving area i.e. an area covering 9 pixels in a column direction and 16 pixels in a row direction, within the light receiving plane of the image sensor 10, let it be assumed that the uppermost and leftmost pixel is defined as an origin (0,0) in an XY two-dimensional coordinate system wherein respective pixel positions serve as grid positions. Then, red color pixels are disposed at positions indicated by ($4x$, $4y$), green color pixels are disposed at positions indicated by ($4x+2$, $4y$) or ($4x$, $4y+2$), and blue color pixels are disposed at positions indicated by ($4x+2$, $4y+2$) where x and y are integers, while the rest of the pixels are white pixels. As shown in FIG. 5, the sensitivity of the white pixel is about four times as large as the sensitivity of the color pixel, for instance.

The image sensor 10 converts an optical image of an object focused by the photographing optical system 3 into an analog electrical signal, and outputs the analog electrical signal as a pixel signal. Color information is obtained based on pixel signals outputted from the color pixels of the respective color components of R, G, and B, and luminance information is obtained based on pixel signals outputted from the white pixels.

Figure 6:
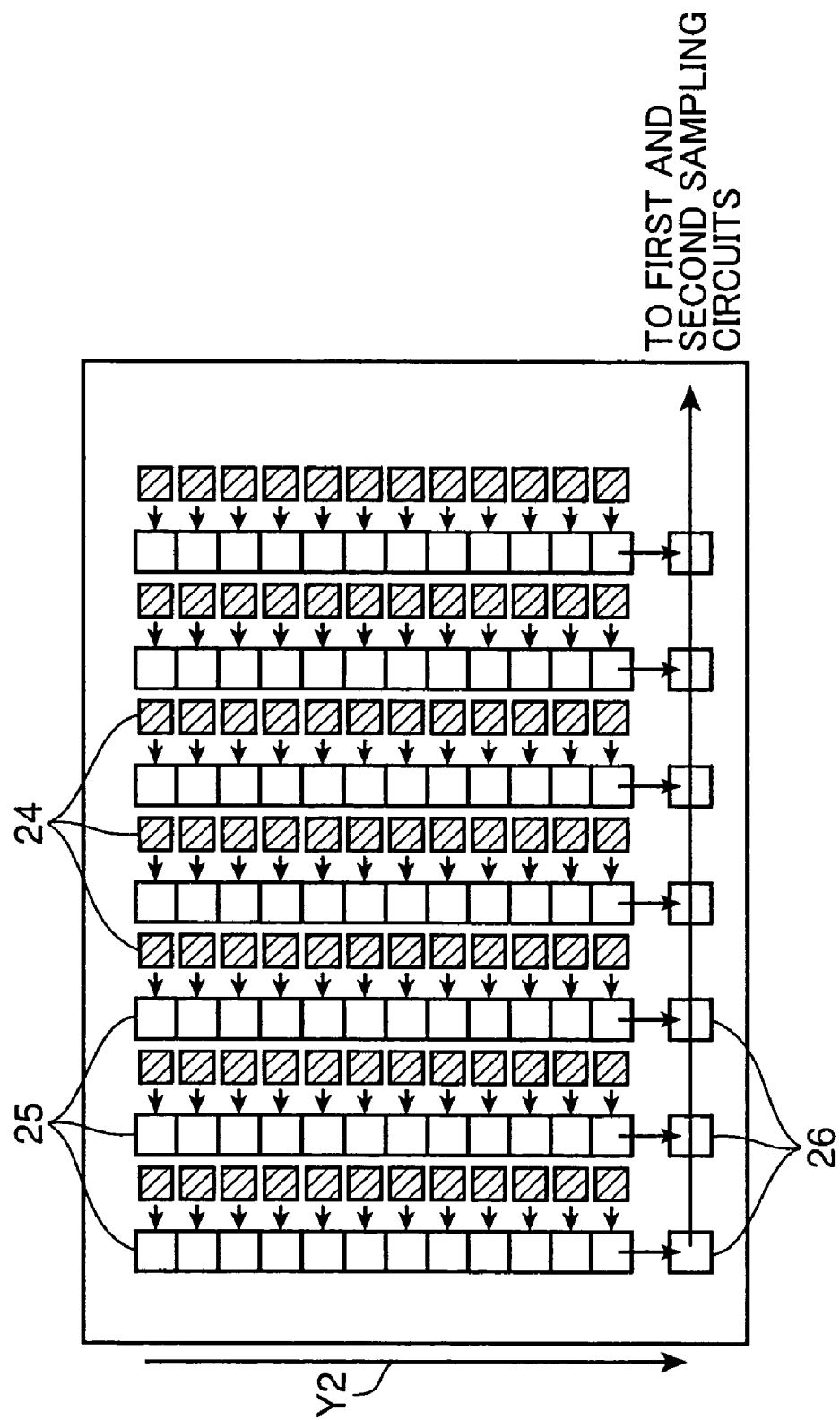
FIG. 6 is a diagram showing an arrangement of an interline image sensor in the embodiment 1-1.

The image sensor 10 in this embodiment is, as shown in FIG. 6, an interline image sensor provided with pixels 24 including the color pixels and the white pixels, vertical registers 25 for transferring electrical charges accumulated in the respective pixels 24 in a vertical direction i.e. in an interline direction shown by the arrow "Y2" in FIG. 6, and horizontal registers 26 for transferring the electrical charges transferred by the vertical register 25 in a horizontal direction.

The electrical charges accumulated in the respective pixels 24 are transferred to the corresponding vertical registers 25 by a vertical synchronizing signal. The electrical charges transferred by the respective vertical registers 25 are vertically transferred toward the corresponding horizontal registers 26 by a horizontal synchronizing signal sequentially from the pixel 24 nearest to the corresponding horizontal registers 26. The electrical charges transferred to the horizontal registers 26 are horizontally transferred toward the first sampling circuit 11 and the second sampling circuit 12 sequentially from the pixel 24 nearest to an output terminal of the image sensor 10.

An image pickup operation such as a readout of output signals from the respective pixels of the image sensor 10 such as horizontal synchronization and vertical synchronization; and a start timing and an end timing of an exposure operation by the image sensor 10 are controlled by a timing generator 17 and the like, which will be described later.

Figure 7A:
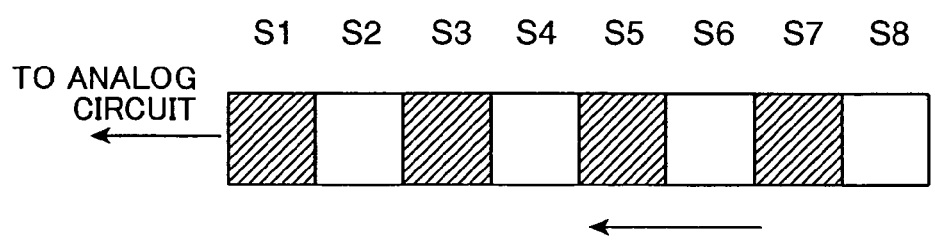
FIG. 7A is a diagram showing a row of pixels, in which color pixels and white pixels of an image sensor are alternately arranged horizontally in the embodiment 1-1.
Figure 7B:
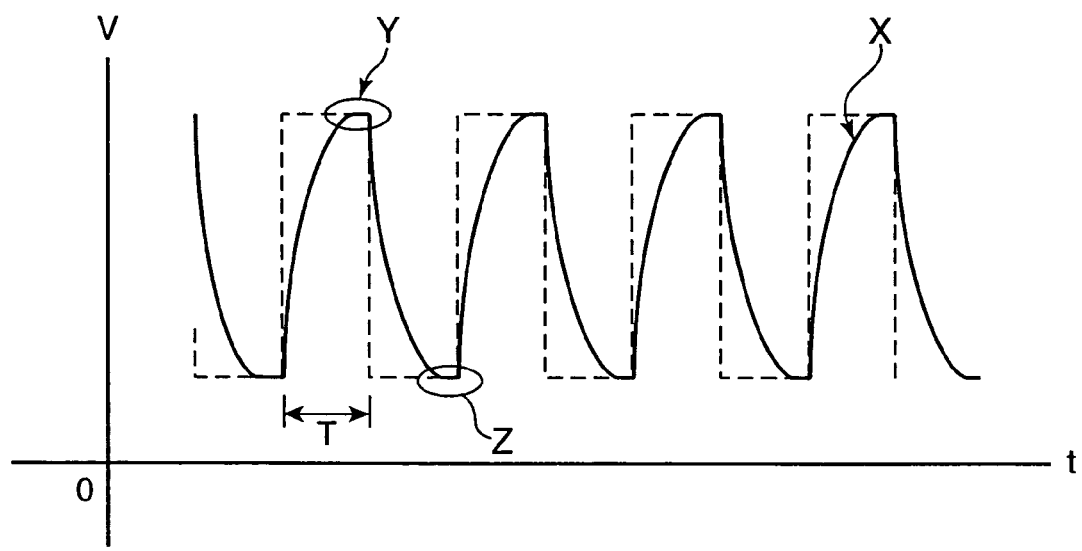
FIG. 7B is a diagram showing a signal waveform obtained by alternately reading out pixel signals from the color pixels and the white pixels in the pixel row, with use of an analog circuit provided in the image sensor in the embodiment 1-1.

With the image sensor 10 having the above construction, the following drawback may arise resulting from a large sensitivity difference between a color pixel and a white pixel. FIG. 7A is a diagram showing a row of pixels, in which the color pixels and the white pixels of the image sensor are alternately arranged horizontally. FIG. 7B is a diagram showing a signal waveform obtained by alternately reading out the pixel signals from the color pixels and the white pixels in the pixel row, with use of an analog circuit provided in the image sensor, which will be described later. Referring to FIG. 7A, pixels "S1", "S3", "S5", and "S7" shown by the hatched squares indicate the color pixels, and pixels "S2", "S4", "S6", and "S8" shown by the hollow squares indicate the white pixels.

As shown by the dotted line in FIG. 7B, an idealistic signal configuration obtained by alternately reading out the pixel signals from the color pixels and from the white pixels is a rectangular waveform. Actually, however, a difference in signal level between the pixel signals generated in the color pixels "S1", "S3", "S5", and "S7", and the pixel signals generated in the white pixels "S2", "S4", "S6", and "S8" is great due to a large sensitivity difference between the color pixels and the white pixels.

If the signals having the large signal level difference are outputted to the analog circuit alternately, it is impossible to instantaneously raise the signal level of a pixel signal sampled by the analog circuit to the signal level which is supposed to be obtained from an intended pixel at the time of switching over readout of the pixel output to the intended pixel, due to a response characteristic of the analog circuit. As a result, a response delay corresponding to a certain time duration from the switching timing may occur, and a waveform as shown by the arrowed portion "X" may be obtained. If such a phenomenon occurs, a proper A/D conversion value may not be obtained in converting the analog signal to a digital signal, thereby leading to degradation of image quality of a photographic image.

Particularly, in recent years, as a high-pixel image sensor is required, there is a demand for reading out pixel signals at a high drive frequency, in other words, shortening a readout time "T" required in reading out a pixel signal from one pixel. If the readout time "T" is shortened, as shown in FIG. 7B, a readout process with respect to a succeeding pixel is performed in a state that the signal level obtained from the intended pixel does not reach a signal level which is supposed to be generated from the intended pixel, as exemplified by the signal levels shown by the arrowed portions Y and Z, which may unduly degrade the image quality of a photographic image.

Referring back to FIG. 3, as mentioned above, the first sampling circuit 11 and the second sampling circuit 12 temporarily read out the pixel signals outputted from the image sensor 10, and sample a part of the pixel signals out of the readout pixel signals. This embodiment has features: that plural sampling circuits, specifically, in this embodiment, the two sampling circuits, are provided to eliminate the drawback involved in the response delay resulting from the large sensitivity difference between the color pixels and the white pixels; and that a pixel signal group including pixel signals outputted from the color pixels, and a pixel signal group excluding the pixel signals outputted from the color pixels are sampled by the individual sampling circuits, respectively. Sampling operations to be executed by the first sampling circuit 11 and the second sampling circuit 12 are controlled via the timing generator 17 by the main controller 22 to be described later. The sampling operations will be described later. The first and the second sampling circuits 11 and 12 reduce noises of the sampled pixel signals.

The first and the second amplifiers 13 and 14 are adapted to adjust signal levels of the pixel signals after the noise reduction process, which are outputted from the first and the second sampling circuits 11 and 12. As described above, the sensitivity of the white pixel is about four times as large as the sensitivity of the color pixel, for instance. In view of this, setting a gain of the second amplifier 14 about four times as large as a gain of the first amplifier 13 enables to set the signal levels of the pixel signals outputted from the white pixels substantially identical to those of the pixel signals outputted from the white pixels. This arrangement enables to avoid or suppress a luminance fluctuation in an image resulting from the sensitivity difference between the white pixels and the color pixels.

The first and the second A/D converters 15 and 16 convert the analog pixel signals of R, G, and B outputted from the first and the second amplifiers 13 and 14 into digital pixel signals of plural bits e.g. 10 bits, respectively.

The timing generator 17 generates a clock signal CLK1 including a control signal of driving the image sensor 10 e.g. a timing signal for starting/finishing an integration e.g. starting/finishing an exposure, and a control signal of reading out light receiving signals from the respective pixels e.g. a horizontal synchronizing signal and a vertical synchronizing signal, based on a reference clock CLK0 outputted from the main controller 22, and outputs the clock signal CLK1 to the image sensor 10. The timing generator 17 also generates clock signals CLK2 and CLK3 e.g. timing signals relating to sampling operations of the first and the second sampling circuits 11 and 12, based on the reference clock CLK0; outputs the clock signals CLK2 and CLK3 to the first and the second sampling circuits 11 and 12; generates clock signals CLK4 and CLK5 e.g. timing signals relating to A/D conversion operations of the first and the second A/D converters 15 and 16; and outputs the clock signals CLK4 and CLK5 to the first and the second A/D converters 15 and 16.

The image memory 18 is a memory which is adapted to temporarily store image data outputted from the first and the second A/D converters 15 and 16 at the photographing mode, and is used as a work area where the main controller 22 executes various processes with respect to the image data. Also, the image memory 18 is a memory for temporarily storing image data read out from the external storage 21 to be described later at the playback mode.

The VRAM 19 is a buffer memory which has a capacity recordable of image signals corresponding to the number of pixels of the LCD 4, and is adapted to store image data constituting an image to be reproduced and displayed on the LCD 4. The input operation section 20 includes the shutter button 9, the quadruple switch 8, the power source button 2, and the mode setting switch 7 so that the user is allowed to input operation information concerning the respective parts to the main controller 22. The external storage 21 includes a memory card and a hard disk, and stores images generated by the main controller 22.

The main controller 22 includes an ROM for storing a control program or the like, and a microcomputer internally provided with a storage section such as a flash memory for temporarily storing data. The main controller 22 centrally controls a photographing operation of the image sensing apparatus 1 in association with driving of the respective parts of the image sensing apparatus 1.

The main controller 22 functions as an image processor (not shown) for performing black level correction of correcting a black level to a reference black level, white balance adjustment of performing level conversion with respect to digital signals of the respective color components of R, G, and B, and gamma correction of correcting gamma characteristics of the digital signals of the respective color components of R, G, and B; and an image compressor (not shown) of generating compressed image data by applying a predetermined compression process to image data of an image to be recorded after the various processes have been executed by the image processor, with use of two-dimensional DCT (Discrete Cosine Transform), or JPEG (Joint Picture Experts Group) such as Huffman coding, and of recording, into the external storage 21, an image file which is obtained by attaching information relating to a photographic image e.g. information relating to a compression ratio of the compressed image data to the compressed image data.

The main controller 22 also has a sampling controller 23 of controlling the sampling operations of the first and the second sampling circuits 11 and 12 via the timing generator 17. In the following, the sampling operations of the first and the second sampling circuits 11 and 12 to be controlled by the sampling controller 23 are described referring to FIGS. 4, 7, and 8A through 8C.

Now, assuming that the vertical transfer direction and the horizontal transfer direction of pixel signals generated in the respective pixels in FIG. 4 correspond to the ones shown in FIG. 6, the order of output of the pixel signals generated in the respective pixels in FIG. 4 is as shown in FIG. 8A.

FIG. 8A is a diagram showing the order of output of the pixel signals generated in a part of the pixels shown in FIG. 4, i.e. pixels belonging to the lowermost pixel row in FIG. 4, wherein the pixels signals are sequentially outputted from the leftmost pixel in a rightward direction from the image sensor 10.

As shown in FIG. 4, numbers are attached to the part of the pixels in order to specify the respective pixels of the image sensor 10. Specifically, "R1", "R2", . . . are attached to the red color pixels, "G1", "G2", . . . are attached to the green color pixels, "B1", "B2", are attached to the blue color pixels, and the numbers "1", "2", . . . are attached to the white pixels, respectively.

The order of output of the pixel signals to be outputted from the image sensor 10 is as shown in FIG. 8A. For instance, the pixel signal outputted from the pixel indicated by "G1" for instance in FIG. 4 corresponds to the pixel signal indicated by "G1" in FIG. 8A, and the pixel signal outputted from the pixel indicated by "1" in a hollow square in FIG. 4 corresponds to the pixel signal indicated by "1" in FIG. 8A.

In this embodiment, in the case where the pixels of the image sensor 10 are divided into two groups each consisting of plural columns of pixels arrayed at every other column, the first sampling circuit 11 samples the pixel signals generated in the pixels belonging to one of the two groups, and the second sampling circuit 12 samples the pixel signals generated in the pixels belonging to the other one of the two groups. Specifically, as shown in FIG. 4, the first sampling circuit 11 samples the pixel signals from the respective columns of pixels enclosed by the dotted lines in FIG. 4, and the second sampling circuit 12 samples the pixel signals from the respective columns of pixels which are not enclosed by the dotted lines in FIG. 4.

In this arrangement, if the pixel signals sampled by the first sampling circuit 11 are listed from the leftmost pixel in the sampling order, the pixel signals to be sampled by the first sampling circuit 11 are pixel signals from the white pixels which are aligned in the order of "1", "2", "3", "4", "5", "6", "7", "8", "9", "11", "13", "15", "17", and "19". On the other hand, if the pixel signals sampled by the second sampling circuit 12 are listed from the leftmost pixel in the sampling order, the pixel signals to be sampled by the second sampling circuit 12 are pixel signals from the color pixels which are aligned in the order of "G1", "R1", "G2", "R2", "G3", "R3", "G4", and "R4", followed by pixel signals from the white pixels which are aligned in the order of "10", "12", "14", "16", "18", and "20". With this arrangement, the pixels to be processed by the first sampling circuit 11 are the white pixels exclusively. Accordingly, this arrangement is free from the drawback involved in the response delay resulting from the sensitivity difference between the color pixels and the white pixels.

Although the pixels to be processed by the second sampling circuit 12 include both the color pixels and the white pixels, the sampling operations of the color pixels and the white pixels are changed over unit by unit of a certain number of pixels (in the example of FIG. 8C, one unit consists of 8 pixels). With this arrangement, there is no or less likelihood that the response delay may occur, because the pixel signals having substantially the same signal levels are sequentially sampled in a time-series manner in each cycle of changing over the pixels to be sampled between a white pixel unit and a color pixel unit. This arrangement enables to remarkably reduce a frequency of occurrence of the response delay, as compared with an arrangement that the color pixels and the white pixels are sampled alternately one by one.

As a result of the above process, signals which exactly reflect the pixel signals generated in the respective pixels are outputted from the first and the second sampling circuits 11 and 12. This allows for obtaining proper A/D conversion values by the first and the second A/D converters 15 and 16, thereby avoiding or reducing degradation of image quality of a photographic image resulting from the drawback involved in the response delay.

In the above arrangement, the second sampling circuit 12 samples both the pixel signals from the white pixels and the pixel signals from the color pixels. Alternatively, the second sampling circuit 12 may exclusively sample pixel signals from the color pixels out of the substantially all pixel signals outputted from the image sensor 10, and the first sampling circuit 11 may exclusively sample pixel signals from the white pixels. The altered arrangement enables to eliminate the drawback involved in the response delay resulting from the switching over of the sampling operation with respect to a unit of a certain number of pixels (in the example of FIG. 8C, one unit consists of 8-pixels).

Embodiment 1-2

The embodiment 1-1 is constructed in such a manner that after the first and the second sampling circuits 11 and 12 read out substantially all the pixel signals to be outputted from the image sensor 10, the first and the second sampling circuits 11 and 12 selectively sample the pixel signals. Alternatively, pixel signals may be outputted to individual output sections in outputting the pixel signals from an image sensor. FIG. 9 is a block diagram showing an electrical configuration of an image sensing apparatus 1 in the embodiment 1-2. Elements in the embodiment 1-2 which are substantially identical or equivalent to those in the embodiment 1-1 are denoted by the same reference numerals.

Similarly to the embodiment 1-1, as shown in FIG. 9, the image sensing apparatus 1 in this embodiment is provided with a first sampling circuit 11' and a second sampling circuit 12', and with a signal line L1 as a signal path from an image sensor 10' to the first sampling circuit 11', and a signal line L2 as a signal path from the image sensor 10' to the second sampling circuit 12'. Pixel signals generated in white pixels are outputted to the first sampling circuit 11' via the signal line L1, and pixel signals generated in color pixels are outputted to the second sampling circuit 12' via the signal line L2.

Figure 10:
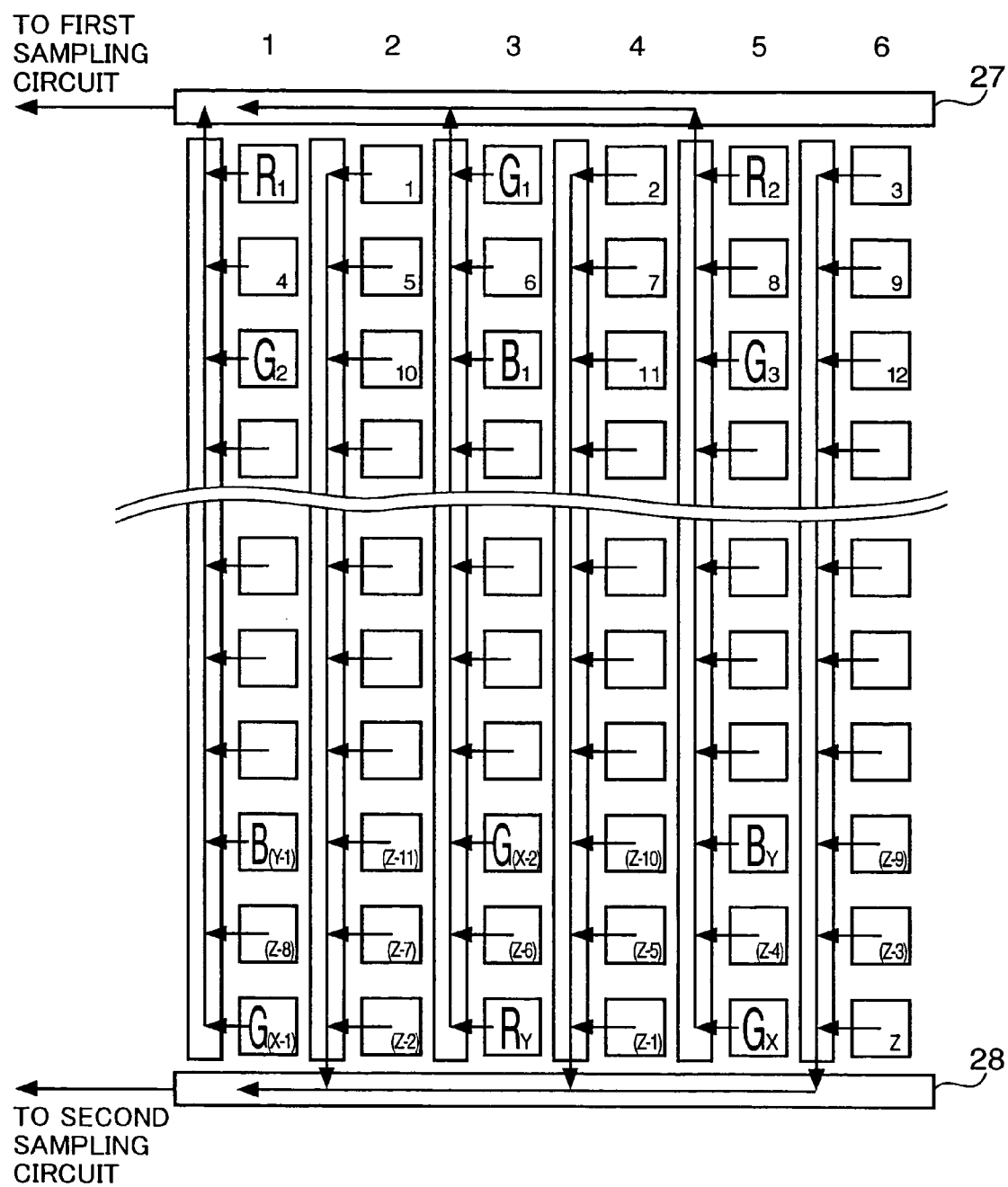
FIG. 10 is a diagram showing an arrangement of an image sensor for realizing a pixel signal output in the embodiment 1-2.

FIG. 10 is a diagram showing a construction of the image sensor 10' which is designed to realize the aforementioned output configuration of pixel signals. As shown in FIG. 10, the image sensor 10' in this embodiment has plural, specifically, in this embodiment, two output terminals (not shown). A first horizontal transfer section 27 and a second horizontal transfer section 28 each constituted of horizontal registers arrayed in a horizontal direction are arranged in correspondence to the respective output terminals.

In the case where pixels of the image sensor 10' are divided into two groups each consisting of plural columns of pixels arrayed at every other column, the two groups are associated with the first and the second horizontal transfer sections 27 and 28, respectively. Specifically, assuming that columns of pixels in FIG. 10 are attached with numbers from the leftmost column in a rightward direction, pixels belonging to the first, the third, and the fifth columns of the pixels output pixel signals to the first horizontal transfer section 27, and pixels belonging to the second, fourth, and the sixth columns of the pixels output pixel signals to the second horizontal transfer section 28.

The first horizontal transfer section 27 outputs the transferred pixel signals to the first sampling circuit 11' via the signal line L1, and the second horizontal transfer section 28 outputs the transferred pixel signals to the second sampling circuit 12' via the signal line L2.

In this arrangement, let it be assumed that, concerning the pixels belonging to the uppermost three rows and the lowermost three rows of pixels in FIG. 10, indications "R1" to "RY" are attached to the red color pixels, indications "G1" to "GX" are attached to the green color pixels, indications "B1" to "BY" are attached to the blue color pixels, and indications "1" to "Z" are attached to the white pixels. In this condition, if the pixel signals sampled by the first sampling circuit 11' are listed from the leftmost pixel in the sampling order, the pixel signals sampled by the first sampling circuit 11' are, as shown in FIG. 11A, pixel signals from the color pixels attached with the indications "R1", "G1", and "R2", followed by pixel signals from the white pixels attached with the indications "4", "6", and "8", and then followed by pixel signals from the color signals attached with the indications "G2", "B1", and "G3". Thereafter, the sampled pixel signals are ended by pixel signals from the color pixels attached with the indications "B(Y-1)", "G(X-2)", and "BY", followed by pixel signals from the white pixels attached with the indications "Z-8", "Z-6", and "Z-4", and then followed by pixel signals from the color signals attached with the indications "G(X-1)", "RY", and "GX".

On the other hand, if the pixel signals sampled by the second sampling circuit 12' are listed from the leftmost pixel in the sampling order, the pixel signals sampled by the second sampling circuit 12' are, as shown in FIG. 11B, pixel signals from the white pixels attached with the indications "Z-2", "Z-1", "Z", "Z-7", "Z-5", "Z-3", "Z-11", "Z-10", ..., "10", "11", "12", "5", "7", "9", "1", "2", and "3".

With this arrangement, the pixels to be processed by the second sampling circuit 12' are the white pixels exclusively. Accordingly, this arrangement is free from the drawback involved in the response delay resulting from the sensitivity difference between the color pixels and the white pixels. Although the pixels to be processed by the first sampling circuit 11' include both the color pixels and the white pixels, the sampling operations of the color pixels and the white pixels are changed over unit by unit of a certain number of pixels (in the example of FIG. 11A, one unit consists of 3 pixels). With this arrangement, there is no or less likelihood that the response delay may occur, because the pixel signals having substantially the same signal levels are sequentially sampled in a time-series manner in each cycle of changing over the pixels to be sampled between a white pixel unit and a color pixel unit. This arrangement enables to remarkably reduce a frequency of occurrence of the response delay, as compared with the arrangement that the color pixels and the white pixels are sampled alternately one by one.

As a result of the above process, signals which exactly reflect the pixel signals generated in the respective pixels are outputted from the first and the second sampling circuits 11' and 12'. This allows for obtaining proper A/D conversion values in first and the second A/D converters 15 and 16, thereby avoiding or reducing degradation of image quality of a photographic image resulting from the drawback involved in the response delay.

As mentioned above, a similar effect as the effect in the embodiment 1-1 can be obtained by the above arrangement that the pixel signals to be outputted to the first and the second sampling circuits 11' and 12' are selected in advance in the image sensor 10' so that the selected pixel signals are outputted to the first and the second sampling circuits 11' and 12', respectively, in place of the arrangement recited in the embodiment 1-1 that the first and the second sampling circuits 11 and 12 selectively sample the pixel signals.

Embodiment 1-3

Figure 12:
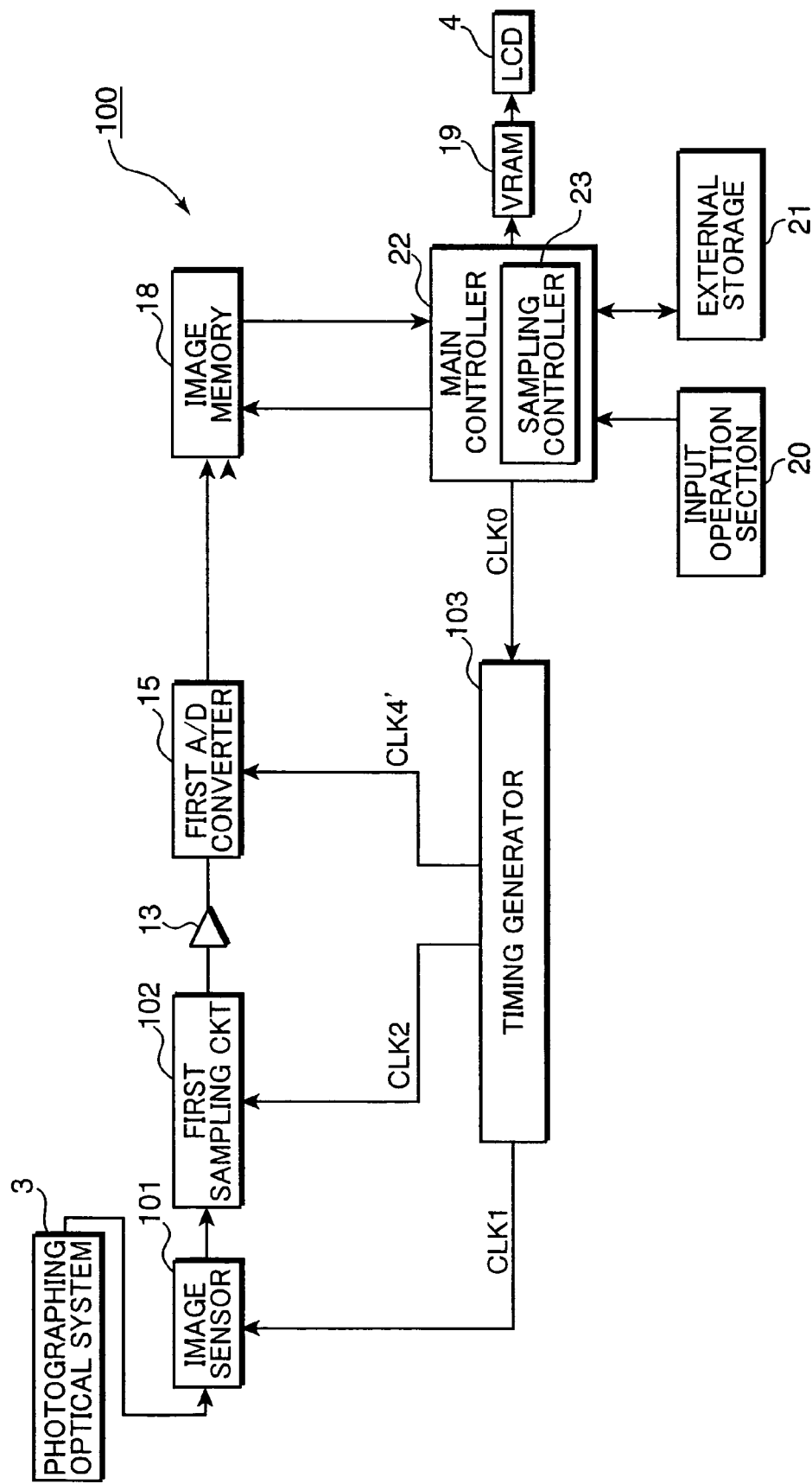
FIG. 12 is a block diagram showing an electrical configuration of an image sensing apparatus in the embodiment 1-3.

In the embodiments 1-1 and 1-2, the CCD sensor is used as the image sensor. Alternatively, a CMOS (Complementary Metal Oxide Semiconductor) sensor may be used. FIG. 12 is a diagram showing an electrical configuration of an image sensing apparatus 100 in this embodiment. Elements in FIG. 12 which are identical or equivalent to those in the embodiment 1-1 are indicated by the same reference numerals.

Figure 13:
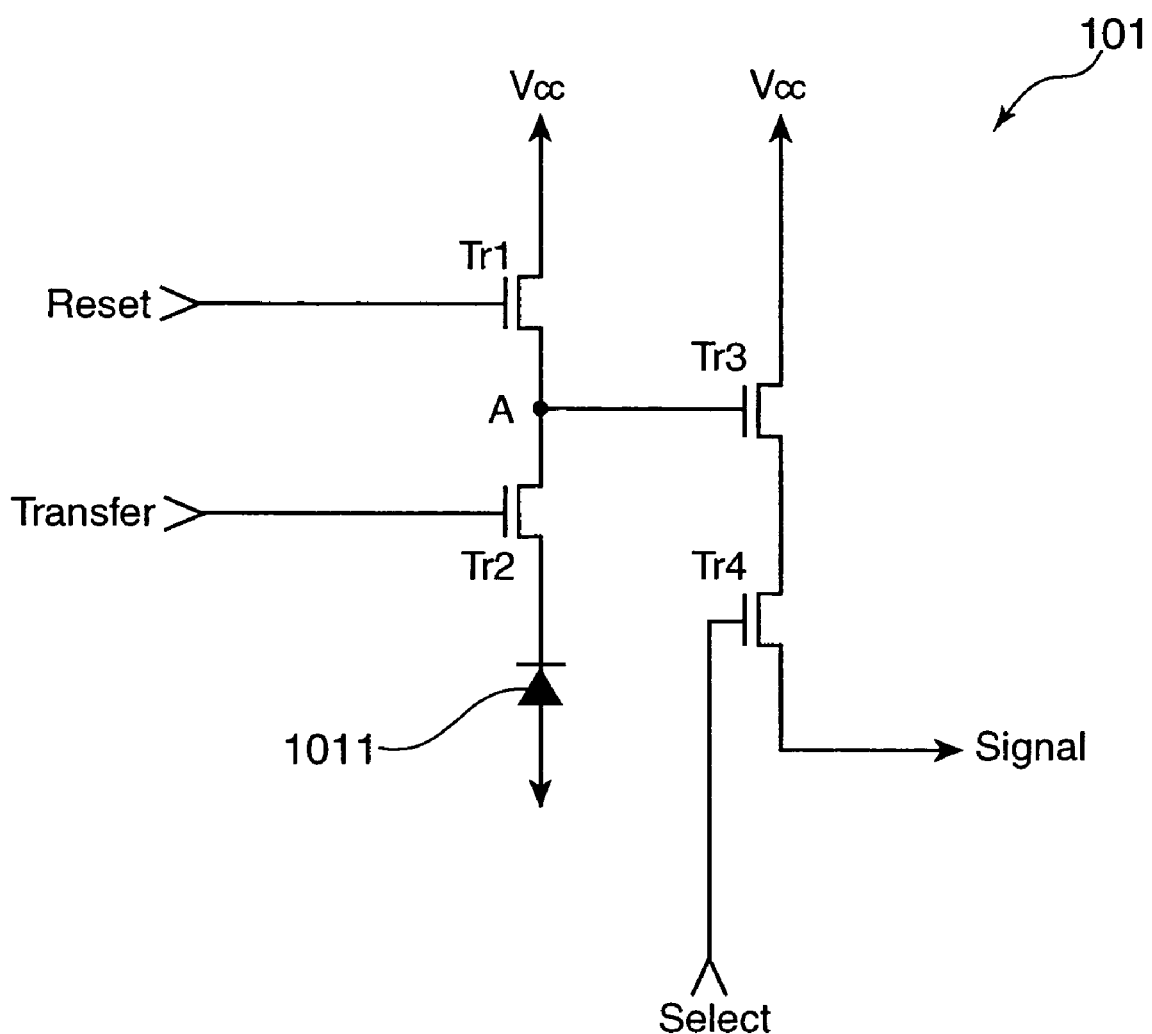
FIG. 13 is a diagram showing a pixel configuration of a CMOS sensor in the embodiment 1-3.

As shown in FIG. 12, an image sensor 101 of the image sensing apparatus 100 is a CMOS sensor. A pixel configuration of the CMOS sensor is described. FIG. 13 is a diagram showing the pixel configuration of the CMOS sensor.

As shown in FIG. 13, each pixel of the CMOS sensor has a photodiode 1011 serving as a photoelectric conversion device of performing a photoelectric conversion, and transistors Tr1 through Tr4. The transistor Tr1 has an input terminal connected to a power source Vcc, a control terminal connected to an unillustrated vertical register, and an output terminal connected to an input terminal of the transistor Tr2. The transistor Tr2 has a control terminal connected to a timing generator 103 (see FIG. 12) having a similar function as the timing generator 17, 17' in the embodiment 1-1, 1-2, and an output terminal connected to a cathode of the photodiode 1011.

The transistor Tr3 has an input terminal connected to the power source Vcc, a control terminal connected to a connection point "A" between the transistor Tr1 and the transistor Tr2, and an output terminal connected to an input terminal of the transistor Tr4. The transistor Tr4 has a control terminal connected to the timing generator 103, and an output terminal connected to an output terminal of the photoelectric conversion device via an amplifier (not shown). An anode of the photodiode 1011 is grounded.

The transistor Tr1 is functioned as a reset switch. The transistor Tr2 is functioned as a switch for determining a timing at which an electrical charge accumulated in the photodiode 1011 is transferred to the transistor Tr3. The transistor Tr3 is functioned as an amplifying device of converting an electrical charge outputted from the photodiode 1011 into a voltage via the transistor Tr2 for amplification. The transistor Tr4 is functioned as a switch for selecting a pixel from which a pixel signal is to be outputted.

In the pixel having the above configuration, in response to turning on of the transistor Tr4 after turning on of the transistor Tr2, followed by turning on of the transistor Tr1, a reset operation of discharging an electrical charge accumulated in the photodiode 1011 is performed. On the other hand, in response to turning on of the transistor Tr4 after turning on of the transistor Tr2, followed by turning off of the transistor Tr1, the electrical charge accumulated in the photodiode 1011 is read out as a pixel signal constituting an image.

As mentioned above, appropriately setting a signal to be outputted to the control terminals of the transistors Tr1, Tr2, and Tr4 enables to output a pixel signal from an intended pixel. It is possible to divide the pixels of the image sensor 101 into a white pixel group and a color pixel group, and to carry out an operation of reading out pixel signals from the respective pixels according to a readout order which is defined with respect to each of the groups, with use of the above-mentioned pixel signal output control operation.

For instance, as shown in FIG. 13, let it be assumed that columns of pixels are attached with indications "P0", "P1", "P2", "P3", "p4", ..., "Pn-4", "Pn-3", "Pn-2", "Pn-1", and "Pn" from the leftmost column in a rightward direction to define the pixel positions at the respective columns, and rows of pixels are attached with indications "L0", "L1", "L2", "L3", ..., "Lm-3", "Lm-2", "Lm-1", and "Lm" from the uppermost row in a downward direction to define the pixel positions at the respective rows. Then, there is proposed an example of a readout order, wherein pixel signals from white pixels are read out in the order of (L0, P1)→(L0, P3)→ ... →(L0, Pn-3)→(L0, Pn-1)→(L1, P0)→(L1, P1)→(L1, P2)→(L1, P3)→(L1, P4)→ ... →(L1, Pn-4)→(L1, Pn-3)→(L1, Pn-2)→(L1, Pn-1)→(L1, Pn)→ ..., and then, pixel signals from color pixels are read out in the order of (L0, P0)→(L0, P2)→(L0, P4)→ . . . →(L0, Pn-4)→(L0, Pn-2)→(L0, Pn)→(L2, P0)→(L2, P2)→(L2, P4)→ . . . →(L2, Pn-4)→(L2, Pn-2)→(L2, Pn)→ . . . .

Figure 14:
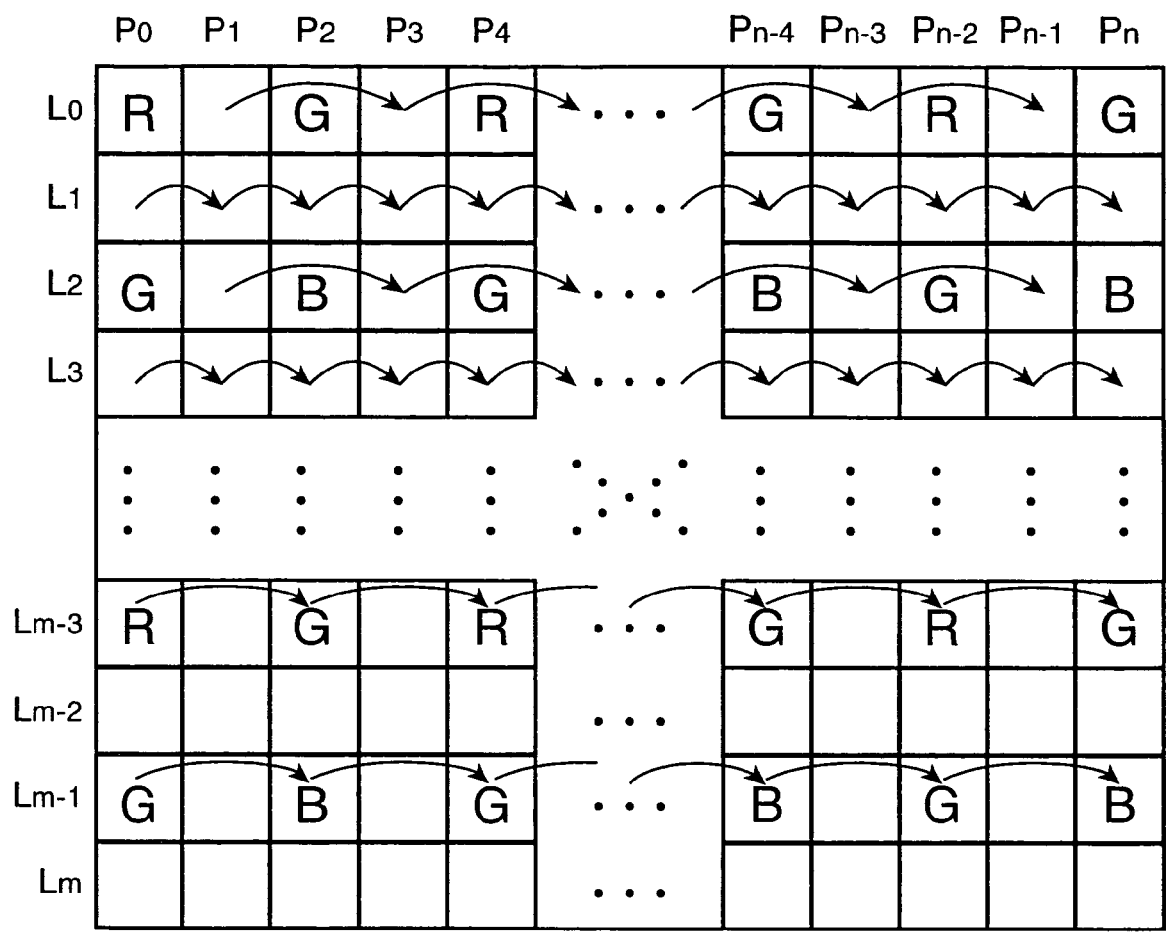
FIGS. 14 through 16 are diagram showing readout orders of pixel signals in the embodiment 1-3.

The arrows shown in the upper rows of pixels in FIG. 14 indicate the order of reading out pixel signals from the white pixels, and the arrows shown in the lower rows of pixels indicate the order of reading out pixel signals from the color pixels.

In the above arrangement, the pixel signals from the white pixels and the pixel signals from the color pixels are sequentially outputted in a time-series manner from the image sensor 101. Accordingly, as shown in FIG. 12, the image sensing apparatus 100 is provided with a single sampling circuit 102 for sampling the pixel signals generated in the image sensor 101, a single amplifier 13, and a single A/D converter 15, which enables to simplify the arrangement of the image sensor 101, as compared with the arrangement in the embodiment 1-1.

Since the pixel signals from the white pixels and the pixel signals from the color pixels can be sequentially outputted in a time-series manner to the sampling circuit 102 as mentioned above, this arrangement enables to eliminate or suppress the drawback involved in the response delay.

In this embodiment, the pixel signals from the white pixels are read out prior to readout of the pixel signals from the color pixels. Alternatively, the pixel signals from the color signals may be read out prior to readout of the pixel signals from the white pixels. However, in the case where there is a relatively large time interval between the point of time of starting readout of a pixel signal from the image sensor 101, and the point of time of finishing the readout of the pixel signal, a dark current may flow in the pixel having a slower readout of the pixel signal during a period corresponding to the time interval. In view of the above drawback, a pixel signal from a pixel having a lower S/N ratio is read out prior to a pixel signal from a pixel having a higher S/N ratio so as to reduce an adverse effect to the image quality resulting from the dark current. Generally, a white pixel has a lower or poorer S/N ratio than a color pixel.

Figure 15:
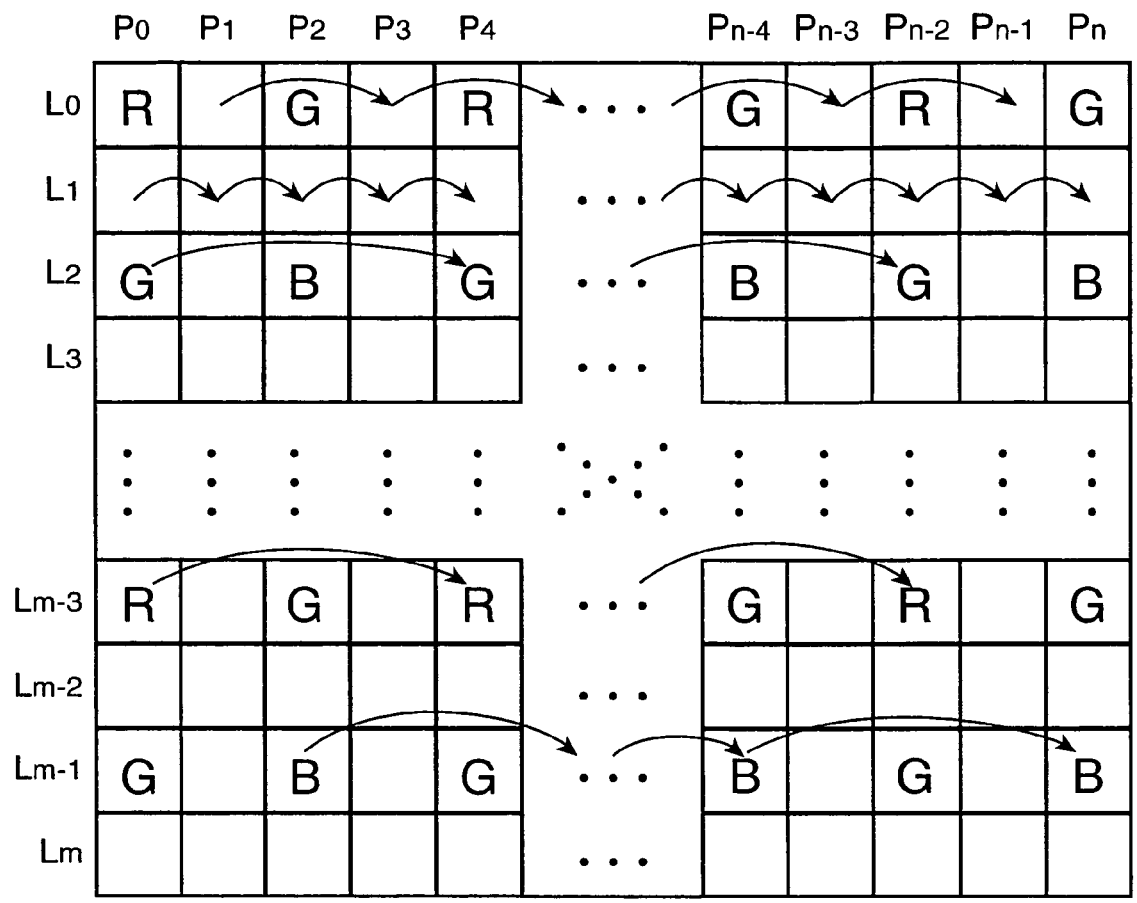

It is possible to divide the pixels of the image sensor 101 into a white pixel group, a red color pixel group, a green color pixel group, and a blue color pixel group, as shown in FIG. 15, and to read out pixel signals generated in the respective pixels according to a readout order which is defined individually with respect to these four groups, in place of the readout manner for the pixel signals shown in FIG. 14.

For instance, there is proposed an example of a readout order, wherein the sampling circuit 102 reads out the pixel signals from all the white pixels, followed by readout of the pixel signals from the green color pixels, the red color pixels, and the blue color pixels in this order.

Specifically, as shown in FIG. 15, the sampling circuit 102 reads out the pixel signals from the white pixels in the order of (L0, P1)→(L0, P3)→ . . . →(L0, Pn-3)→(L0, Pn-1)→(L1, P0)→(L1, P1)→(L1, P2) (L1, P3)→(L1, P4)→ . . . . →(L1, Pn-4)→(L1, Pn-3)→(L1, Pn-2)→(L1, Pn-1)→(L1, Pn)→ . . . , followed by the pixel signals from the green color pixels in the order of (L0, P2)→ . . . →(L0, Pn-4)→(L0, Pn)→(L2, P0)→(L2, P4)→(L2, Pn-2)→ . . . →(Lm-3, P2)→ . . . →(Lm-3, Pn-4)→(Lm-3, Pn)→(Lm-1, P0)→(Lm-1, P4)→(Lm-1, Pn-2). Thereafter, the sampling circuit 102 reads out the pixel signals from the red color pixels in the order of (L0, P0)→(L0, P4)→ . . . →(L0, Pn-2)→ . . . →(Lm-3, P0)→(Lm-3, P4)→ . . . →(Lm-3, Pn-2), followed by the pixel signals from the blue color pixels in the order of (L2, P2)→(L2, Pn-4)→ . . . →(L2, Pn)→ . . . →(Lm-1, P2)→ . . . →(Lm-1, Pn-4)→(Lm-1, Pn).

In the above altered arrangement, the pixel signals from the white pixels and the pixel signals from the color pixels are also sequentially outputted in a time-series manner to the sampling circuit 102. Accordingly, the above arrangement enables to eliminate or suppress the drawback involved in the response delay. Alternatively, the pixel signals from the color pixels may be read out prior to readout of the pixel signals from the white pixels.

Further alternatively, it is possible to divide the pixels of the image sensor 101 into two groups each consisting of plural columns of pixels arrayed at every other column, and to read out pixel signals generated in the respective pixels according to a readout order which is defined individually with respect to the two groups, in place of the readout manners for the pixel signals shown in FIGS. 14 and 15.

Figure 16:
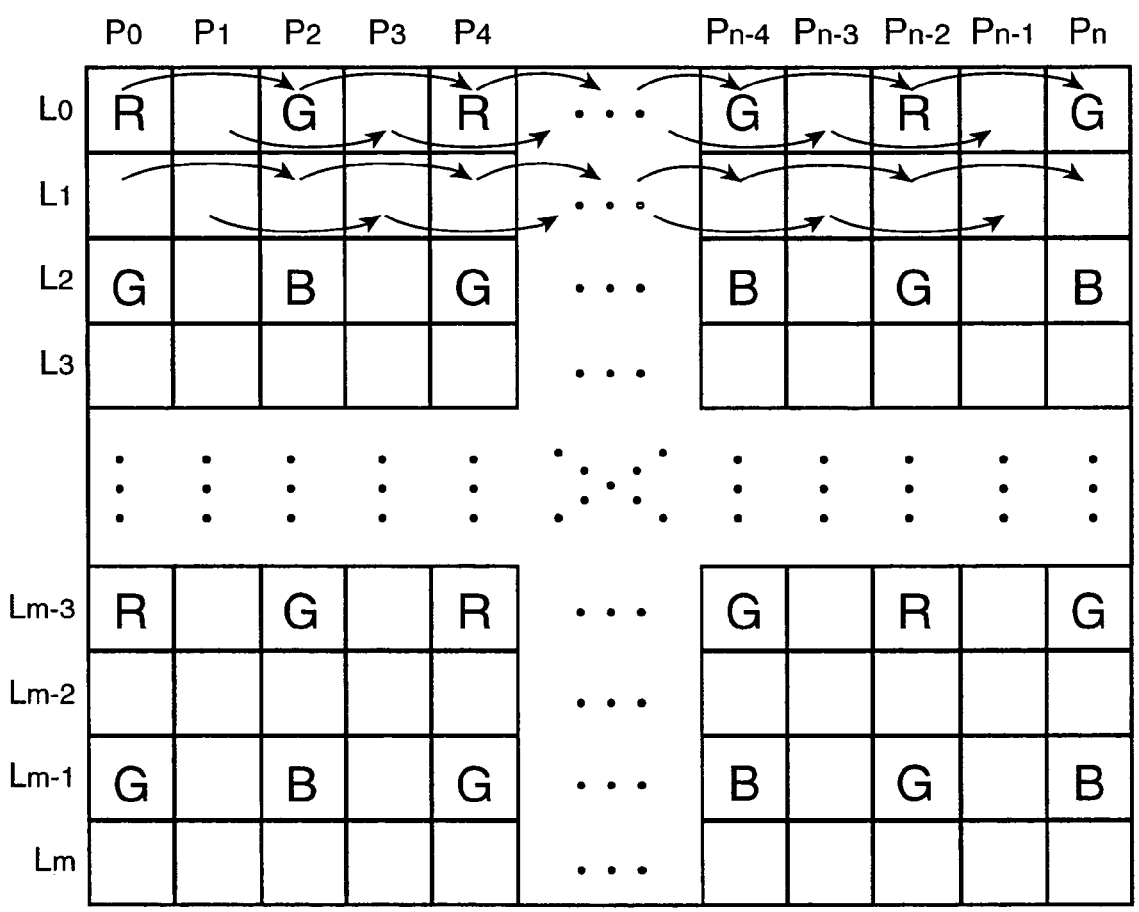

For instance, as shown in FIG. 16, the sampling circuit 102 reads out pixel signals from one of the two groups in the order of (L0, P0)→(L0, P2)→(L0, P4)→ . . . →(L0, Pn-4)→(L0, Pn-2)→(L1, Pn)→(L1, P0)→(L1, P2)→(L1, P4)→ . . . →(L1, Pn-4)→(L1, Pn-2)→(L1, Pn)→ . . . , followed by pixel signals from the other one of the two groups in the order of (L0, P1)→(L0, P3)→ . . . →(L0, Pn-3)→(L0, Pn-1)→(L1, P1)→(L1, P3)→ . . . →(L1, Pn-3)→(L1, Pn-1)→ . . . .

In the above altered arrangement, the pixel signals from the white pixels and the pixel signals from the color pixels are also sequentially outputted in a time-series manner to the sampling circuit 102. Accordingly, the above arrangement enables to eliminate or suppress the drawback involved in the response delay.

Embodiment 1-4

In the embodiment 1-3, the pixel signals from the white pixels and the pixel signals from the color pixels are sequentially outputted in a time-series manner to the sampling circuit 102. Alternatively, similarly to the arrangement shown in FIG. 9, an image sensing apparatus may be provided with a sampling circuit, an amplifier, and an A/D converter for each of pixel groups i.e. a white pixel group, a red color pixel group, a green color pixel group, and a blue color pixel group, and the pixel signals to be outputted to first and second sampling circuits 11' and 12' may be selected in advance in an image sensor for output to the corresponding sampling circuit 11', 12'.

Figure 17:
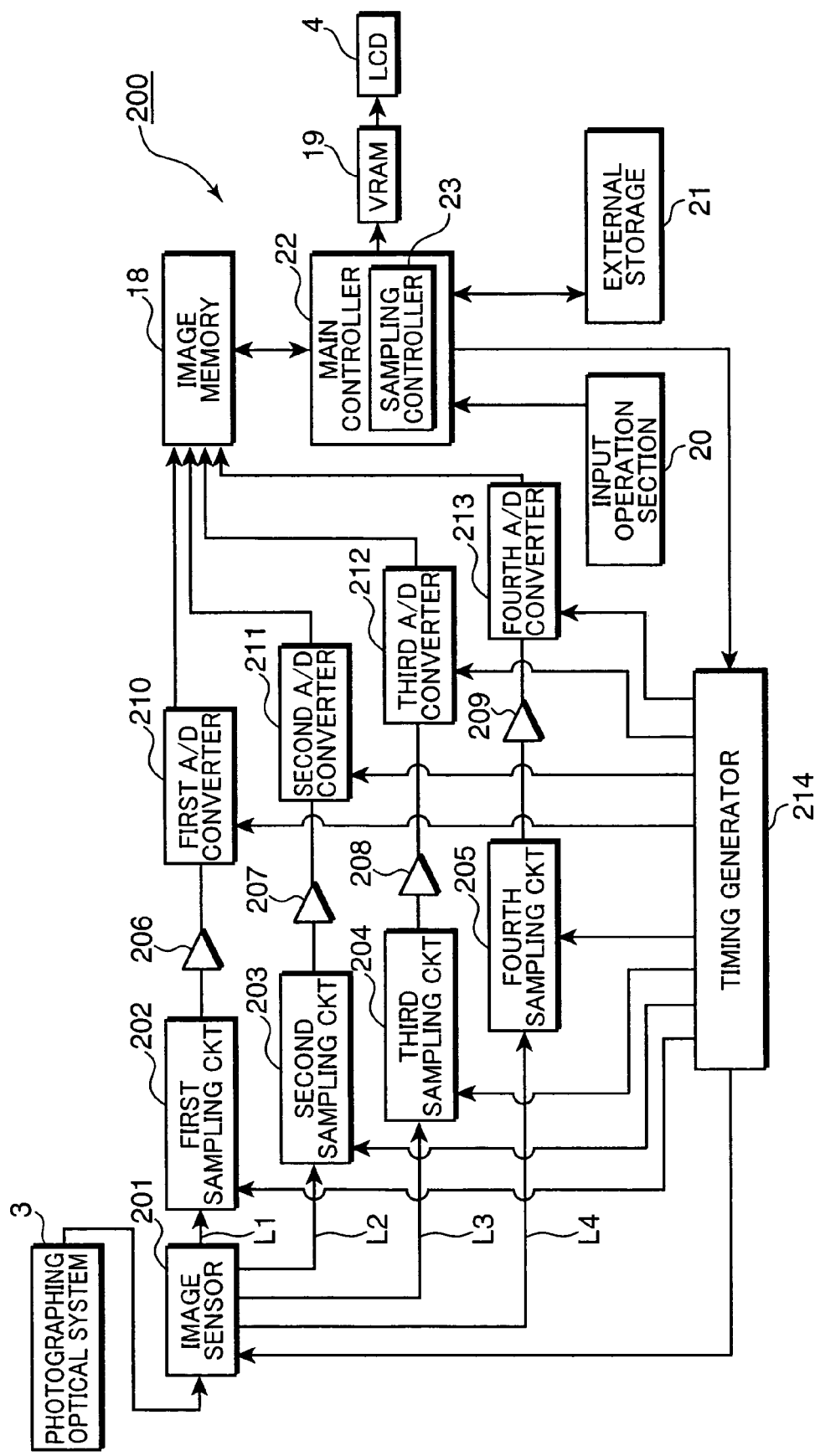
FIG. 17 is a block diagram showing an electrical configuration of an image sensing apparatus in the embodiment 1-4.

FIG. 17 is a block diagram showing an electrical configuration of the image sensing apparatus 200 in this embodiment. Since the image sensing apparatus 200 is substantially the same as the image sensing apparatus in the embodiment 1-1 except that an image sensor 201 of the image sensing apparatus 200 is a CMOS sensor, and that the sampling circuits and the relevant parts thereof are provided in correspondence to the pixel groups as mentioned above, merely the different points in this embodiment from the embodiment 1-1 are described. Elements in FIG. 17 which are identical or equivalent to those in the embodiment 1-1 are indicated by the same reference numerals.

As shown in FIG. 17, the image sensing apparatus 200 is provided with a first sampling circuit 202, a second sampling circuit 203, a third sampling circuit 204, a fourth sampling circuit 205, a first amplifier 206, a second amplifier 207, a third amplifier 208, a fourth amplifier 209, a first A/D converter 210, a second A/D converter 211, a third A/D converter 212, and a fourth A/D converter 213 in correspondence to a white pixel group, a red pixel group, a green pixel group, and a blue pixel group of the image sensor 201, respectively. Pixel signals generated in the respective pixel groups are outputted to the respective corresponding sampling circuits via signal lines L1, L2, L3, and L4 which serve as signal paths and are provided different from each other. Functions of the first to the fourth sampling circuits 202 to 205, the first to the fourth amplifiers 206 to 209, and the first to the fourth A/D converters 210 to 213 are substantially the same as the corresponding ones in the embodiment 1-1.

Figures 18A, 18B:
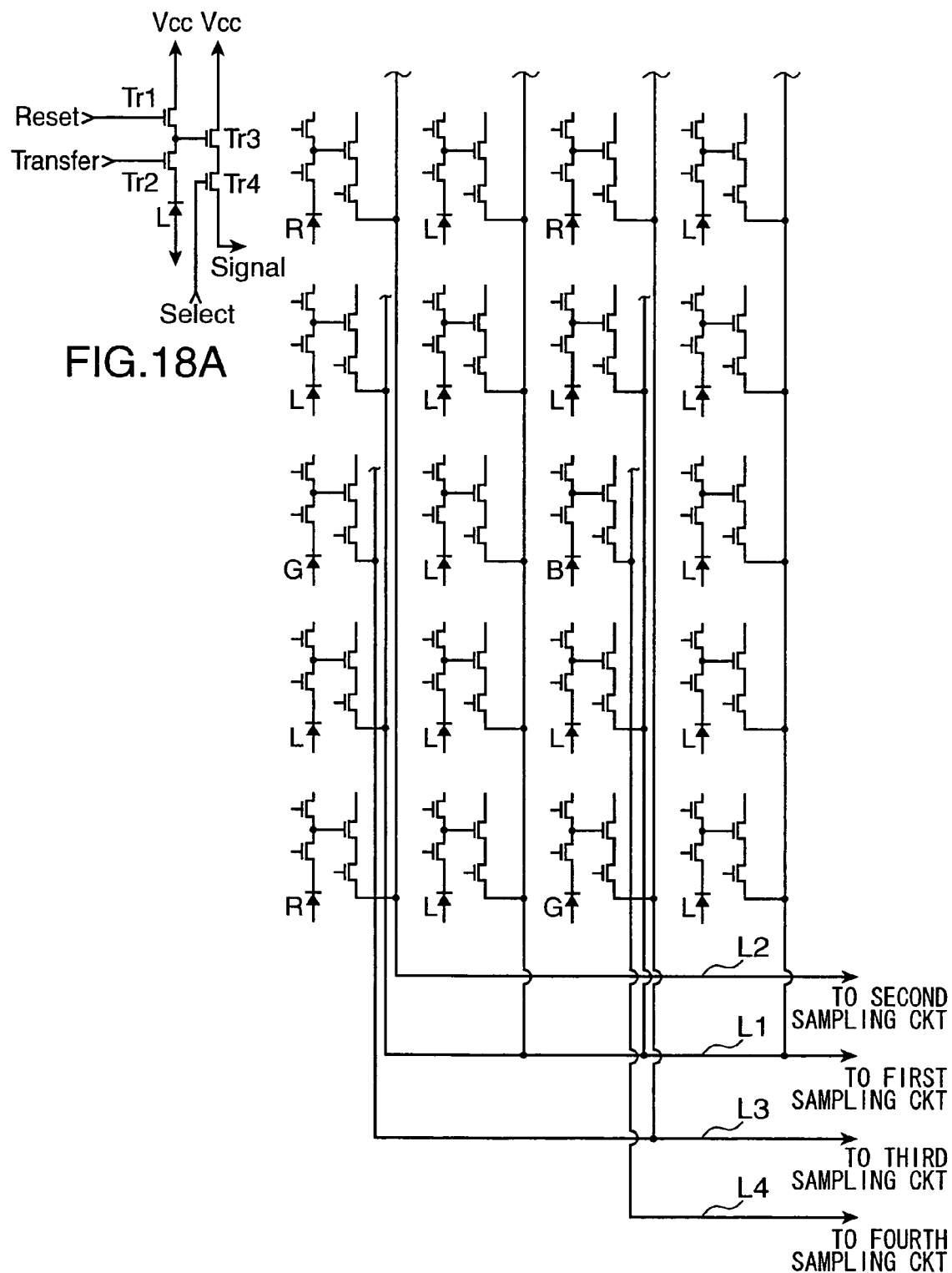
FIG. 18A and FIG. 18B are diagrams showing arrangements of an image sensor in the embodiment 1-4.

FIGS. 18A and 18B are diagrams showing an arrangement of the image sensor 201 in this embodiment. As shown in FIG. 18A, the pixel configuration of the image sensor 201 is substantially the same as the pixel configuration in the embodiment 1-3 which has been described referring to FIG. 13 except for the following. Specifically, as shown in FIG. 18B, the signal lines L1 to L4 are provided in correspondence to the pixel groups. An output terminal of a transistor Tr4 in the respective pixels is connected to the corresponding signal line depending on the kinds of the pixel groups so that the pixel signals generated in the respective pixels are outputted to the corresponding sampling circuit via the signal line connected to the respective pixels.

Specifically, an output terminal of a transistor Tr4 of a white pixel indicated by "L" in FIG. 18B is connected to the signal line L1, and a pixel signal generated in the white pixel "L" is outputted to the first sampling circuit 202 via the signal line L1. An output terminal of a transistor Tr4 of a red color pixel indicated by "R" in FIG. 18B is connected to the signal line L2, and a pixel signal generated in the red color pixel "R" is outputted to the second sampling circuit 203 via the signal line L2. An output terminal of a transistor Tr4 of a green color pixel indicated by "G" in FIG. 18B is connected to the signal line L3, and a pixel signal generated in the green color pixel "G" is outputted to the third sampling circuit 204 via the signal line L3. An output terminal of a transistor Tr4 of a blue color pixel indicated by "B" in FIG. 18B is connected to the signal line L4, and a pixel signal generated in the blue color pixel "B" is outputted to the fourth sampling circuit 205 via the signal line L4.

In the embodiment 1-3, since there exists a switchover period required in switching over readout of a pixel signal from a white pixel to a green color pixel, a response delay may occur during the switchover period. In this embodiment, however, the pixel signals generated in the respective pixel groups are outputted to the corresponding sampling circuit individually with respect to each of the kinds of the pixel groups. Accordingly, this arrangement is free from occurrence of the switchover period, thereby completely eliminating the drawback involved in the response delay.

Embodiment 1-5

The arrangement pattern on white pixels and color pixels is not limited to the one shown in FIG. 4. For instance, the following arrangement patterns may be adopted. The same idea is applied to the second and the third embodiments as well as to the first embodiment.

Figure 19:
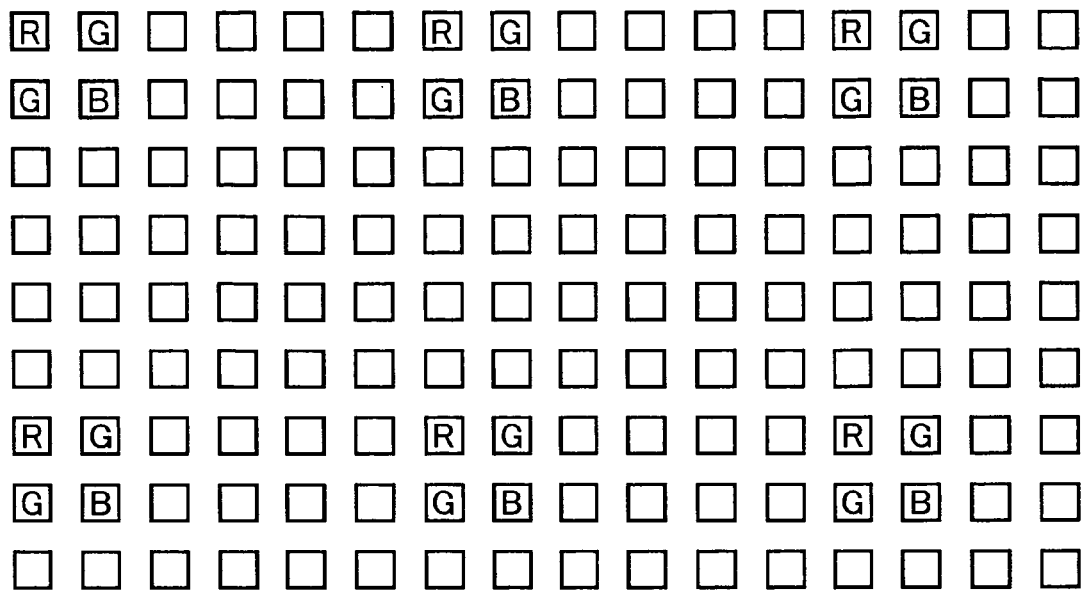
FIGS. 19 through 31 are diagrams showing altered arrangement patterns on color pixels and white pixels in the embodiment 1-5.

The arrangement pattern on color pixels shown in FIG. 19 is an example, wherein pixel units each consisting of a predetermined number of color pixels of the color components of R, G, and B depending on the kinds of the color filters are arranged discretely relative to white pixels. Specifically, FIG. 19 is an example, wherein color pixel units each consisting of four color pixels are arranged at an interval corresponding to a predetermined number of white pixels (in FIG. 19, four white pixels) in row and column directions, and each of the color pixel units is arranged in a Bayer matrix that the color pixels of R, G, and B are arranged with a ratio of 1:2:1.

Figure 20:
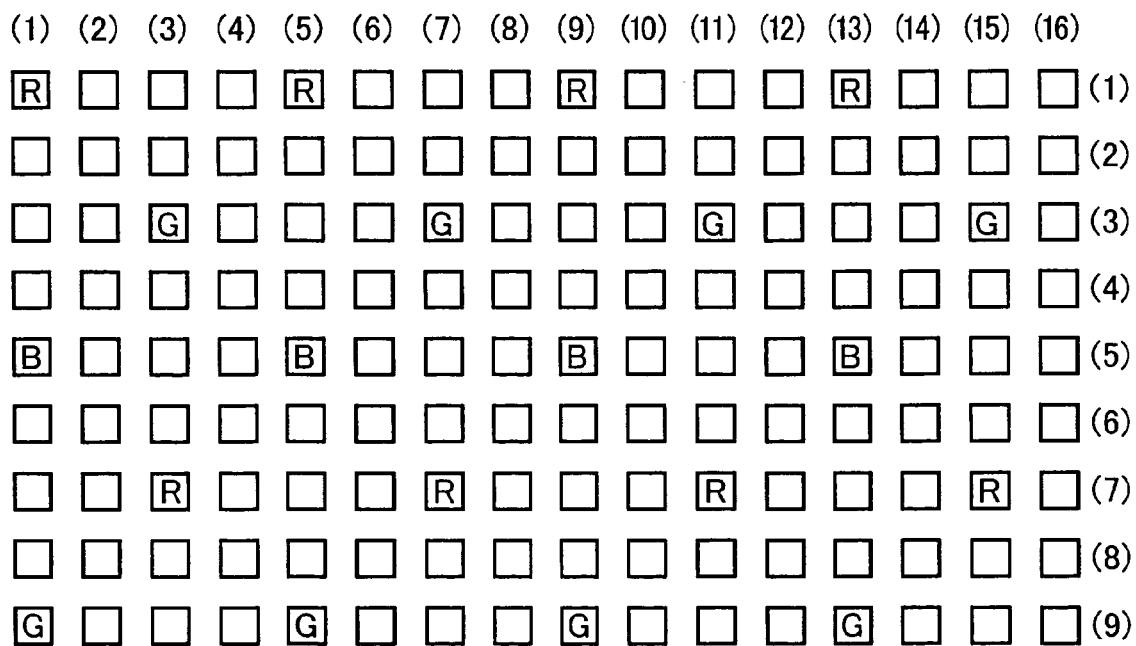

The arrangement pattern on color pixels shown in FIG. 20 is an example, wherein, assuming that numbers are attached to pixels from the leftmost and uppermost pixel in row and column directions, the color pixels are located at a coordinate position (4m+1, 4n+1) where "m" and "n" are integers, or at a coordinate position (4m+3, 4n+3) where "m" and "n" are integers; the color pixels of the same color component are arranged in the row directions; and the color pixels of R, G, and B are sequentially repeated in the column directions.

Figures 21, 22:
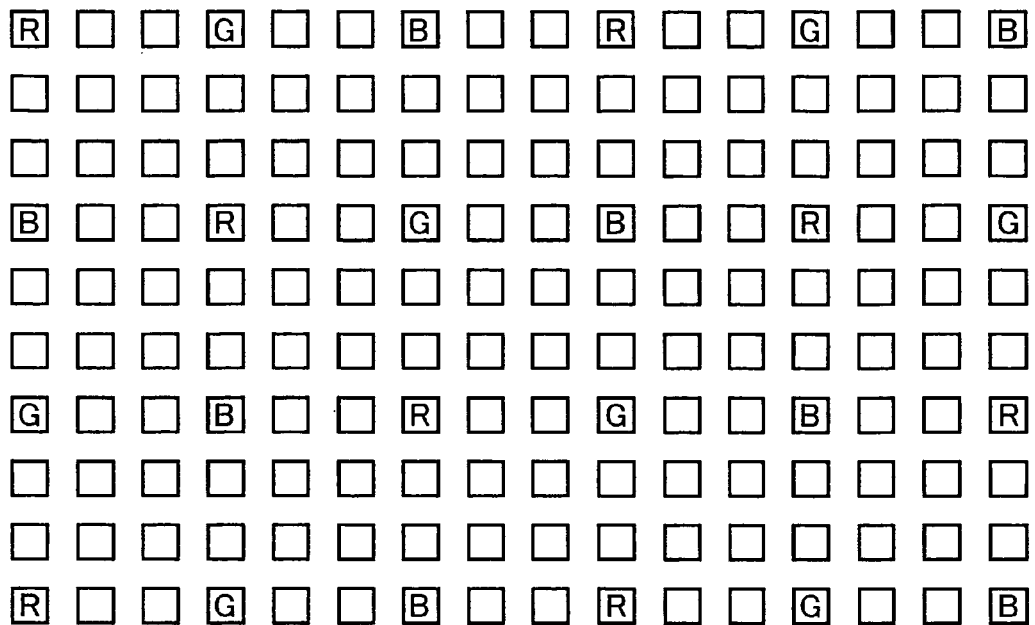

The arrangement pattern on color pixels shown in FIG. 21 is an example, wherein the color pixels are arranged at every other predetermined number of white pixels (in FIG. 21, at every other two white pixels) in row and column directions, and the color pixels of R, G, and B are sequentially repeated in the column and row directions.

The arrangement pattern on color pixels shown in FIG. 22 is an example, wherein, assuming that numbers are attached to pixels from the leftmost and uppermost pixel in row and column directions, the color pixels are located at a coordinate position (4m+1, 4n+1) where "m" and "n" are integers, or at a coordinate position (4m+3, 4n+3) where "m" and "n" are integers; the color pixels of the same color component are arranged in the column directions; and the color pixels of R, G, and B are sequentially repeated in the row directions.

Figure 23:
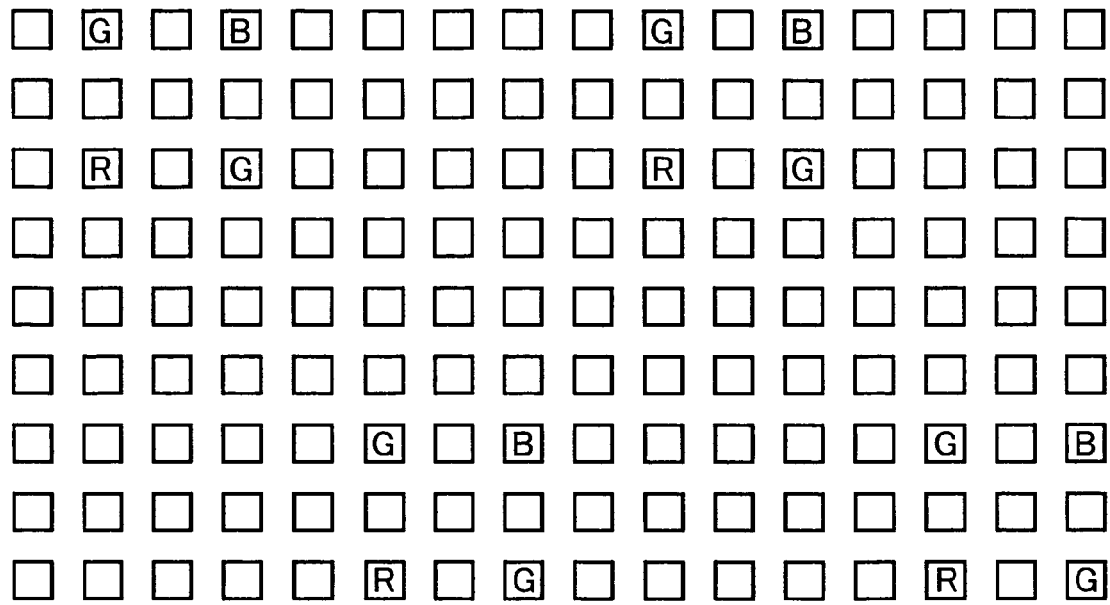

The arrangement pattern on color pixels shown in FIG. 23 is an example, wherein pixel units each consisting of "n" pixels in a column direction and "n" pixels in a row direction (in FIG. 23, "n" is three) including color pixels of R, G, and B which are arranged in a Bayer matrix at corner positions of the pixel unit are arranged in a row direction at an interval corresponding to a predetermined number of white pixels (in FIG. 23, five white pixels) to form pixel arrays each consisting of three pixel rows; the pixels arrays are arranged in the column direction at an interval corresponding to a predetermined number of rows of white pixels (in FIG. 23, three rows of white pixels); and the vertically adjacent pixel units are displaced from each other in the row direction by a certain number of pixels (in FIG. 23, by one pixel).

Figure 24:
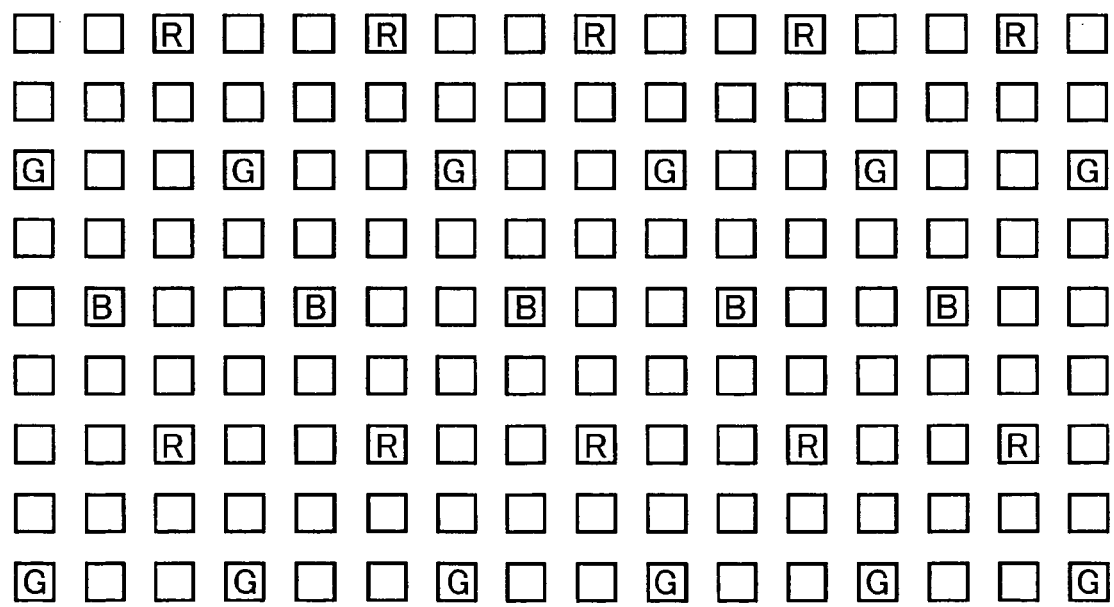

The arrangement pattern on color pixels shown in FIG. 24 is an example, wherein rows of pixels each including color pixels of the same color component arranged at every other predetermined number of white pixels (in FIG. 24, at every other two white pixels) are arranged in a column direction with respect to each of the color components of R, G, and B; the pixel rows are arranged in the column direction at an interval corresponding to "n" rows of white pixels (in FIG. 24, one row of white pixels); and the color pixels of R, G, and B are displaced one from another in the row direction.

Figure 25:
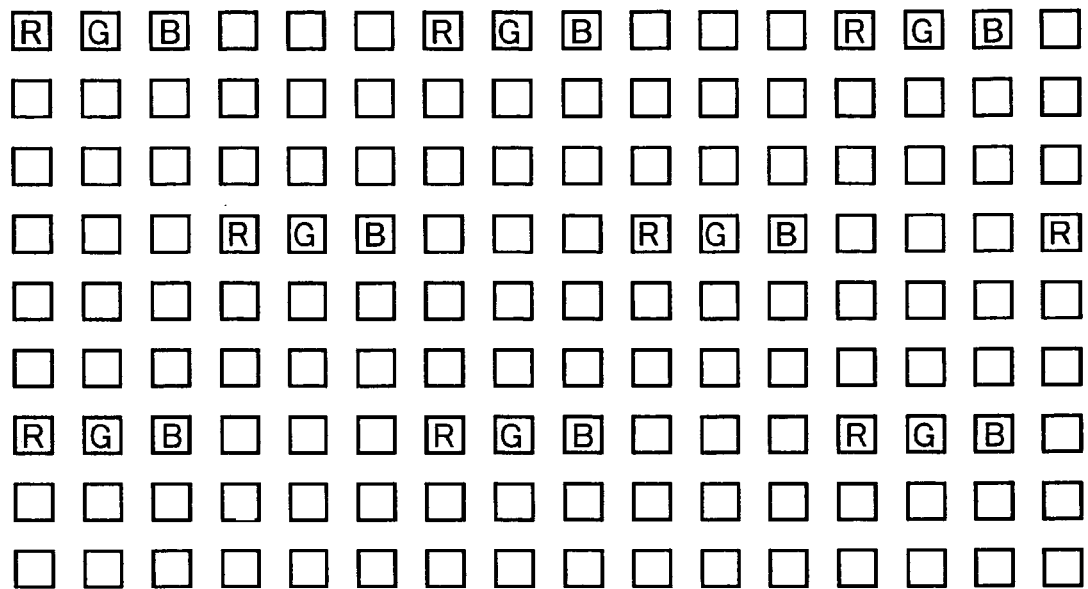

The arrangement pattern on color pixels shown in FIG. 25 is an example, wherein a certain number of color pixel units each consisting of a red color pixel, a green color pixel, and a blue color pixel arranged in this order are arranged in a row direction at every other predetermined number of white pixels (in FIG. 25, at every other three white pixels) to form rows of pixels; the pixel rows including the color pixel units are arranged in a column direction at an interval corresponding to a predetermined number of rows of white pixels (in FIG. 25, two rows of white pixels); and the color pixel units in the vertically adjacent two pixel rows are repeated in the row direction.

Figure 26:
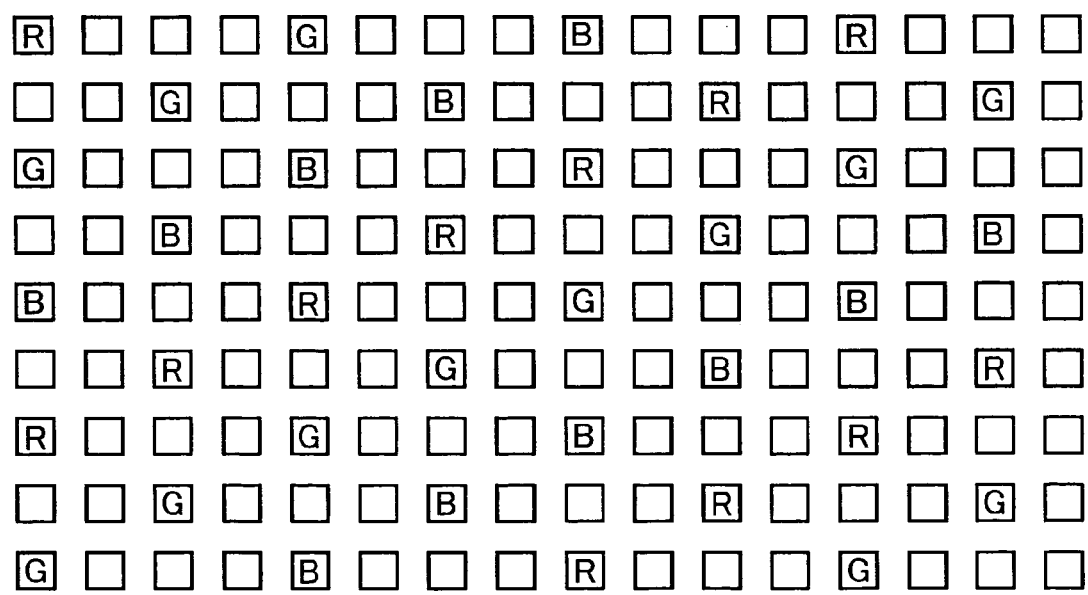

The arrangement pattern on color pixels shown in FIG. 26 is an example, wherein color pixels of R, G, and B are arranged in row and column directions at every other predetermined number of white pixels (in FIG. 26, at every other three white pixels in the row directions, and at every other white pixel in the column directions).

Figure 27:
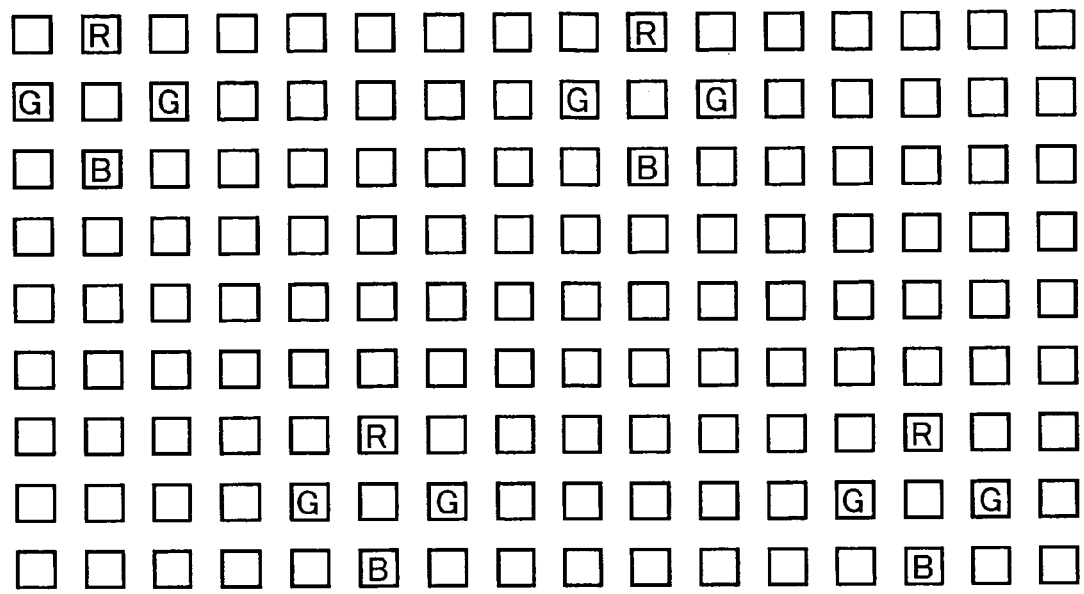

The arrangement pattern on color pixels shown in FIG. 27 is an example, wherein concerning pixel units each consisting of "n" pixels in a column direction and "n" pixels in a row direction, which has been defined to describe the color pixel arrangement pattern in FIG. 23, the pixel unit includes color pixels of R, G, and B which are arranged at middle positions of four sides of a square defined by the pixel unit i.e. the color pixels defining a rhombus-shaped pattern, in place of arranging the color pixels at the corner portions of the pixel unit. In FIG. 27, pixels at two apex positions horizontally opposed to each other in the rhombus shaped pattern of each of the pixel units are green color pixels, a pixel at an upper apex position thereof is a red color pixel, and a pixel at a lower apex position thereof is a blue color pixel.

Figure 28:
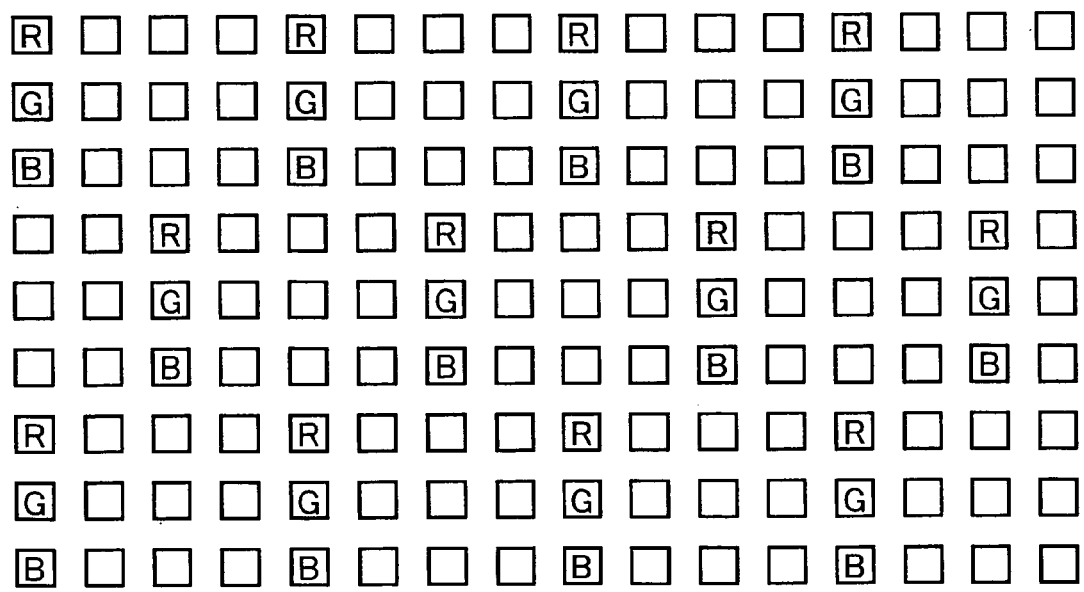

The arrangement pattern on color pixels shown in FIG. 28 is an example, wherein a certain number of color pixel units each consisting of a red color pixel, a green color pixel, and a blue color pixel arranged in this order are arranged in a column direction at every other predetermined number of white pixels (in FIG. 27, at every other three white pixels) to form columns of pixels; the pixel columns including the color pixel units are arranged in a row direction at an interval corresponding to a predetermined number of columns of white pixels (in FIG. 28, one column of white pixels), and the color pixel units in the horizontally adjacent two pixel columns are repeated in the column direction.

Figure 29:
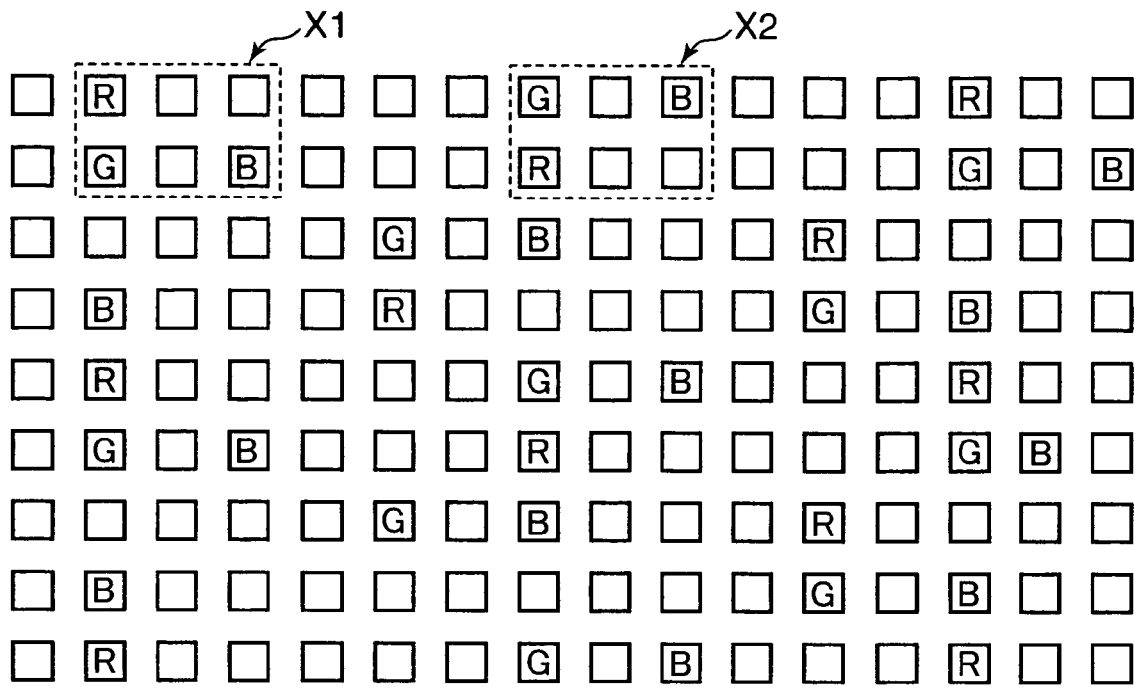

The arrangement pattern on color pixels shown in FIG. 29 is an example, wherein first pixel units X1 each including a green color pixel, a red color pixel located at an upper position relative to the green color pixel, and a blue color pixel located at a right position relative to the green color pixel, with a white pixel interposed between the green color pixel and the blue color pixel; and second pixel units X2 each including a green color pixel, a red color pixel located at a lower position relative to the green color pixel, and a blue color pixel located at a right position relative to the green color pixel, with a white pixel interposed between the green color pixel and the blue color pixel, are alternately arranged in a row direction at an interval corresponding to a predetermined number of columns of white pixels (in FIG. 29, three columns of white pixels) to form pixel arrays; the pixel arrays each including the first pixel units X1 and the second pixel units X2 are arranged in a column direction; and the lower-located pixel unit is displaced in a row direction (in FIG. 29, in a leftward direction) from the upper-located pixel unit by an interval corresponding to a certain number of white pixels (in FIG. 29, two white pixels) with respect to each set of the vertically adjacent two pixel arrays.

Figure 30:
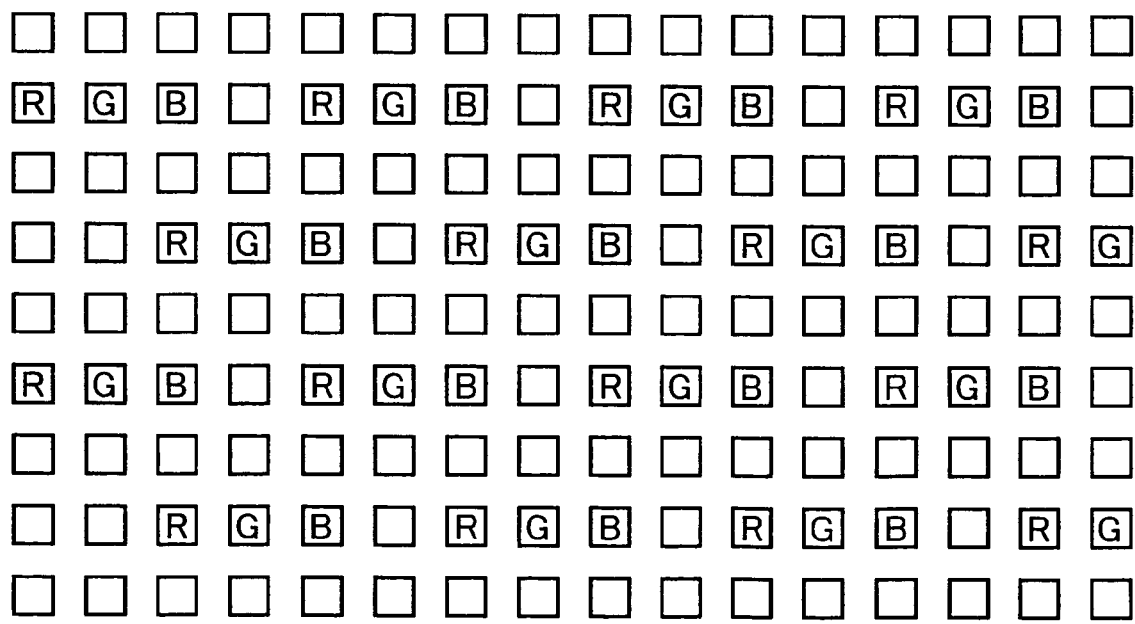

The arrangement pattern on color pixels shown in FIG. 30 is an example, wherein a certain number of color pixel units each consisting of a red color pixel, a green color pixel, and a blue color pixel arranged in this order are arranged in a row direction at every other predetermined number of white pixels (in FIG. 30, at every other white pixel) to form rows of pixels; the pixel rows including the color pixel units are arranged in a column direction at an interval corresponding to a predetermined number of rows of white pixels (in FIG. 30, one row of white pixels); and the pixel at an end of each of the color pixel units in one of the vertically adjacent two pixel rows is located in the row direction at the same position as the pixel at the opposite end of the corresponding color pixel unit in the other one of the vertically adjacent two pixel rows.

Figure 31:
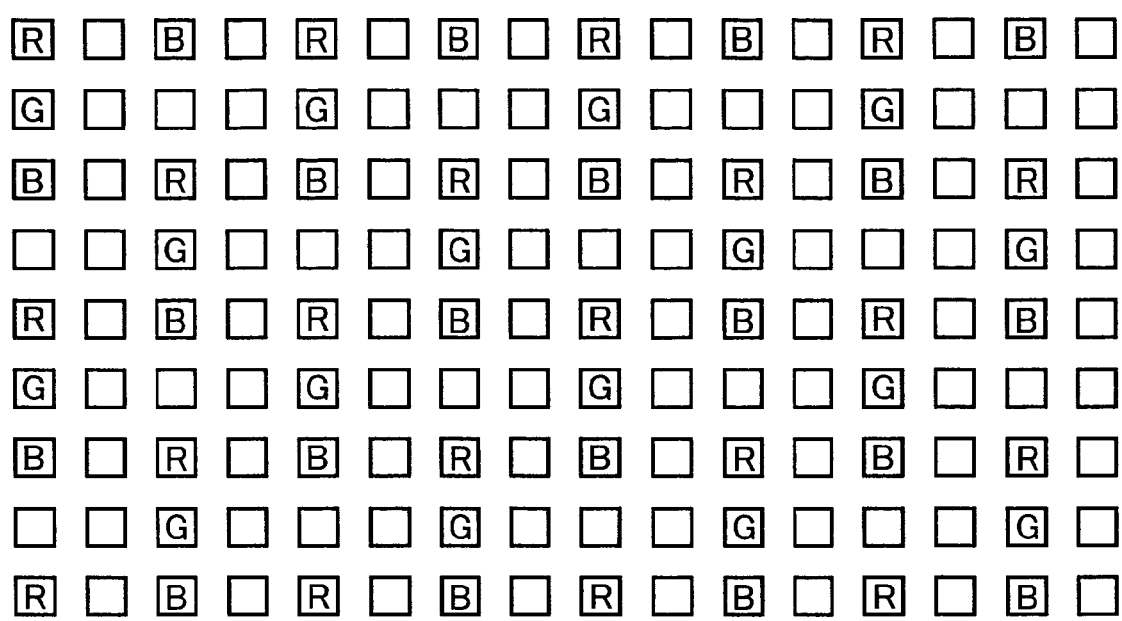

The arrangement pattern on color pixels shown in FIG. 31 is an example, wherein a certain number of color pixel units each consisting of a red color pixel, a green color pixel, and a blue color pixel arranged in this order are arranged in a column direction at every other predetermined number of white pixels (in FIG. 31, at every other white pixel) to form columns of pixels; the pixel columns including the color pixel units are arranged in a row direction at an interval corresponding to a predetermined number of columns of white pixels (in FIG. 31, one column of white pixels); and the pixel at an end of each of the color pixel units in one of the horizontally adjacent two pixel columns is located in the column direction at the same position as the pixel at the opposite end of the corresponding color pixel unit in the other one of the horizontally adjacent two pixel columns.

Second Embodiment

Embodiment 2-1

Figure 32:
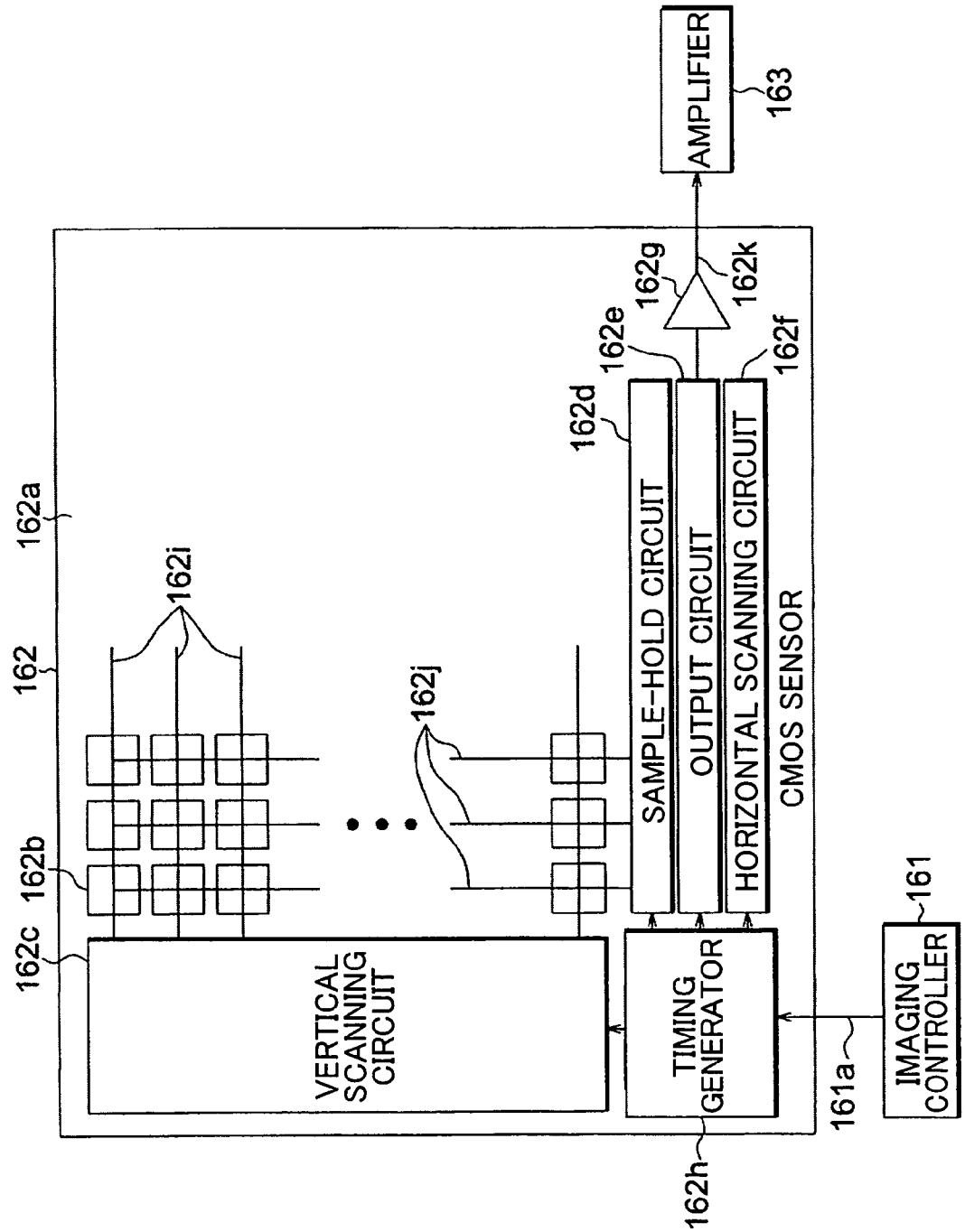
FIG. 32 is a block diagram showing an electrical configuration of a CMOS sensor in the embodiment 2-1.

FIG. 32 is a block diagram showing an arrangement of a CMOS sensor 162 used in the embodiment 2-1, as an example of an imaging unit in the second embodiment. The CMOS sensor 162 includes a number of pixels 162b arranged in a two dimensional matrix on an imaging plane 162a, a vertical scanning circuit 162c, a sample-hold circuit 162d, an output circuit 162e, an output amplifier 162g, a horizontal scanning circuit 162f, and a timing generator 162h. The rows of the pixels 162b and the vertical scanning circuit 162c are connected to a row selection line 162i. The columns of the pixels 162b and the sample-hold circuit 162d are connected to a vertical signal line 162j. Luminance filters or color filters are arranged on the respective pixels 162b.

An image pickup operation by the image sensor 162 is controlled by the timing generator 162h provided in the image sensor 162 in accordance with an imaging control signal 161a issued from an imaging controller 161. Image data 162k outputted from the image sensor 162 is outputted to an amplifier 163. The timing generator 162h functions as an exposure time controller in the embodiment of the invention.

The timing generator and the image sensor may be provided independently of each other. In the CMOS sensor, a controlling circuit such as the timing generator may be provided in an IC chip together with the pixels. In the embodiment 2-1, the pixels 162b and the timing generator 162h are mounted on the same IC chip, and the image sensor 162 functions as an imaging unit in the embodiment of the invention.

Figure 33:
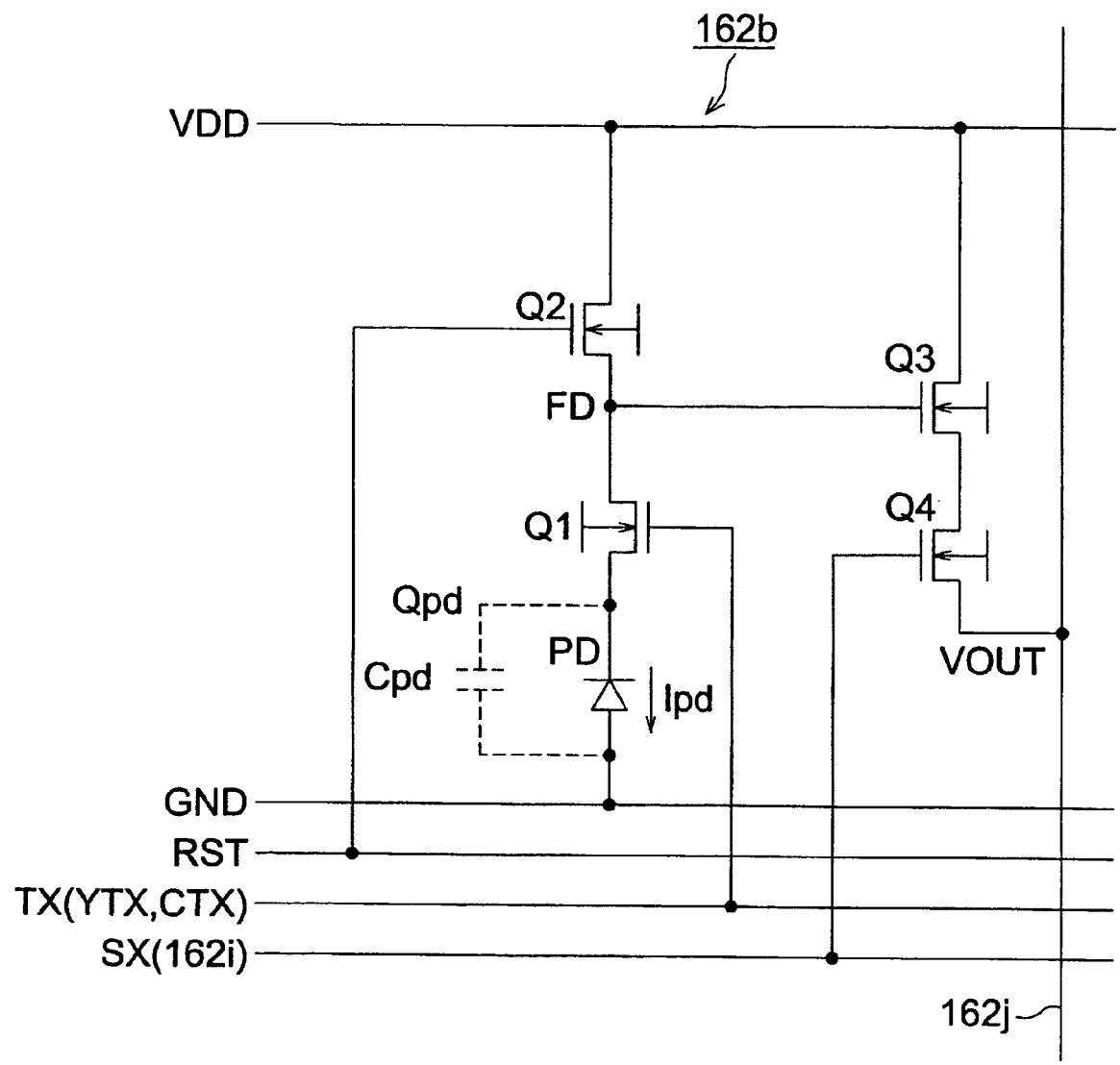
FIG. 33 is a diagram showing a circuit configuration of a pixel of the CMOS sensor in the embodiment 2-1.

FIG. 33 is a diagram showing an example of a circuit configuration of the pixel 162b of the CMOS sensor 162. The pixel 162b includes an embedded photodiode PD (hereinafter, called as "PD portion"), and N-channel MOSFETs (metal oxide semiconductor field effect transistors, hereinafter, called as "transistors") Q1 through Q4. A connecting portion between a drain of the transistor Q1 and a source of the transistor Q2 is a floating diffusion portion (FD, hereinafter, called as "FD portion"), and has a so-called complete transfer structure. A reset signal RST, a transfer signal TX, and a readout signal SX respectively denote signals i.e. potentials to the respective transistors, VDD denotes a power source voltage, and GND denotes the ground.

The PD portion photoelectrically converts incident light from an object, and generates a photocurrent Ipd commensurate with the amount of the incident light. The photocurrent Ipd is accumulated in a parasitic capacitance of the PD portion, as a signal charge Qpd. The PD portion has an embedded structure, and cannot directly extract the photocurrent Ipd obtained by the photoelectric conversion. Accordingly, the PD portion is connected to the FD portion via the transistor Q1, which is called as a transfer gate (hereinafter, called as "transfer gate Q1").

In an image pickup operation, setting the transfer signal TX to a low potential L turns the transfer gate Q1 off, thereby accumulating the signal charge Qpd in the parasitic capacitance of the PD portion. In transferring a signal, setting the transfer signal TX to a high potential H turns the transfer gate Q1 on, thereby completely transferring the signal charge Qpd to the FD portion. In the image sensor 162 of the embodiment 2-1, a transfer signal YTX (hereinafter, called as "white pixel control line YTX") of a white pixel, and a transfer signal CTX (hereinafter, called as "color pixel control line CTX") of a color pixel are individually controllable. According, by setting an accumulation time for the signal charge Qpd of a color pixel in an image pickup operation, i.e., an exposure time for a color pixel longer than an exposure time for a white pixel, a lower sensitivity of the color pixel can be compensated.

The transistor Q2 is called as a reset gate (hereinafter, called as "reset gate Q2"), and is controlled by the reset signal RST. Turning on of the reset gate Q2 resets the FD portion to the power source voltage VDD.

The transistor Q3 has a source follower amplifying circuit. Amplifying a current to be applied to a potential Vfd of the FD portion enables to lower an output impedance.

The transistor Q4 is a transistor for reading an output from a pixel. The transistor Q4 has a gate connected to the row selection line 162*i*, and functions as a switch which is turned on or off in response to the readout signal SX applied thereto by the vertical scanning circuit 162*c*. The source of the transistor Q4 is connected to the vertical signal line 162*j*. When the transistor Q4 is turned on, the potential Vfd of the FD portion is outputted to the vertical signal line 162*j* as a pixel output VOUT through a lowered impedance at the transistor Q3.

Figure 34A:
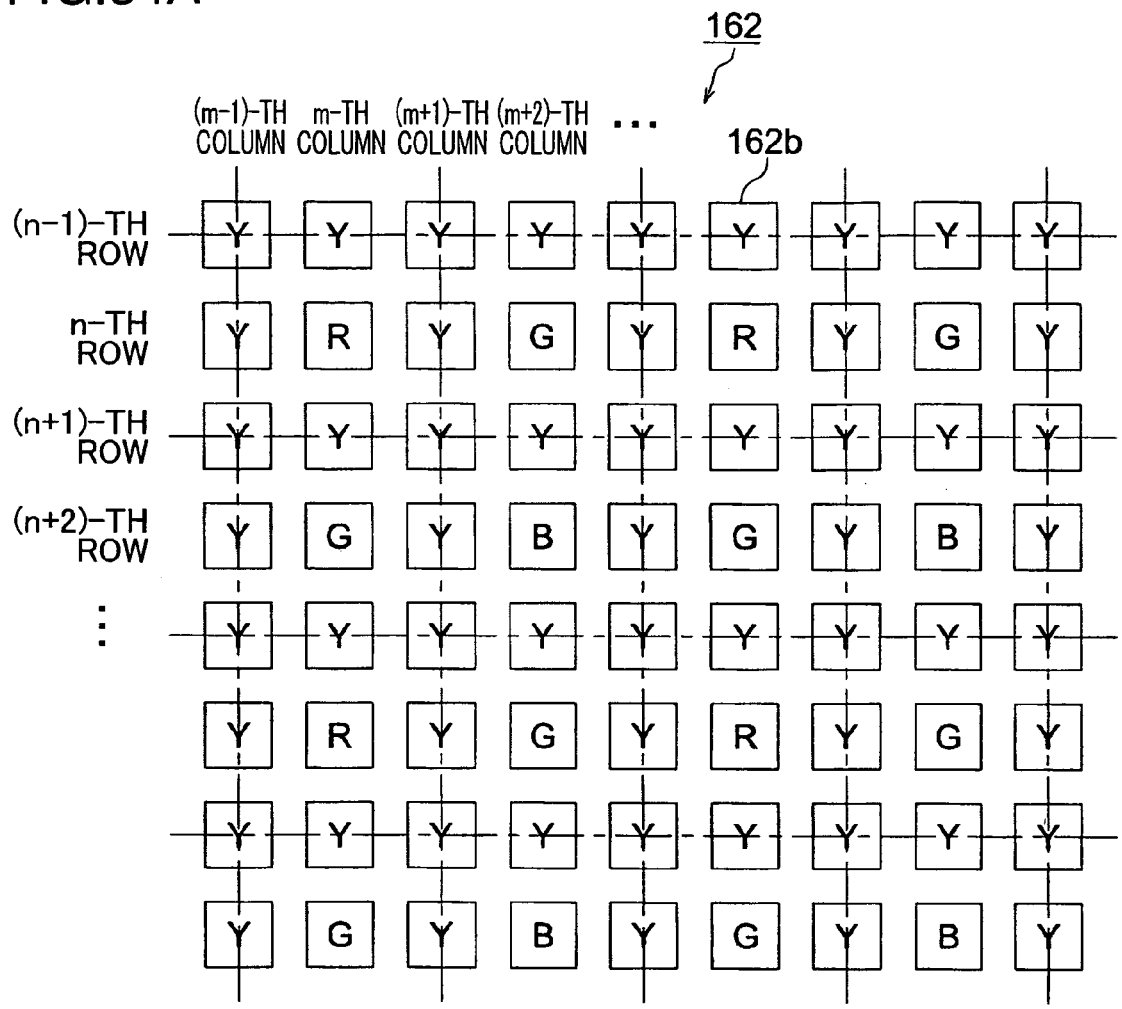
FIGS. 34A and 34B are diagrams showing examples of a filter arrangement of the image sensor in the embodiment 2-1.
Figure 34B:
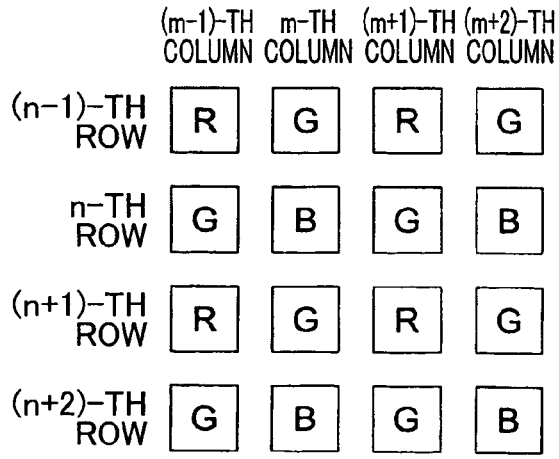

Now, an arrangement on the luminance filters and the color filters of the image sensor 162 is described. FIGS. 34A and 34B are diagrams showing a part of a filter arrangement of the image sensor 162. As shown in FIG. 34A, the image sensor 162 includes the pixels 162*b* arranged in a two-dimensional matrix, wherein the luminance filter Y, or one of the color filters R, G, and B capable of transmitting exclusively the corresponding color component of R, G, B is arranged on the respective pixels 162*b*. The pixels where the luminance filters Y are disposed are called as white pixels, and the pixels where the color filters R, G, and B are called as color pixels.

Referring to FIG. 34A, pixels at odd rows such as the (n−1)-th row or the (n+1)-th row, and pixels at odd columns such as the (m−1)-th column or the (m+1)-th column are white pixels where the luminance filters Y are disposed. Pixels at even rows such as the n-th row or the (n+2)-th row, and pixels at even columns such as the m-th column or the (m+2)-th column, in other words, pixels where the luminance filters Y are not disposed, are color pixels where the color filters R, G, and B are arranged in the same order as that of a Bayer matrix.

Examples of the luminance filters Y are ND filters, transparent filters, white color filters, gray filters, and visual sensitivity correction filters. Also, an arrangement in which no filter is provided on a surface of a photoelectric conversion area of pixels to allow light to be directly incident onto the photoelectric conversion area is equivalent to an arrangement provided with transparent filters.

Figure 35:
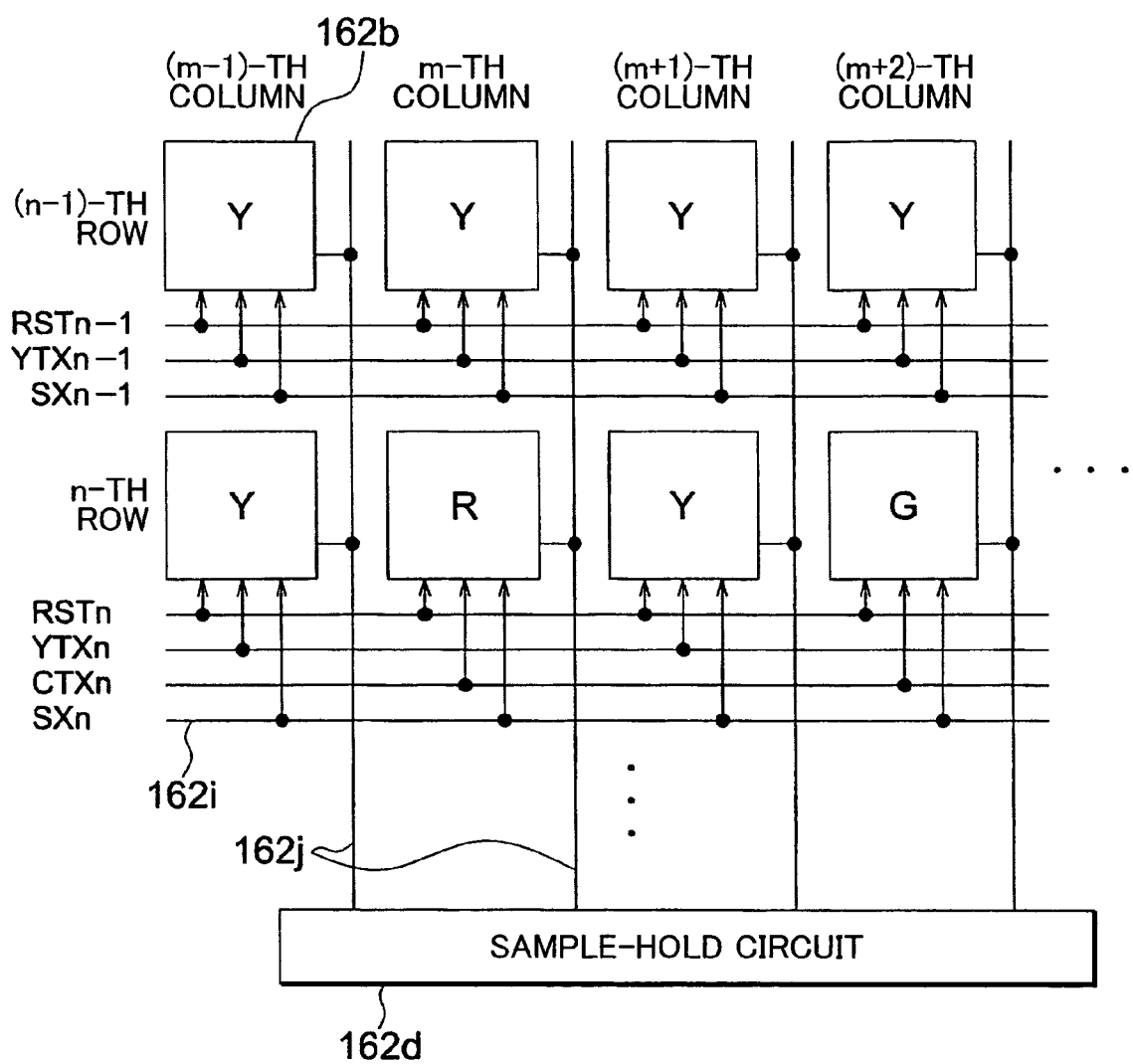
FIG. 35 is a circuit block diagram showing a manner of driving pixels of the image sensor in the embodiment 2-1.

FIG. 35 is a circuit block diagram showing a manner of driving the respective pixels shown in FIG. 33. A white pixel at the (n−1)-th row in FIG. 34A where a luminance filter Y is disposed is connected to a reset signal line RSTn−1, a white pixel control line YTXn−1, and a readout signal line SXn−1. A white pixel at the n-th row in FIG. 34A where a luminance filter Y is disposed is connected to a reset signal line RSTn, a white pixel control line YTXn, and a readout signal line SXn. A color pixel where one of the color filters R, G, and B is disposed is connected to a reset signal line RSTn, a color pixel control line CTXn, and a readout signal SXn.

Specifically, two control lines i.e. the white pixel signal line YTXn and the color pixel control line CTXn are connected to the n-th row of pixels including the white pixels and the color pixels. With this arrangement, accumulation times of signal charges from the white pixels and from the color pixels i.e. exposure times can be controlled independently of each other. Setting an exposure time for the color pixels longer than the exposure time for the white pixels enables to compensate for a lower sensitivity of the color pixels.

Figure 36:
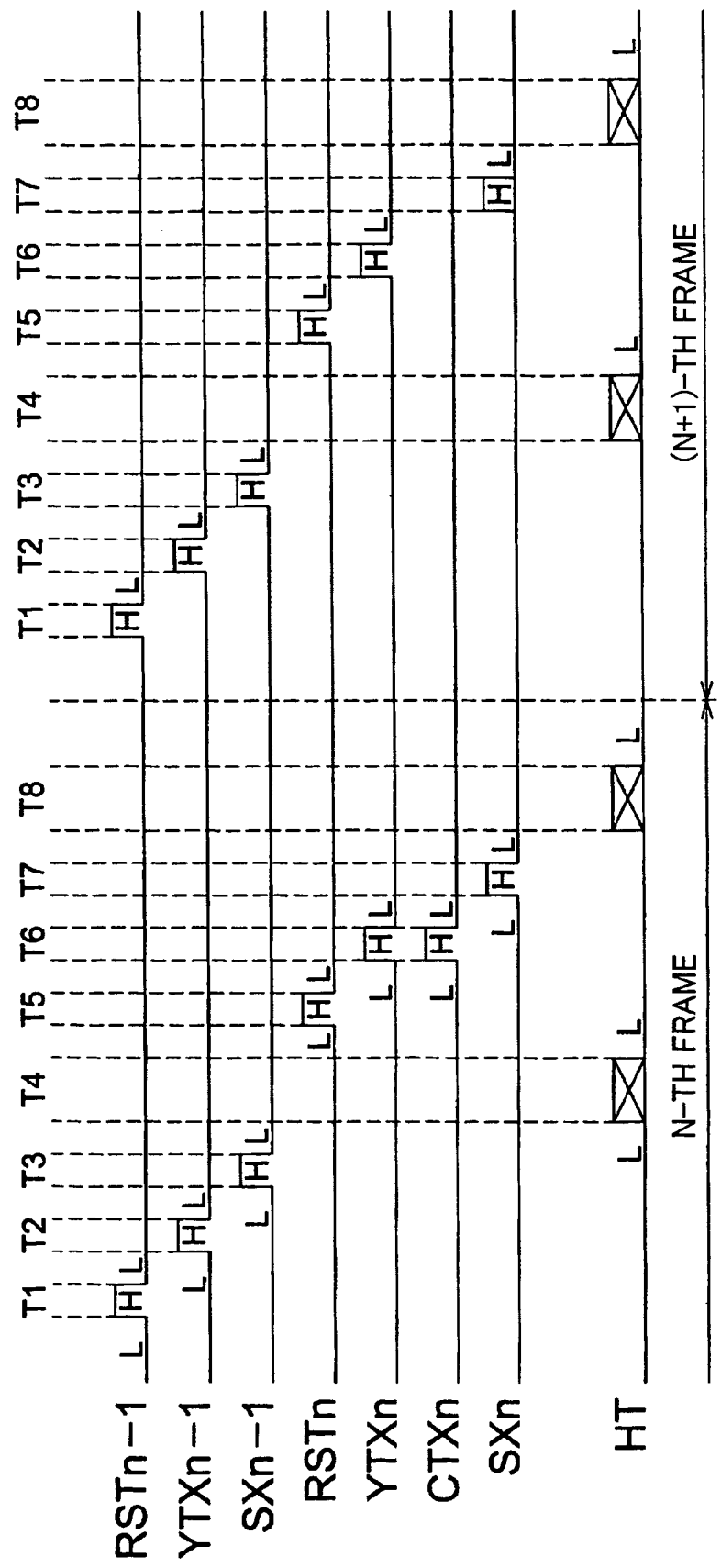
FIG. 36 is a timing chart showing an image pickup operation of the image sensor in a moving image photographing or a live-view image display in the embodiment 2-1.

FIG. 36 is a timing chart showing an image pickup operation of the image sensor in a moving image photographing or a live-view display in the circuit block diagram shown in FIG. 35. The image pickup operation in this embodiment is a so-called rolling shutter image pickup operation of performing an exposure in a frame rate at every row of pixels in the image sensor.

In an image pickup operation concerning the N-th frame of images where N is a positive integer, setting the reset signal line RSTn−1 at the (n−1)-th row of pixels to a high potential H at a timing T1 turns on the reset gates Q2 of the respective pixels at the (n−1)-th row, thereby resetting the FD portions of the respective pixels at the (n−1)-th row to the power source voltage VDD. Then, setting the white pixel control line YTXn−1 at the (n−1)-th row of pixels to a high potential H at a timing T2 turns on the transfer gates Q1 of the respective pixels at the (n−1)-th row, thereby completely transferring the signal charges Qpd accumulated in the PD portions of the respective pixels at the (n−1)-th row to the FD portions.

Then, setting the readout signal line STXn−1 at the (n−1)-th row of pixels to a high potential H at a timing T3 allows for output of the potentials at the FD portions of the respective pixels at the (n−1)-th row, i.e. image data of the respective pixels at the (n−1)-th row to the vertical signal line 162*j* for storage into the sample-hold circuit 162*d*. Subsequently, the image data of all the pixels at the (n−1)-th row is outputted to the amplifier 163 at a timing T4 in accordance with a horizontal transfer signal HT.

Then, setting the reset signal line RSTn at the n-th row of pixels to a high potential H at a timing T5 turns on the reset gates Q2 of the respective pixels at the n-th row, thereby resetting the FD portions of the respective pixels at the n-th row to the power source voltage VDD. Then, setting the white pixel control line YTXn at the n-th row and the color pixel control line CTXn at the n-th row to a high potential H at a timing T6 turns on the transfer gates Q1 of all the pixels including the white pixels and the color pixels at the n-th row, thereby completely transferring the signal charges Qpd accumulated in the PD portions of all the pixels at the n-th row to the FD portions.

Then, setting the readout signal line SXn at the n-th row to a high potential H at a timing T7 allows for output of the potentials at the FD portions of the respective pixels at the n-th row, i.e. image data of the respective pixels at the n-th row to the vertical signal line 162*j* for storage into the sample-hold circuit 162*d*. Subsequently, the image data of all the pixels at the n-th row is outputted to the amplifier 163 at a timing T8 in accordance with a horizontal transfer signal HT. The above operation is conducted with respect to all the pixel rows of the image sensor 162, thereby completing the image pickup operation of the N-th frame of images. In a general moving image photographing, the image pickup operation concerning the N-th frame of images is repeated a certain number of times.

Next, an image pickup operation concerning the (N+1)-th frame of images is conducted. The image pickup operation is substantially the same as the aforementioned image pickup operation concerning the N-th frame of images except for the following. At the (N+1)-th frame of images, merely the white pixel control line YTxn at the n-th row is set to a high potential H at a timing T6 to turn on the transfer gates Q1 of the white pixels at the n-th row, thereby completely transferring the signal charges Qpd accumulated in the PD portions of the white pixels at the n-th row to the FD portions.

At this time, since the color pixel control line CTXn at the n-th row is kept to a low potential L, the operation of accumulating the signal charges Qpd in the PD portions of the color pixels at the N-th row is continued without transferring the signal charges Qpd to the FD portions. Thus, the exposure time for the color pixels is extended, and the sensitivity of the color pixels is enhanced. Specifically, the exposure time for the white pixels corresponds to one frame rate from a falling of the timing T2 in the image pickup operation for the N-th frame to a rising of the timing T2 in the image pickup operation for the (N+1)-th frame, and the exposure time for the color pixels corresponds to two frame rates from the falling of the timing T2 in the image pickup operation for the N-th frame to a rising (not shown) of the timing T2 in the image pickup operation for the (N+2)-th frame.

Also, since the FD portions of the color pixels at the n-th row are reset to the power source voltage VDD, the potentials at the FD portions of the color pixels at the n-th row, i.e., image data is dark data. The dark data is handled as invalid data by an unillustrated image processor to be described later. For instance, the dark data is replaced by image data of color pixels obtained in the image pickup operation one frame before the (N+1)-th frame i.e. N-th frame.

As mentioned above, in the moving image photographing, image data of white pixels are outputted with respect to all the frames of images, and image data of color pixels are outputted every other frame, thereby extending the exposure time for the color pixels, as compared with the exposure time for the white pixels. This arrangement enables to prevent so-called "whiteout", i.e. an overexposed appearance of an image, or degraded color reproduction by canceling a sensitivity difference between white pixels and color pixels, and to provide an image sensor and an image sensing apparatus capable of performing high-quality photographing.

Figure 37:
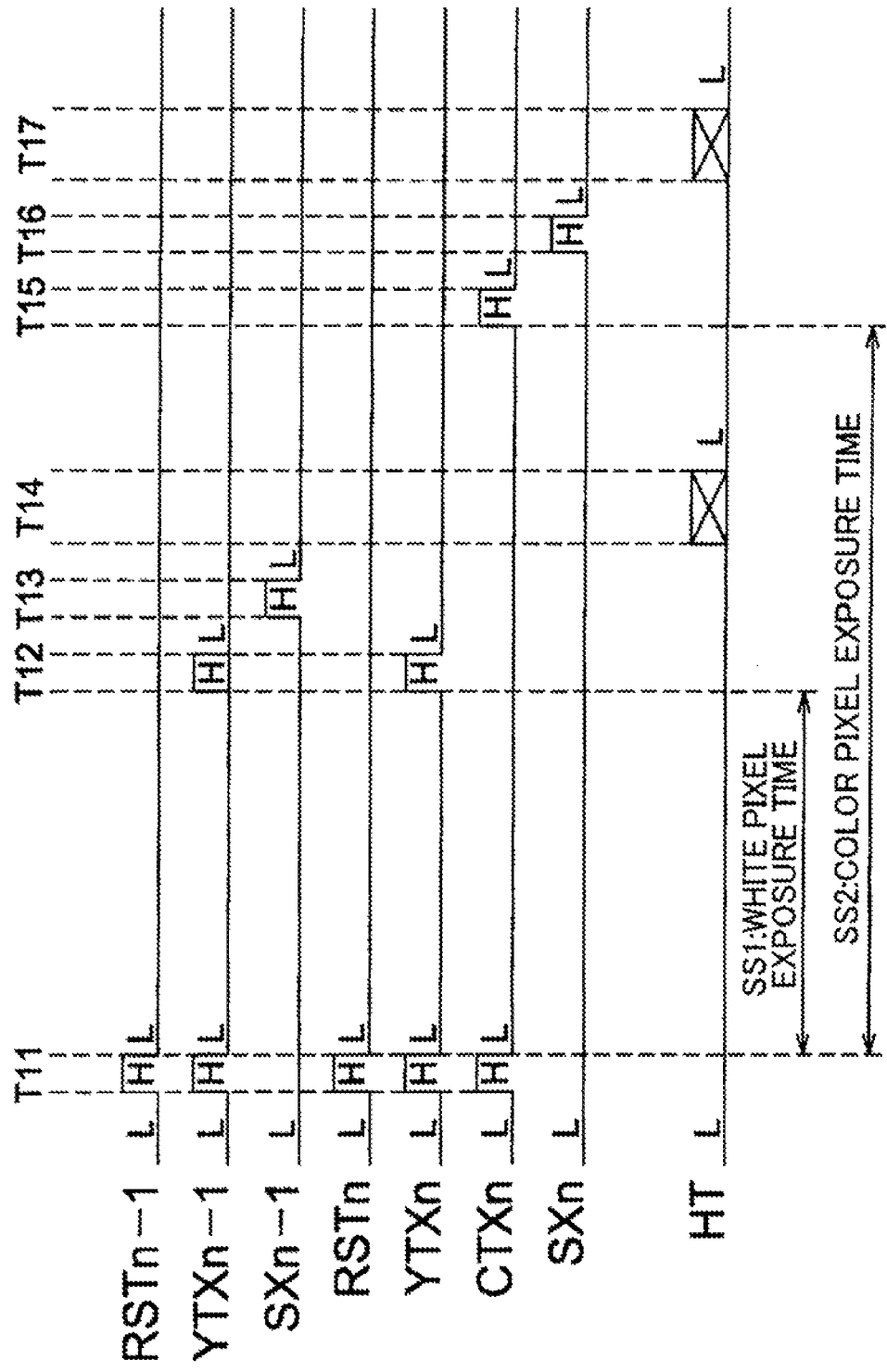
FIG. 37 is a timing chart showing an image pickup operation of the image sensor in a still image photographing in the embodiment 2-1.

FIG. 37 is a timing chart showing an image pickup operation of the image sensor in a still image photographing in the circuit block diagram shown in FIG. 35. Referring to FIG. 37, setting the reset signal line RST such as RSTn−1 or RSTn, the white pixel control line YTX such as YTXn−1 or YTXn, and the color pixel control line CTX such as CTXn of all the pixels of the image sensor 162 to a high potential H at a timing T11 allows for complete transfer of the signal charges accumulated in the PD portions of all the pixels to the FD portions. Also resetting the FD portions of all the pixels to the power source voltage VDD resets the PD portions and the FD portions to defaults. Then, setting the reset signal line RST such as RSTn−1 or RSTn, the white pixel control line YTX such as YTXn−1 or YTXn, and the color pixel control line CTX such as CTXn of all the pixels of the image sensor 162 to a low potential L at the end of the timing T11 allows for starting accumulation of the signal charges in the PD portions of all the pixels, in other words, starting an exposure by an electronic shutter.

Setting the white pixel control line YTX such as YTXn−1 or YTXn of all the white pixels of the image sensor 162 to a high potential H at a timing T12 upon a lapse of a white pixel exposure time SS1 after the end of the timing T11 allows for complete transfer of the signal charges accumulated in the PD portions of all the white pixels, thereby terminating the exposure of the white pixels by the electronic shutter. Then, setting the readout signal line SXn−1 of all the pixels at the (n−1)-th row of the image sensor 162 to a high potential H at a timing T13 allows for output of the potentials at the FD portions of the respective pixels at the (n+1)-th row, i.e., image data of the respective pixels at the (n+1)-th row to the vertical signal line 162j for storage into the sample-hold circuit 162d. Then, the image data of all the pixels at the (n−1)-th row is outputted to the amplifier 163 at a timing T14 in accordance with a horizontal transfer signal HT. Thus, sequentially performing the operations at the timings T13 and T14 with respect to all the pixel rows consisting of white pixels enables to complete the readout operation concerning image data of all the pixel rows consisting of the white pixels.

Setting the color pixel control line CTX such as CTXn of all the color pixels of the image sensor 162 to a high potential H at a timing T15 upon lapse of a color pixel exposure time SS2 after the end of the timing T11 allows for complete transfer of the signal charges accumulated in the PD portions of all the color pixels to the FD portions, thereby terminating the exposure of the color pixels by the electronic shutter. Then, setting the readout signal line SXn of all the pixels at the n-th of the image sensor 162 to a high potential H at a timing T16 allows for output of the potentials at the FD portions of the respective pixels at the n-th row, i.e., image data of the respective pixels at the n-th row to the vertical signal line 162j for storage into the sample-hold circuit 162d. Then, the image data of all the pixels at the n-th row is outputted to the amplifier 163 at a timing T17 in accordance with a horizontal transfer signal HT. Thus, sequentially performing the operations at the timings T16 and T17 with respect to all the pixel rows including the white pixels and the color pixels enables to complete the readout operation concerning image data of all the pixel rows including the white pixels and the color pixels.

In this embodiment, the readout operation concerning image data of all the pixel rows consisting of white pixels is performed at the timing T12 i.e. upon completion of the exposure of the white pixels by the electronic shutter, and the readout operation concerning image data of all the pixel rows including white pixels and color pixels is performed at the timing T15 i.e. upon completion of the exposure of the color pixels by the electronic shutter. Alternatively, image data of all the pixel rows may be sequentially read out at the timing T15 i.e. upon completion of the exposure of the color pixels by the electronic shutter. In the readout method of the embodiment, however, since the readout operation concerning the image data of all the pixel rows consisting of white pixels is completed during the exposure of color pixels, the readout time after the timing T15 can be shortened.

The white pixel exposure time SS1 and the color pixel exposure time SS2 may be obtained by a metering computation, using image data concerning a live-view image before a still image photographing is performed, for instance. Further alternatively, the white pixel exposure time SS1 and the color pixel exposure time SS2 may be obtained based on a detection output from a metering device which is provided independently of the image sensor 162. A ratio of the white pixel exposure time SS1 to the color pixel exposure time SS2 may be predefined based on a ratio of transmittance of the luminance filter Y to the color filter R, G, B. Further alternatively, in the case where an object image has a brightness equal to or larger than a reference value based on a result of the metering computation, the white pixel exposure time SS1 and the color pixel exposure time SS2 may be set identical to each other, and on the contrary, in the case where an object image has a brightness smaller than the reference value based on a result of the metering computation, the ratio of the white pixel exposure time SS1 to the color pixel exposure time SS2 may be set to a predefined value in such a manner that the color pixel exposure time SS2 is longer than the white pixel exposure time SS1 so as to enhance the color sensitivity of a photographic image.

Figure 38:
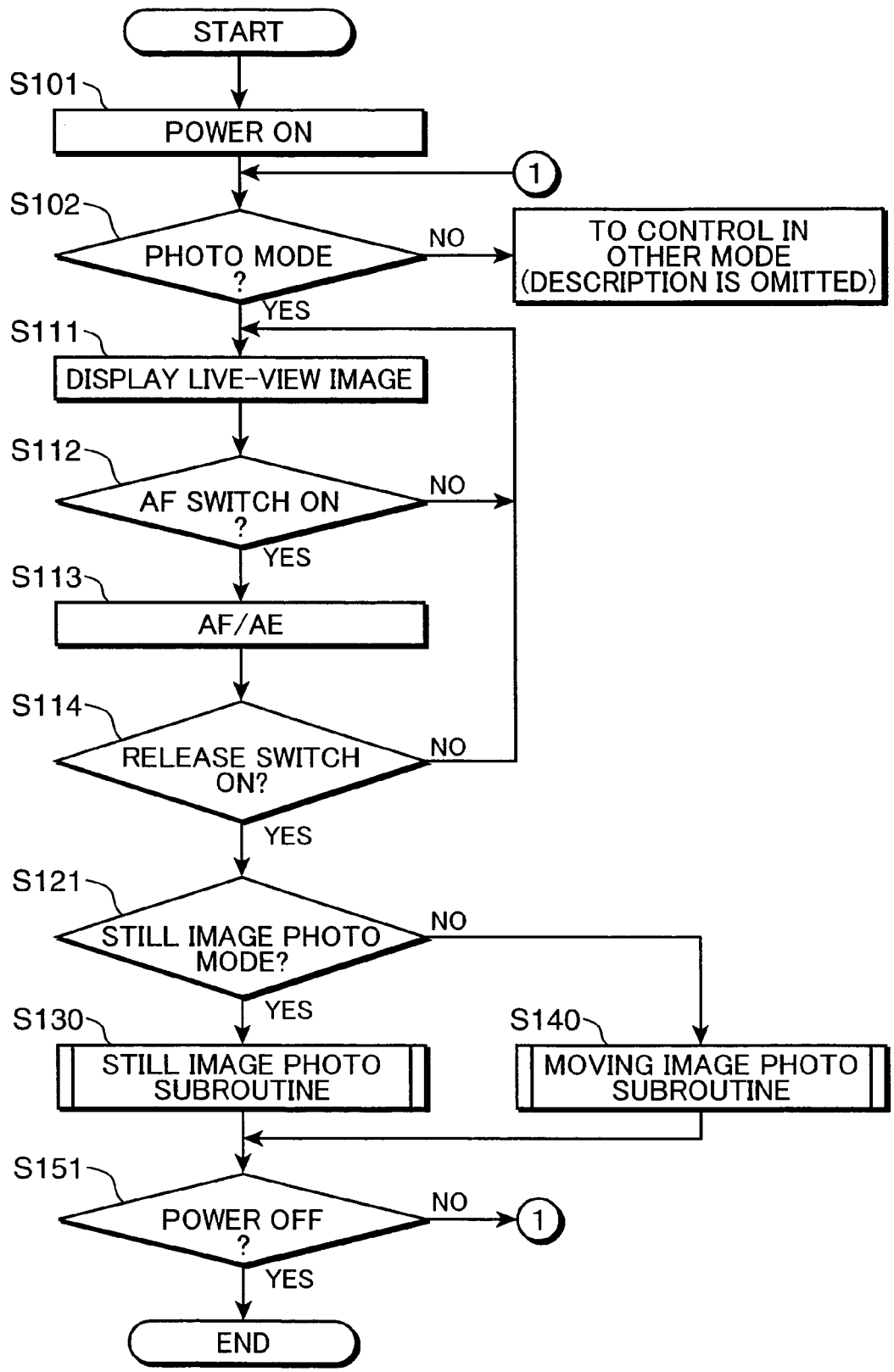
FIG. 38 is a flowchart showing a main routine concerning photographing by an image sensing apparatus incorporated with an imaging unit in the embodiment 2-1.
Figure 39:
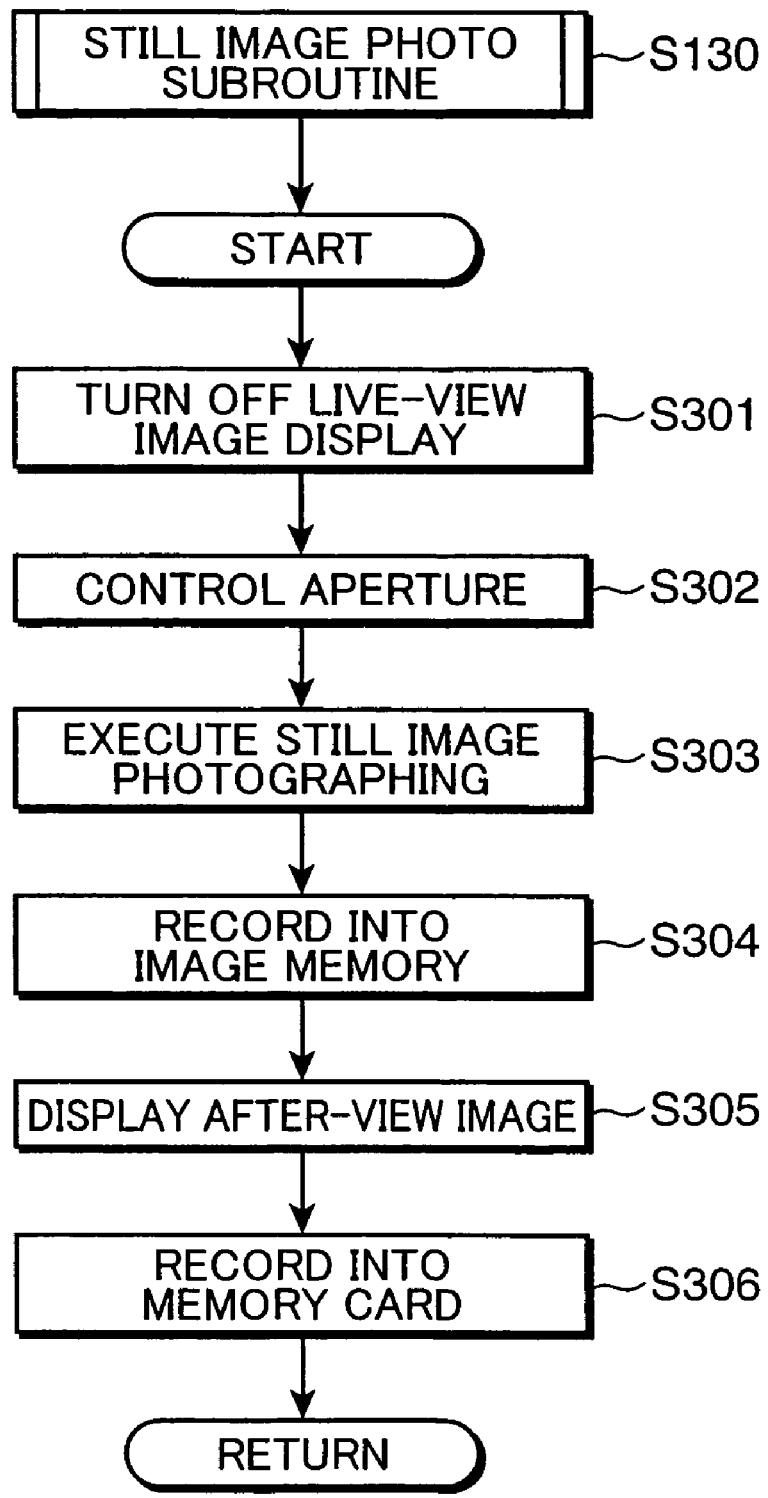
FIG. 39 is a flowchart showing a subroutine concerning still image photographing in the control flow of FIG. 38.
Figure 40:
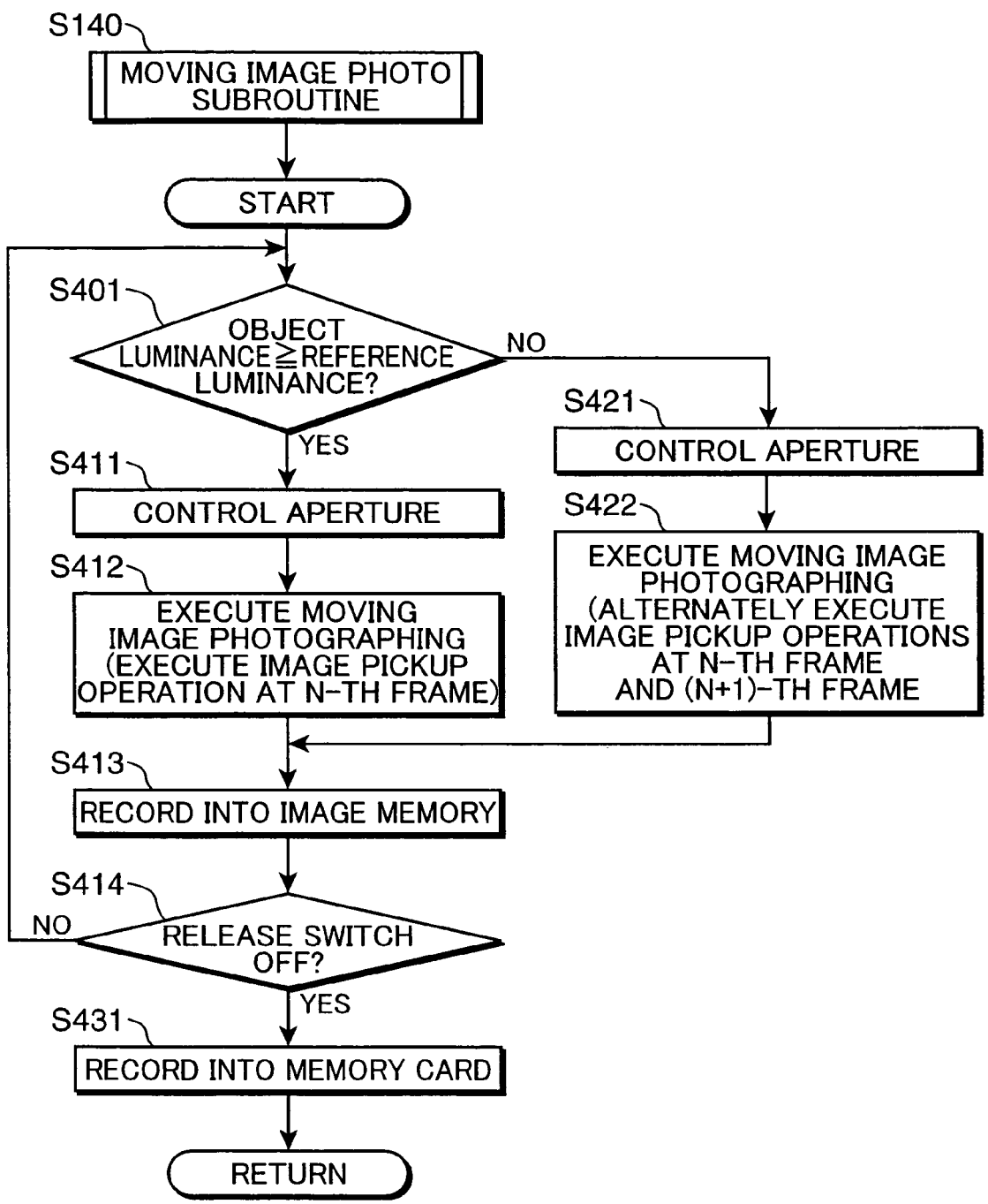
FIG. 40 is flowchart showing a subroutine concerning moving image photographing in the control flow of FIG. 38.

In the following, a control flow in photographing concerning a digital camera incorporated with the imaging unit in the embodiment 2-1 i.e. the image sensing apparatus 1 shown in FIG. 1 is described. FIGS. 38 through 40 are flowcharts showing a control flow of the digital camera in photographing, wherein FIG. 38 shows a main routine, FIG. 39 shows a subroutine concerning a still image photographing mode, and FIG. 40 shows a subroutine concerning a moving image photographing mode.

Referring to FIG. 38, when the power source of the digital camera is turned on (Step S101), it is judged whether the operation mode of the digital camera is a photographing mode (Step S102). If the operation mode of the digital camera is judged to be a mode other than the photographing mode e.g. a playback mode or a recording mode (NO in Step S102), the routine proceeds to a control at the set mode. Description on the controls of the respective modes other than the photographing mode will be omitted herein.

If the operation mode of the digital camera is judged to be a photographing mode (YES in Step S102), a live-view image display is started through a viewfinder of the digital camera (Step Sill). In the live-view image display, a readout operation while skipping an image of e.g. 30 frames per second is conducted, without reading out the image data of all the pixels of the image sensor 162, thereby reducing a load concerning signal processing and image processing.

Then, it is judged whether an AF switch which is actuated by halfway depressing the shutter button of the digital camera is turned on (Step S112). The routine cyclically repeats the operations in Steps S111 and S112, and waits until the AF switch is turned on. If it is judged that the AF switch is turned on (YES in Step S112), an auto-focusing (AF) operation with respect to an object image, and detection of an object luminance i.e. a metering (AE) operation are performed, using the image data of white pixels in the live-view image, followed by a focusing operation with respect to the object image, and an aperture value control by an aperture 172 of preventing saturation of the white pixels of the image sensor 162, for instance (Step S113). Then, it is judged whether a release switch which is actuated by fully depressing the shutter button is turned on, i.e. whether a photographing is started (Step S114). The routine cyclically repeats the operations from Step S111 to Step S114 until the release switch is turned on.

If it is judged that the release switch is turned on (YES in Step S114), it is judged whether the photographing mode of the digital camera is a still image photographing mode (Step S121). If it is judged that the photographing mode is the still image photographing mode (YES in Step S121), the routine proceeds to Step S130 to execute a still image photographing subroutine shown in FIG. 39. Thereafter, the routine goes to Step S151 to confirm whether the power source of the digital camera is turned off. If it is judged that the power source of the digital camera is not turned off (NO in Step S151), the routine returns to Step S102, and thereafter, the aforementioned operations are cyclically repeated. If it is judged that the power source of the digital camera is turned off (YES in Step S151), the routine ends.

If it is judged that the photographing mode is not the still image photographing mode (NO in Step S121), it is judged that the photographing mode is a moving image photographing mode, and the routine proceeds to Step S140 to execute the moving image photographing subroutine shown in FIG. 40. Thereafter, the routine proceeds to Step S151, and the aforementioned operations are cyclically repeated.

FIG. 39 is a flowchart showing the operation in Step S130 in FIG. 38, i.e. the still image photographing subroutine. When the digital camera enters the still image photographing subroutine, the live-view image display which has been started in Step S111 is terminated (Step S301). Then, the aperture 172 of the digital camera is set to a proper aperture value which has been set by the metering (AE) operation in Step S113 so as not to saturate the white pixels (Step S302). Then, a still image photographing is started in accordance with the operation shown in the timing chart of FIG. 37 (Step S303).

After the still image photographing is completed, the obtained still image data is temporarily stored in the image memory (Step S304), and the still image data recorded in the image memory is displayed on the display section as an after-view image (Step S305). The still image data recorded in the image memory is finally recorded in the memory card (Step S306), and the subroutine returns to Step S130 of the main routine shown in FIG. 38.

FIG. 40 is a flowchart showing the operation in Step S140 in FIG. 38, i.e. the moving image photographing subroutine. When the digital camera enters the moving image photographing subroutine, it is judged whether the object luminance detected by the metering (AE) operation in Step S113 of FIG. 38 is equal to or larger than a predetermined luminance (Step S401). If it is judged that the object luminance is equal to or larger than the predetermined luminance (YES in Step S401), the aperture 172 of the digital camera is set to a proper aperture value which has been set by the metering (AE) operation in Step S113 so as not to saturate the white pixels in an exposure time of one frame e.g. 1/30 sec. (Step S411). Then, similarly to a general moving image photographing, readout operations concerning both image data of the white pixels and the color pixels that have been acquired by the image pickup operation at the N-th frame of images in FIG. 36 are repeated to photograph a moving image of a predetermined number of frames e.g. 30 frames corresponding to one second (Step S412). Then, the moving image of the predetermined number of frames that have been photographed in Step S412 is recorded in the image memory (Step S413).

If it is judged that the object luminance is smaller than the predetermined luminance (No in Step S401), similarly to Step S411, the aperture 172 of the digital camera is set to a proper aperture value that has been set by the metering (AE) operation in Step S113 so as not to saturate the white pixels in an exposure time of one frame (Step S421). Then, the image pickup operations at the N-th frame and at the (N+1)-th frame in FIG. 36 are alternately repeated to photograph a moving image of a predetermined number of frames e.g. 30 frames corresponding to one second (Step S422). Thereafter, the moving image of the predetermined number of frames that has been photographed in Step S422 is recorded in the image memory (Step S413). Thus, the moving image that has been photographed in Step S412 or Step S422 is displayed on the display section as a live-view image.

The aforementioned predetermined luminance is variable depending on various photographing conditions such as the sensitivity of the image sensor itself, or F-number of the photographing lens. It is preferable to set the luminance to a value at which the accumulated charge amount of a color pixel is started to be decreased, and noise is likely to be greater, or higher.

After the operation in Step S413, it is judged whether the release switch is turned off i.e. the moving image photographing is ended (Step S414). If it is judged that the release switch is turned off (YES in Step S414), all the moving image recorded in the image memory is recorded in the memory card (Step S431), and the subroutine returns to Step S140 in the main routine of FIG. 38. If it is judged that the release switch is not turned off (NO in Step S414), the subroutine returns to Step S401. Thereafter, the aforementioned operations are cyclically repeated.

As mentioned above, the object luminance is detected, and if the detected object luminance is judged to be bright, a photographing operation identical to a general moving image photographing is performed. If the detected object luminance is judged to be dark, the sensitivity of color pixels is enhanced by performing the image pickup operation concerning the color pixels having a lower sensitivity at every other predetermined number of frames of white pixels (in this embodiment, at every other two frames of white pixels). This arrangement enables to obtain a high-quality moving image with enhanced color reproducibility even with respect to a dark object image.

In this embodiment, the general moving image photographing in Step S412, and the moving image photographing as a feature of the embodiment of the invention in Step S422 are switched over based on the object brightness obtained in Step S401. Alternatively, the moving image photographing of the embodiment in Step S422 may be constantly performed, without performing the judgment in Step S401, because there is a sensitivity difference between white pixels and color pixels despite the level of the object brightness.

Embodiment 2-2

Figure 41:
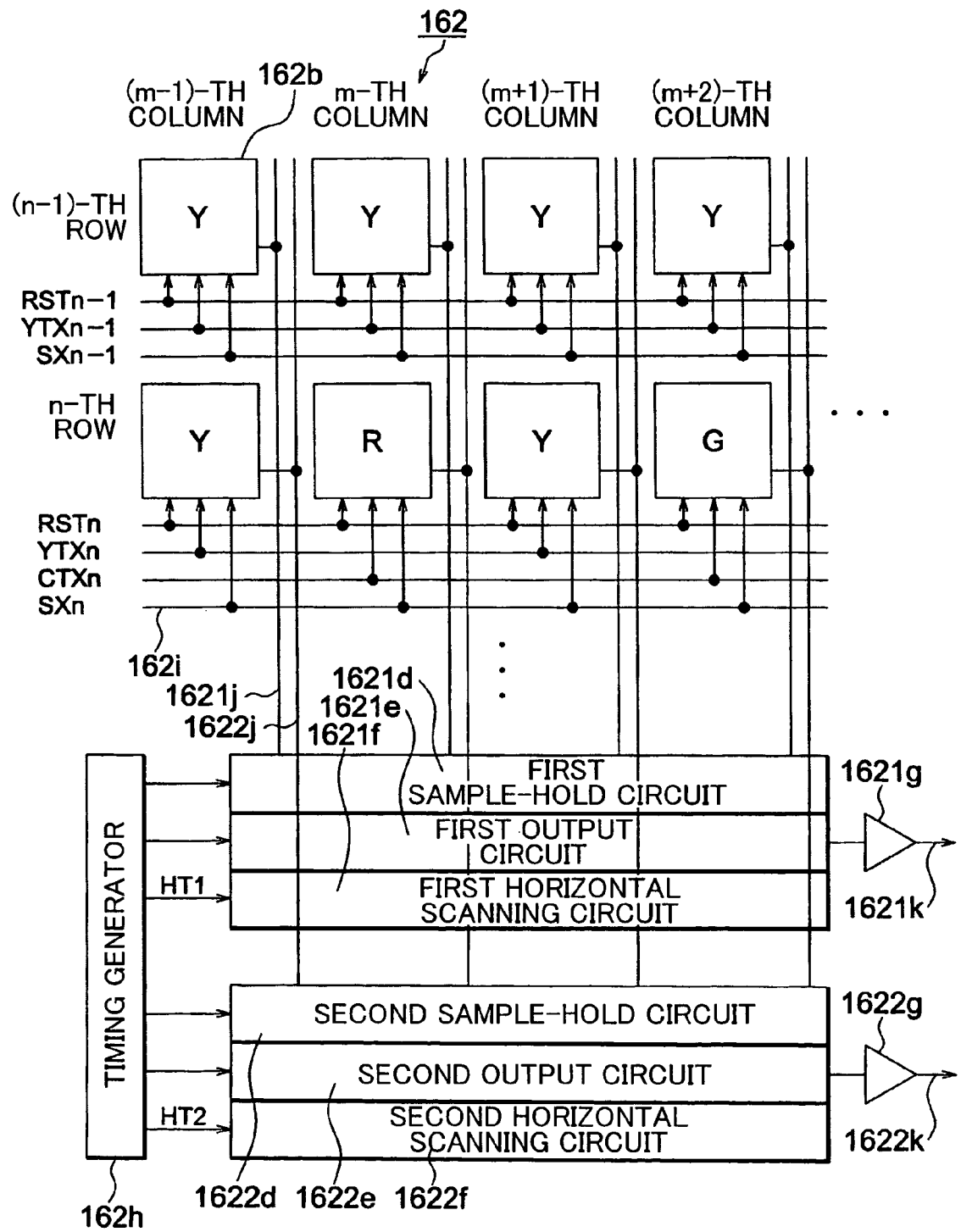
FIG. 41 is a block diagram showing an arrangement of a CMOS sensor in the embodiment 2-2.

In this section, another example of the second embodiment is described. FIG. 41 is a block diagram showing an arrangement of a CMOS sensor, as an imaging unit in the embodiment 2-2. The CMOS sensor 162 shown in FIG. 41 is different from the CMOS sensor shown in FIG. 35 in that: the image sensor 162 in FIG. 41 is provided with a first vertical signal line 1621j which is connected to output terminals of pixels at a pixel row consisting of white pixels e.g. at the (n−1)-th row, and a second vertical signal line 1622j which is connected to output terminals of pixels at a pixel row including white pixels and color pixels e.g. at the n-th row; and that the first vertical signal line 1621j is connected to a first sample-hold circuit 1621d, and the second vertical signal line 1622j is connected to a second sample-hold circuit 1622d.

Pixel outputs from the pixel row consisting of white pixels that have been held in the first sample-hold circuit 1621d are sequentially outputted to the image sensor 162, as first image data 1621k, by a first output circuit 1621e via a first output amplifier 1621g in accordance with a scanning operation of a first horizontal scanning circuit 1621f. Similarly, pixel outputs from the pixel row including white pixels and color pixels that have been held in the second sample-hold circuit 1622d are sequentially outputted to the image sensor 162, as second image data 1622k by a second output circuit 1622e via a second output amplifier 1622g in accordance with a scanning operation of a second horizontal scanning circuit 1622f. These operations are controlled by a timing generator 162h.

Figure 42:
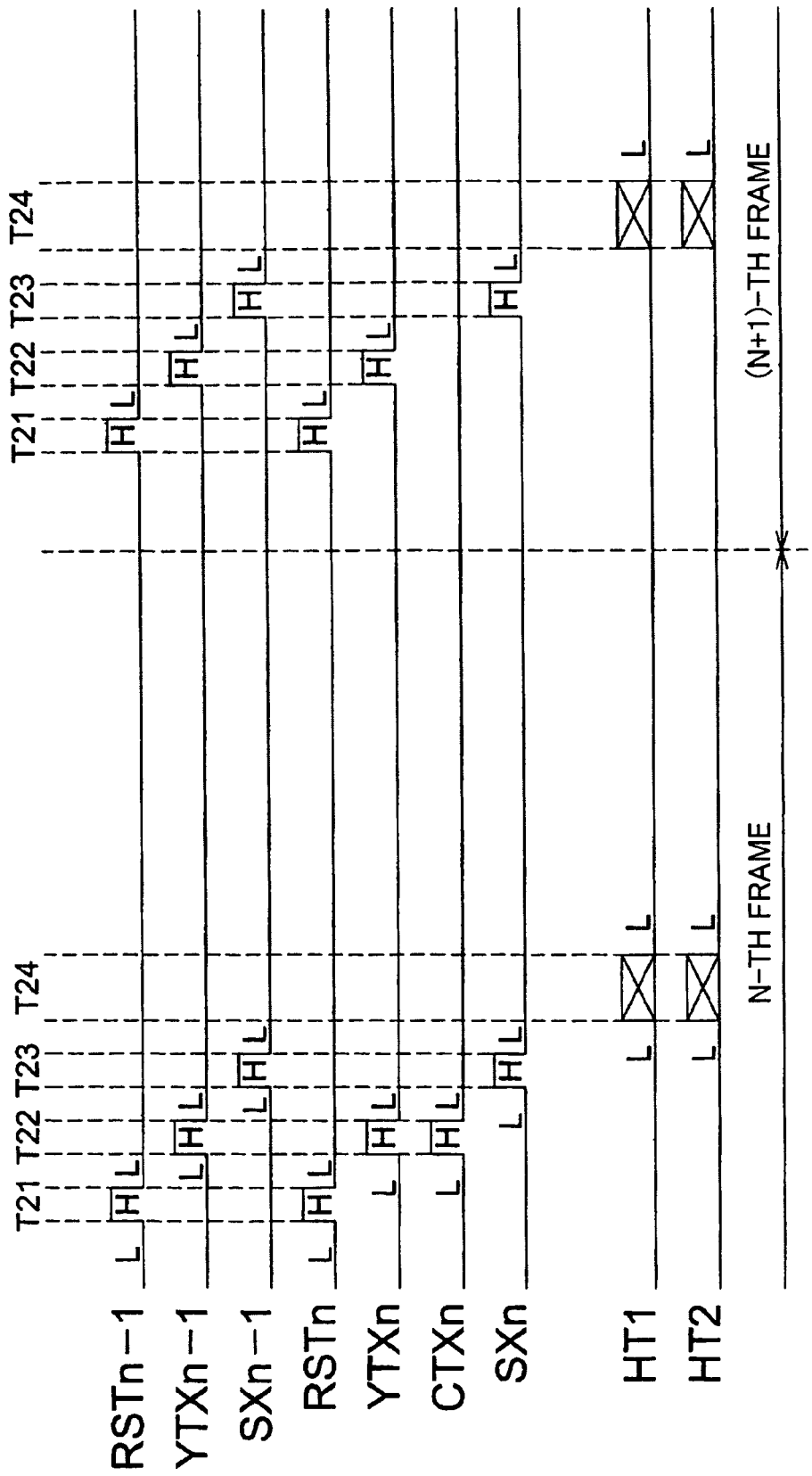
FIG. 42 is a timing chart showing an operation of the image sensor in the embodiment 2-2.

FIG. 42 is a timing chart showing an operation of the image sensor 162 shown in FIG. 41 in the embodiment 2-2. Referring to FIG. 42, the image sensor 162 performs a so-called rolling shutter image pickup operation of performing an exposure in a frame rate by concurrently driving a pixel row consisting of white pixels e.g. the (n−1)-th row, and a pixel row including white pixels and color pixels e.g. the n-th row.

In an image pickup operation concerning the N-th frame of images where N is a positive integer, setting a reset signal line RSTn−1 at the (n+1)-th row of pixels and a reset signal line RSTn at the n-th row of pixels to a high potential H at a timing T21 resets FD portions of all the pixels at the (n−1)-th row consisting of white pixels, and at the n-th row including white pixels and color pixels to a power source voltage VDD. Then, setting a white pixel control line YTXn−1 at the (n−1)-th row of pixels, and a white pixel control line YTXn and a color pixel control line CTXn at the n-th row of pixels to a high potential H at a timing T22 allows for complete transfer of signal charges accumulated in PD portions of all the pixels at the (n−1)-th row and at the n-th row to FD portions.

Then, setting a readout signal line SXn−1 at the (n−1)-th row of pixels and a readout signal line SXn at the n-th row of pixels to a high potential H at a timing T23 allows for output of pixel signals from all the pixels at the (n−1)-th row to the first vertical signal line 1621j, and at the same time, allows for output of pixel signals from all the pixels at the n-th row to the second vertical signal line 1622j.

Then, at a timing T24, the first image data 1621k of all the pixels at the (n−1)-th row is outputted in accordance with a first horizontal transfer signal HT1, and concurrently, the second image data 1622k of all the pixels at the (n−1)-th row is outputted in accordance with a second horizontal transfer signal HT2. The first horizontal transfer signal HT1 and the second horizontal transfer signal HT2 may be identical to each other, or may be signals to be outputted at different timings. The above operation is executed with respect to all the pixel rows of the image sensor 162 sequentially by two rows, thereby completing the image pickup operation concerning the N-th frame of images.

Next, an image pickup operation concerning the (N+1)-th frame of images is conducted. The image pickup operation is substantially the same as the aforementioned image pickup operation concerning the N-th frame of images except for the following. At the (N+1)-th frame of images, setting merely the white pixel control line YTxn−1 at the (n+1)-th row, and the white pixel control line YTXn at the n-th row to a high potential H at a timing T22 turns on transfer gates Q1 of the white pixels at the (n+1)-th row and at the n-th row, thereby completely transferring the signal charges Qpd accumulated in the PD portions of the white pixels at the (n−1)-th row and at the n-th row to the FD portions.

At this time, since the color pixel control line CTXn at the n-th row is kept to a low potential L, the operation of accumulating the signal charges Qpd in the PD portions of the color pixels at the n-th row is continued without transferring the signal charges Qpd to the FD portions. Thus, the exposure time for the color pixels is extended, and the sensitivity of the color pixels is enhanced. Specifically, the exposure time for the white pixels corresponds to one frame rate from a falling of the timing T22 in the image pickup operation for the N-th frame to a rising of the timing T22 in the image pickup operation for the (N+1)-th frame, and the exposure time for the color pixels corresponds to two frame rates from the falling of the timing T22 in the image pickup operation for the N-th frame to a rising (not shown) of the timing T22 in the image pickup operation for the (N+2)-th frame.

Also, since the FD portions of the color pixels at the n-th row are reset to the power source voltage VDD, the potentials at the FD portions of the color pixels at the n-th row, i.e., image data is dark data. The dark data is handled as invalid data by an unillustrated image processor to be described later. For instance, the dark data is replaced by image data of color pixels obtained in the image pickup operation one frame before the (N+1)-th frame i.e. N-th frame.

As mentioned above, in this embodiment, image data concerning a pixel row consisting of white pixels, and image data concerning a pixel row including white pixels and color pixels can be read out individually. This arrangement enables to facilitate the image processing to be executed by the image processor to be described later, and to facilitate selection of image data. For instance, image data concerning a pixel row consisting of white pixels is read out for use in an operation to be executed solely based on luminance information such as auto-focusing or metering.

Embodiment 2-3

Figure 43:
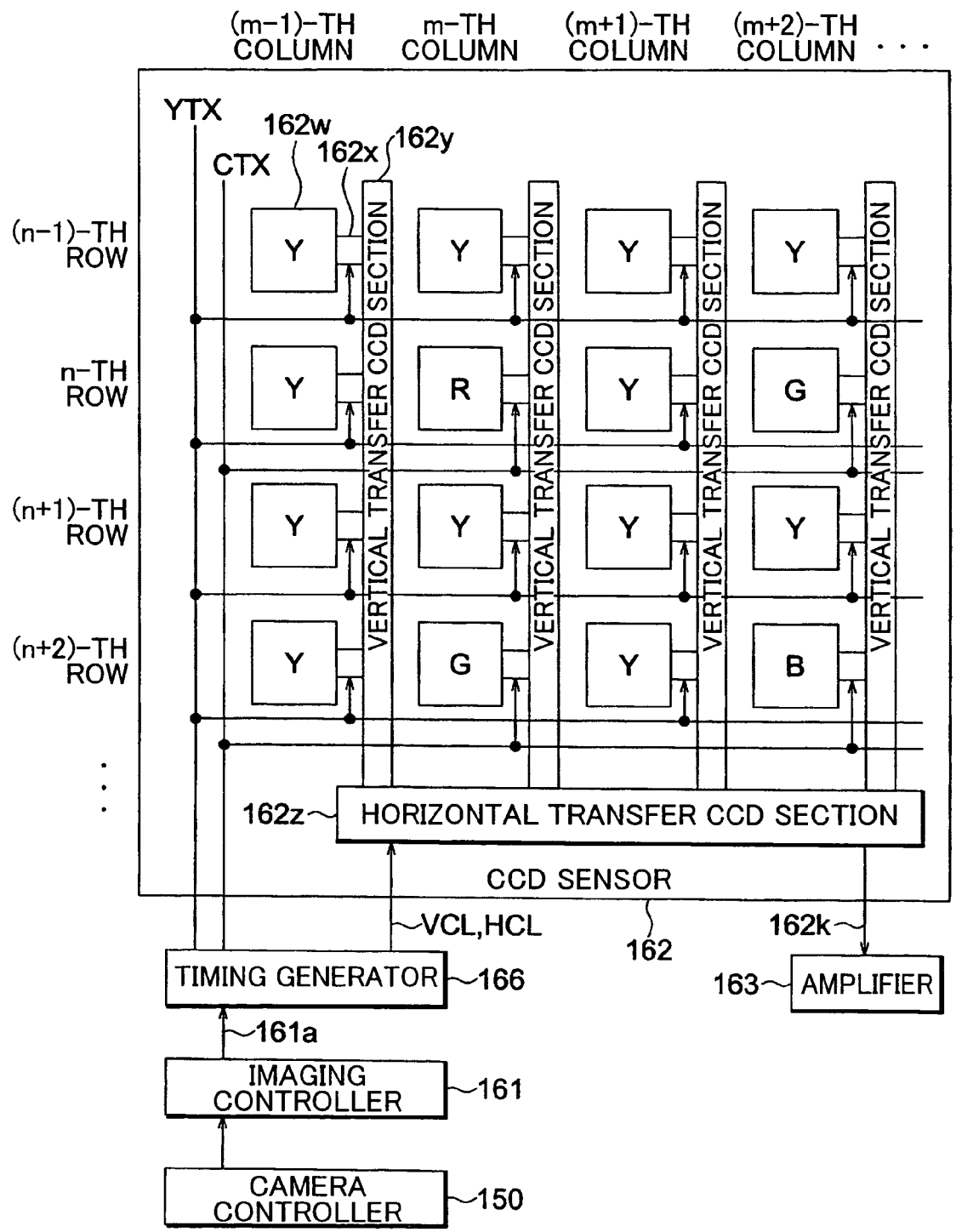
FIG. 43 is a block diagram showing an interline CCD sensor, and its peripheral circuits in the embodiment 2-3.

In this section, yet another example of the second embodiment is described. FIG. 43 is a block diagram showing an arrangement of an interline CCD sensor as an imaging unit in the embodiment 2-3 along with its peripheral circuits thereof. The CCD sensor 162 includes photoelectric conversion sections 162$w$, transfer sections 162$x$, vertical transfer CCD sections 162$y$, and a horizontal transfer CCD section 162$z$. The parts of the CCD sensor 162 other than the photoelectric conversion sections 162$w$ are substantially blocked from light.

Each of the photoelectric conversion sections 162$w$ includes a photodiode on which a luminance filter Y, or one of color filters R, G, B substantially identical to those shown in FIGS. 34A and 35 is disposed. The photoelectric conversion section 162$w$ photoelectrically converts incident light from an object, and accumulates a generated electrical charge in a parasitic capacitance of the photodiode. In this embodiment, the photoelectric conversion sections 162$w$ where the luminance filters Y are disposed are called as white pixels, and the photoelectric conversion sections 162$w$ where the color filters are disposed are called as color pixels.

The transfer sections 162$x$ transfer the electrical charges accumulated in the photoelectric conversion sections 162$w$ to the respective corresponding vertical transfer CCD sections 162$y$. A transfer timing of the electrical charges is controlled by a transfer signal. In this embodiment, a transfer signal of white pixels is called as a white pixel control signal YTX, and a transfer signal of color pixels is called as a color pixel control signal CTX. The white pixel control signal YTX and the color pixel control signal CTX are controlled by a timing generator 166 under the control of a camera controller 150 and an imaging controller 161.

The vertical transfer CCD sections 162$y$ sequentially transfer the electrical charges transferred by the transfer sections 162$x$ vertically i.e. in a column direction in FIG. 43 in accordance with a vertical transfer clock VCL. The horizontal transfer CCD section 162$z$ transfers the electrical charges transferred by the vertical transfer CCD sections 162$y$ horizontally with respect to each of pixel rows to an amplifier 163, as image data 162$k$ in accordance with a horizontal transfer clock HCL. The operations of the vertical transfer CCD sections 162$y$ and the horizontal transfer CCD section 162$z$ may be performed in the similar manner as a general CCD sensor, and controlled by the timing generator 166. Thus, the image sensor 162 and the timing generator 166 function as an imaging unit in the embodiment of the invention.

Figure 44:
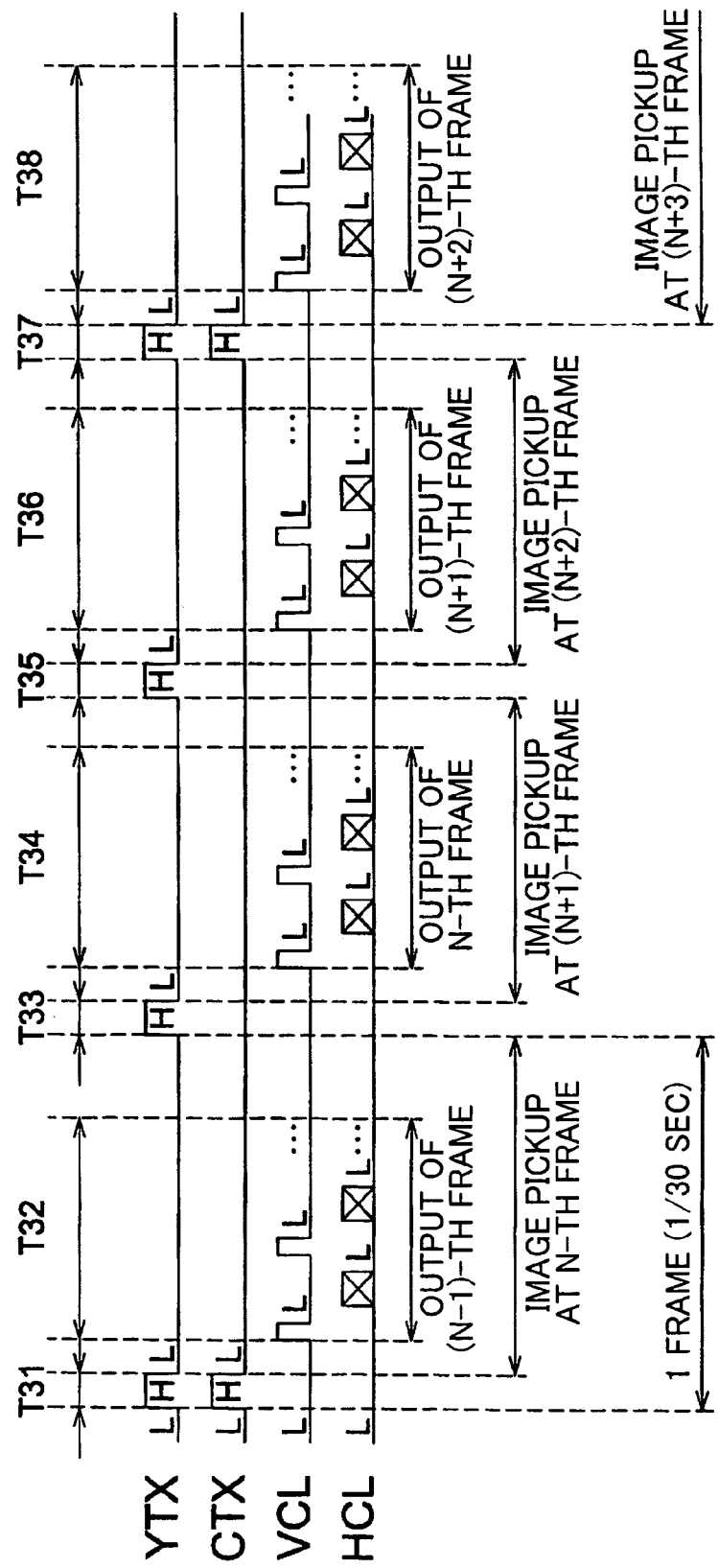
FIG. 44 is a timing chart showing a manner of driving the CCD sensor in a moving image photographing in the embodiment 2-3.

FIG. 44 is a timing chart showing a manner of driving the CCD sensor 162 shown in FIG. 43 in photographing a moving image. This embodiment is described on a premise that a readout operation of image data of color pixels is performed once in three times of readout operations of image data of white pixels.

Referring to FIG. 44, setting the white pixel control signal YTX and the color pixel control signal CTX to a high potential H at a timing T31 opens the gates of all the transfer sections 162$x$ of the image sensor 162. Thereby, the electrical charges accumulated in the photoelectric conversion sections 162$w$ at the (N−1)-th frame are transferred to the respective corresponding vertical transfer sections 162$y$, and at the same time, the photoelectric conversion sections 162$w$ are reset to defaults where electrical charges are not accumulated.

Then, setting the white pixel control signal YTX and the color pixel control signal CTX to a low potential L at the end of the timing T31 closes the gates of all the transfer sections 162$x$, and accumulation of electrical charges i.e. an image pickup operation at the N-th frame is started. During the image pickup operation at the N-th frame, the electrical charges transferred to the vertical transfer CCD sections 162$y$ are transferred by a pixel row at a timing T32 in response to input of the vertical transfer clock VCL. Then, in response to input of the horizontal transfer clock HCL by the number of pixels in the pixel row, image data 162$k$ corresponding to the pixel row is transferred to the horizontal transfer CCD section 162, and then outputted to the amplifier 163. The above operation is sequentially repeated by the number of pixel rows, thereby all the image data 162$k$ obtained in the image pickup operation at the (N−1)-th frame is outputted. In a general CCD sensor, vertical and horizontal transfer operations are performed, using a clock in four steps in order to avoid interference with image data of a preceding or succeeding pixel row. In this embodiment, the description is made based on the transfer operation by one clock to simplify the description. Actually, however, vertical and horizontal transfer operations may be carried out in the similar manner as in the general CCD sensor.

Then, setting the white pixel control signal YTX to a high potential H at a timing T33 upon lapse of a certain time corresponding to one frame after the beginning of the timing T31 (in a general moving image photographing, upon lapse of 1/30 sec.) allows for opening the gates of the transfer sections 162$x$ of all the white pixels of the image sensor 162. Thereby, the electrical charges accumulated in the photoelectric conversion sections 162$w$ of the white pixels in the image pickup operation at the N-th frame are transferred to the vertical transfer CCD sections 162$y$, and at the same time, the photoelectric conversion sections 162$w$ of the white pixels are reset to defaults where electrical charges are not accumulated.

Then, setting the white pixel control signal YTX to a low potential L at the end of the timing T33 allows for closing the gates of the transfer sections 162$x$ of all the white pixels, thereby starting an image pickup operation of white pixels at the (N+1)-th frame. At this time, since the color pixel control signal CTX is kept to a low potential L, the operation of accumulating the electrical charges in the color pixels i.e. an image pickup operation for the color pixels is continued without transferring the accumulated electrical charges to the vertical transfer CCD sections 162$y$.

Then, in the image pickup operation at the (N+1)-th frame, all the image data 162$k$ obtained in the image pickup operation at the N-th frame is outputted at the timing T34 in the similar manner as the operation at the timing T32. At this time, image data corresponding to the color pixels is in a state where electrical charges do not exist, i.e. dark data. The dark data is handled as invalid data by an image processor to be described later. For instance, the dark data is replaced by image data of color pixels obtained in the image pickup operation one frame before the N-th frame i.e. (N−1)-th frame.

At timings T35 and T36, operations identical to those at the timings T33 and T34 are performed, and an image pickup operation at the (N+2)-th frame, and output of the image data obtained in the image pickup operation at the (N+1)-th frame are performed. Transfer of electrical charges of the color pixels is suspended at the timing T35, thereby continuing accumulation of electrical charges of the color pixels.

Then, similarly to the operation at the timing T31, setting the white pixel control signal YTX and the color pixel control signal CTX to a high potential H at a timing T37 upon lapse of a certain time corresponding to one frame after the beginning of the timing T35 (in a general moving image photographing, upon lapse of 1/30 sec.) allows for opening the gates of the transfer sections 162x of all the pixels of the image sensor 162. Thereby, the electrical charges accumulated in the photoelectric conversion sections 162w of all the pixels in the image pick operation at the (N+2) -th frame are transferred to the vertical transfer CCD sections 162y. Thereafter, at a timing T38, image data 162k of all the pixels obtained in the image pickup operation at the (N+2)-th frame is outputted.

In this embodiment, a transfer operation of electrical charges of color pixels is performed once in three times of transfer operations of electrical charges of white pixels. This enables to cancel a sensitivity difference between white pixels and color pixels, i.e. a sensitivity ratio of 3 or larger. Human eyes respond to color information slower than to luminance information in capturing a moving image. Accordingly, there is no or less likelihood that a user may feel color drift even if a readout frequency of image data of color pixels i.e. color information is decreased as compared with image data of white pixels i.e. luminance information. Conversely, extending an accumulation time of electrical charges for color pixels enables to enhance the color sensitivity, thereby securing enhanced color reproducibility.

As mentioned above, in the second embodiment, individually controlling the exposure times for the white pixels where the luminance filters are disposed, and for the color pixels where the color filters are disposed enables to extend the exposure time for the color pixels having a lower sensitivity. This arrangement enables to prevent so-called "whiteout", i.e. an overexposed appearance of an image, or degraded color reproduction by canceling a sensitivity difference between white pixels and color pixels, and to provide an imaging unit and an image sensing apparatus capable of performing high-quality photographing.

Third Embodiment

Embodiment 3-1

Figure 45A:
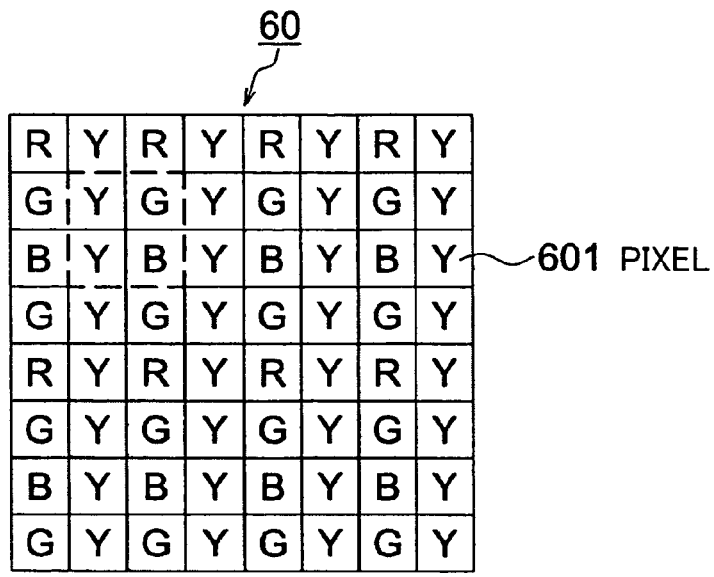
FIGS. 45A and 45B are diagrams schematically showing an arrangement of a CCD area sensor in the embodiment 3-1.
Figure 45B:
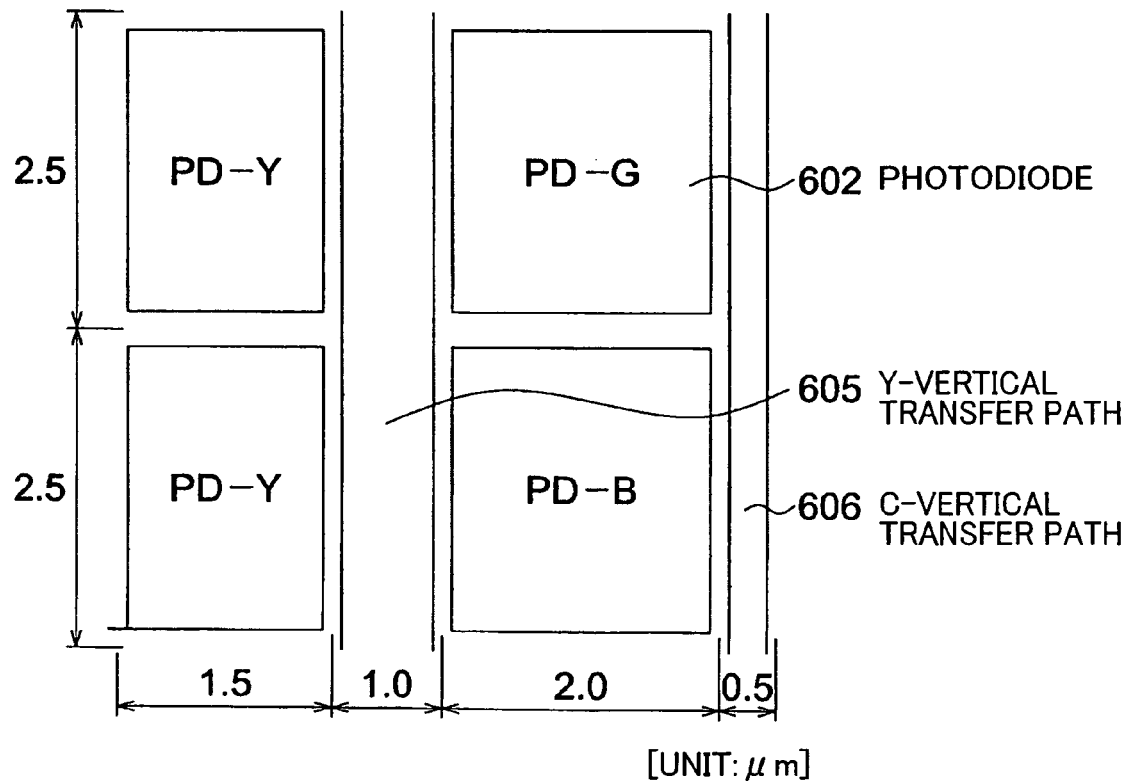

An arrangement of a CCD area sensor as an example of an image sensor in the third embodiment is described referring to FIGS. 45A and 45B. FIG. 45A is a diagram showing a filter arrangement of the CCD area sensor 60 in the embodiment 3-1. FIG. 45B is a diagram schematically showing a pixel structure of the CCD area sensor 60, which is an enlarged view of an area enclosed by the broken line in FIG. 45A. Although the diagram of FIG. 45A shows pixels in eight rows and in eight columns, an actual pixel arrangement of the CCD area sensor is the one, wherein the pixel pattern shown in FIG. 45A is sequentially repeated in column and row directions.

The CCD area sensor 60 (hereinafter, called as "CCD sensor 60") includes a number of pixels 601 arranged in a two-dimensional matrix. Each of the pixels 601 is provided with a photodiode 602 corresponding to a photoelectric conversion section for photoelectrically converting light from an object to generate a signal charge. Transparent color filters capable of transmitting light of respective color components of R, G, and B are disposed in the order of R, G, B, and G on the photodiodes 602 provided in color pixels at odd columns, and luminance filters Y are disposed on the photodiodes 602 provided in white pixels at even columns. The array of the color filters R, G, and B, and the array of the luminance filters Y are alternately arranged at every other column. Examples of the luminance filters Y are ND filters, transparent filters, white color filters, and gray filters. Also, an arrangement in which no filter is provided on the surfaces of the photodiodes 602 to allow light to be directly incident onto the photodiode surfaces is equivalent to an arrangement provided with transparent filters.

Now, the pixel structure of the CCD sensor 60 having the above filter arrangement is described. As shown in FIG. 45B, a photodiode PD-R (not shown), a photodiode PD-G, and a photodiode PD-B on which the respective color filters R, G, and B are disposed, and photodiodes PD-Y on which the luminance filters Y are disposed, are provided on the respective pixels 601. Also, a C-vertical transfer path 606 for transferring signal charges generated in the photodiodes PD-R, PD-G, and PD-B in a column direction, and a Y-vertical transfer path 605 for transferring signal charges generated in the photodiodes PD-Y in a column direction, are provided each between the corresponding two adjacent columns of pixels. With this arrangement, the C-vertical transfer path 606 and the Y-vertical transfer path 605 function as a color pixel transfer section and a white pixel transfer section of the image sensor in the embodiment, respectively.

Now, a construction of the photodiode 602 is described. In this embodiment, as shown in FIG. 45B, for instance, light receiving surfaces of the photodiode PD-R (not shown), the photodiode PD-G, and the photodiode PD-B where the color filters R, G, and B with a lower light transmittance are disposed each has a size of 2.5 μm×2.0 μm in vertical and horizontal directions. Also, a light receiving surface of the photodiode PD-Y where the luminance filter Y with a higher light transmittance is disposed has a size of 2.5 μm×1.5 μm in vertical and horizontal directions. In this way, setting the size of the light receiving surface of the photodiode PD-Y of the white pixel having a higher sensitivity smaller than the size of the light receiving surface of the photodiode PD-R, PD-G, PD-B having a lower sensitivity enables to reduce a sensitivity difference between the white pixels and the color pixels, thereby generating an image signal where the luminance signal and the color signal are kept in a well balanced state.

Figure 46:
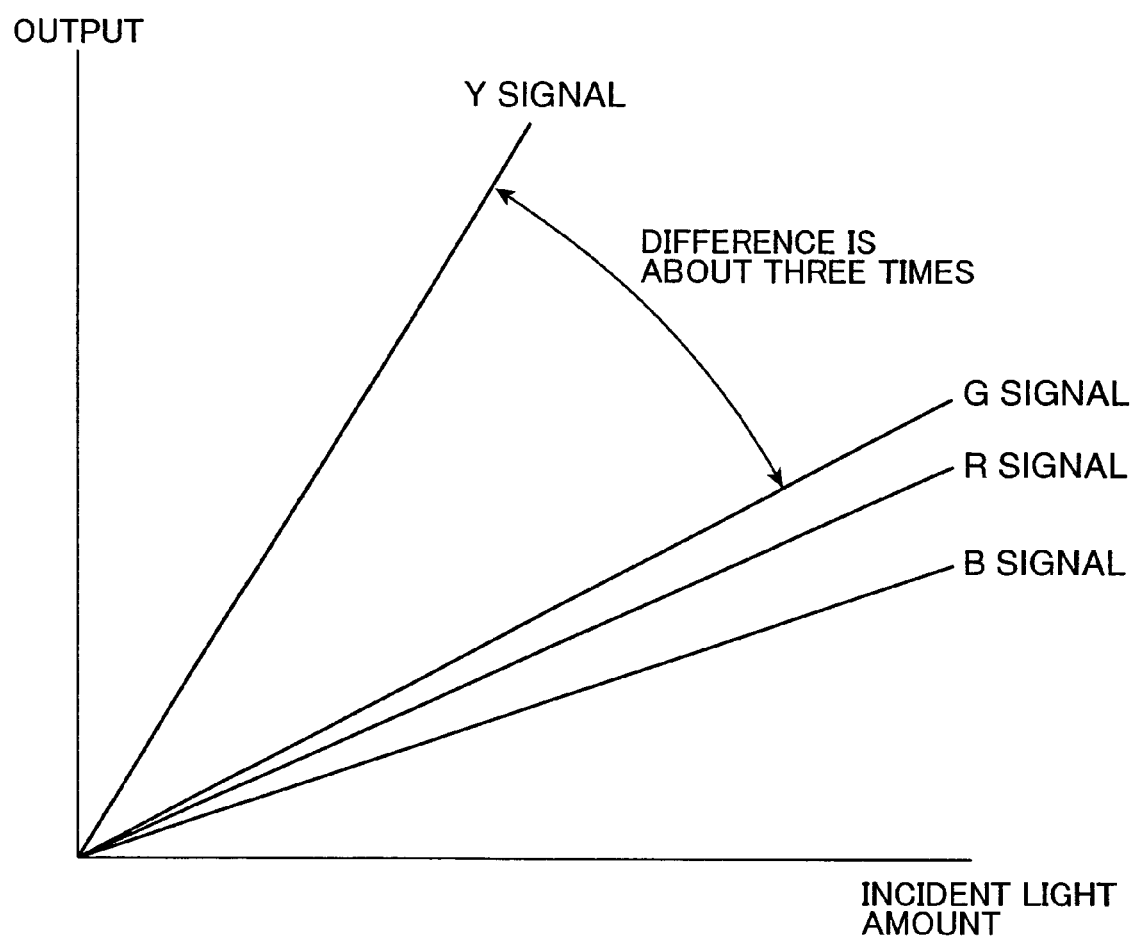
FIG. 46 is a graph showing a relationship between incident light amounts to respective pixels of the CCD area sensor, and outputs in the embodiment 3-1.

In the following, sensitivities of white pixels and color pixels of the CCD sensor 60 are described referring to FIG. 46. FIG. 46 is a graph showing a relationship between amounts of incident light onto the respective pixels of the CCD sensor 60, and outputs i.e. signal charge amounts in the respective pixels.

As described in the foregoing section referring to FIG. 5, the conventional solid-state image sensor has a construction that the photodiode PD-R, PD-G, PD-B of the color pixel, and the photodiode PD-Y of the white pixel have substantially the same size. Accordingly, a sensitivity difference between the white pixels and the color pixels is very large, and a difference in signal charge amounts generated in the white pixels and the color pixels is as large as about 4 times. On the other hand, in the CCD sensor 60 of this embodiment, the size of the light receiving surface of the photodiode PD-Y of the white pixel is set smaller than the size of the light receiving surface of the photodiode PD-R, PD-G, PD-B of the color pixel. Accordingly, as shown in FIG. 46, the sensitivity difference between the white pixels and the color pixels is reduced to such an extent that a difference in signal charge amounts generated in the white pixels and the color pixels is about 3 times.

In the following, structures of the C-vertical transfer path 606 and the Y-vertical transfer path 605 of the CCD sensor 60 are described. In this embodiment, the C-vertical transfer path 606 for transferring signal charges generated in the photodiodes PD-R, PD-G, and PD-B in a column direction has a width of e.g. 0.5 μm, as shown in FIG. 45B. The Y-vertical transfer path 605 for transferring signal charges generated in the photodiodes PD-Y in a column direction has a width of e.g. 1.0 μm, as shown in FIG. 45B. Thus, setting the width of the Y-vertical transfer path 605 for transferring the signal charges generated in the photodiodes PD-Y of the white pixels having a higher sensitivity and a larger signal charge amount larger than the width of the C-vertical transfer path 606 enables to prevent so-called "whiteout", i.e. an overexposed appearance of an image, or a like drawback, without saturating the signal charges in the transfer paths.

Figure 47:
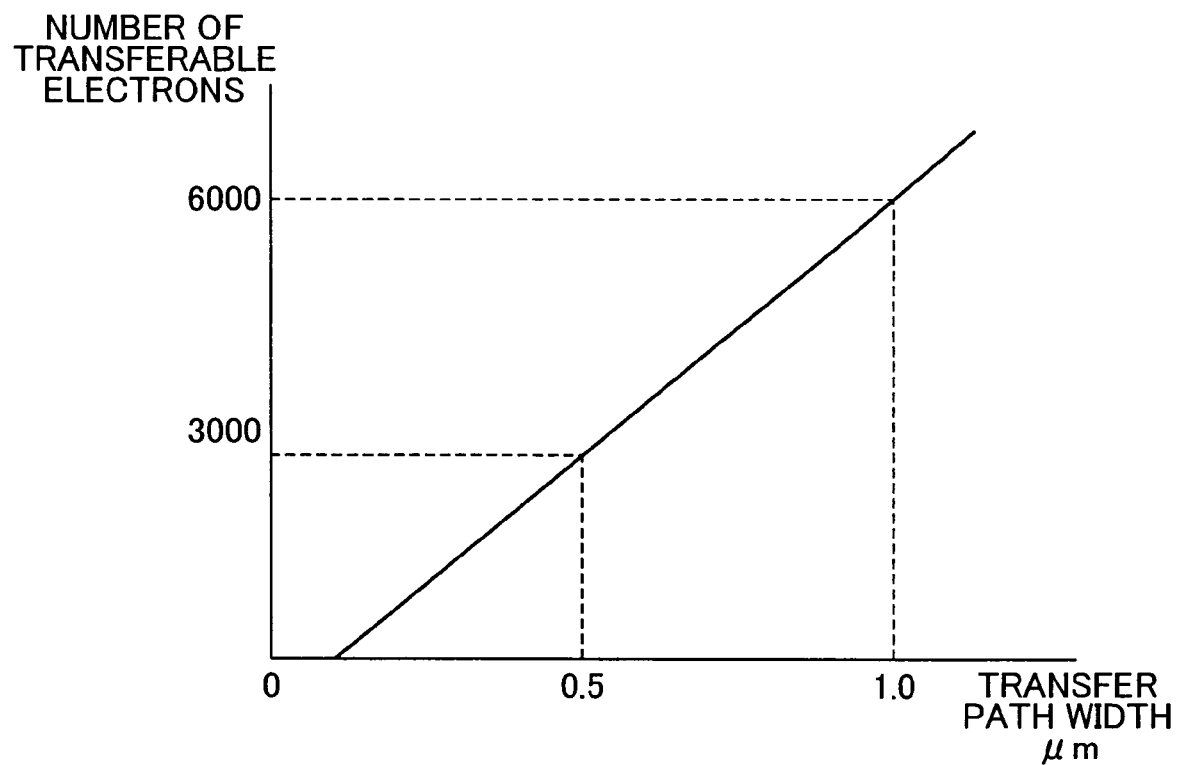
FIG. 47 is a graph showing a relationship between a width of a vertical transfer path, and a transfer capacity in the CCD area sensor in the embodiment 3-1.

Next, transfer capacities of the vertical transfer paths of the CCD sensor 60 are described. FIG. 47 is a graph showing a relationship between a width of a vertical transfer path, and a transfer capacity. As shown in FIG. 47, as the width of the vertical transfer path is increased, the number of transferable electrons i.e. the transfer capacity is obviously increased.

As mentioned above, the image sensor of this embodiment has a feature that the size of the photoelectric conversion sections provided in the white pixels is set smaller than the photoelectric conversion sections provided in the color pixels. In other words, reducing the size of the photoelectric conversion sections of the white pixels having a higher sensitivity suppresses a sensitivity difference between the white pixels and the color pixels, thereby generating an image signal where the luminance signal and the color signal are kept in a well balanced state.

Also, the size of each of the transfer sections for transferring signal charges read out from the white pixels is set larger than the size of each of the transfer sections for transferring signal charges read out from the color pixels. In other words, setting the size of each of the transfer paths for transferring signal charges generated in the white pixels having a higher sensitivity and a larger signal charge amount larger than the size of each of the transfer paths for transferring signal charges generated in the color pixels enables to prevent so-called "whiteout", i.e. an overexposed appearance of an image, or a like drawback, without saturating the signal charges in the transfer paths.

As mentioned above, the CCD sensor 60 has the arrangement: the transparent color filters capable of transmitting light of the respective color components of R, G, and B are disposed in the order of R, G, B, and G on the photodiodes 602 provided in the color pixels at odd columns, and the luminance filters Y are disposed on the photodiodes 602 provided in the white pixels at even columns; and that the array of the color filters R, G, and B, and the array of the luminance filters Y are alternately arranged at every other column. Alternatively, as shown in FIG. 49, the pixel pattern may be such that white pixels where the luminance filters Y are disposed are arranged in a checker pattern, and that color pixels where the color filters R, G, and B are disposed are arranged in a Bayer matrix relative to the checker-patterned white pixels. The arrows in FIG. 49 show readout directions of signal charges generated in the photodiodes 602.

Embodiment 3-2

Figure 48A:
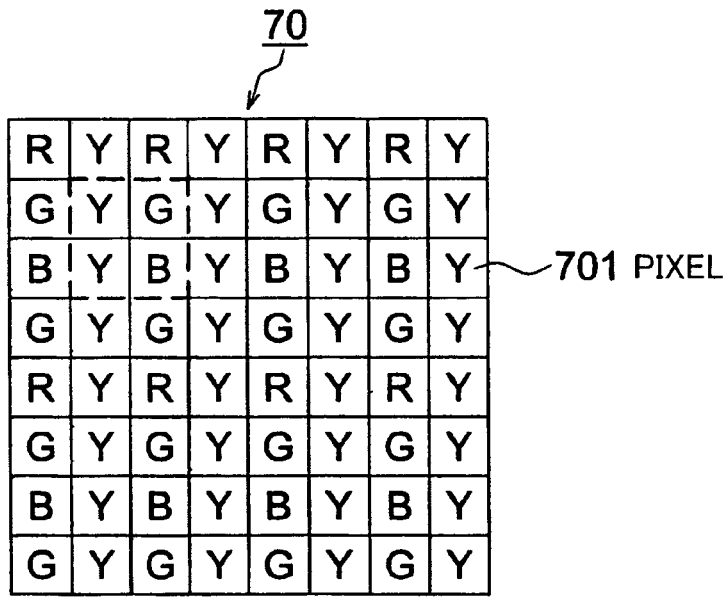
FIGS. 48A and 48B are diagrams schematically showing an arrangement of a CMOS sensor in the embodiment 3-2.
Figure 48B:
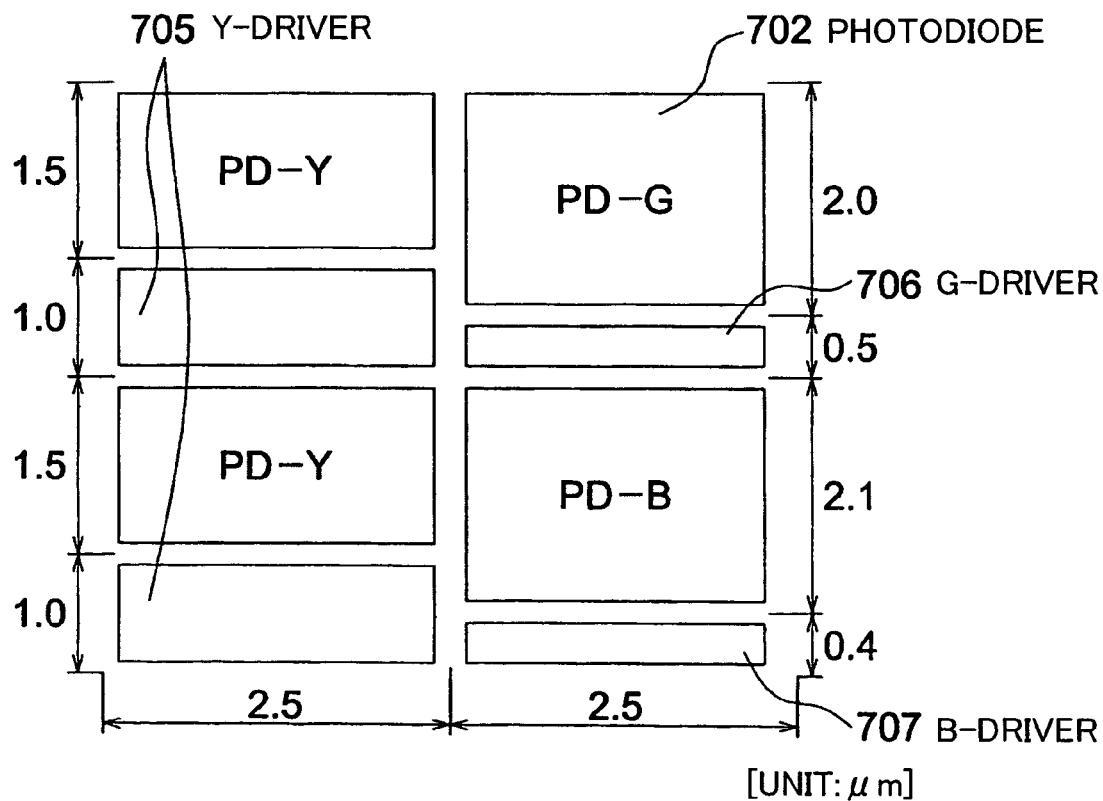

In this section, a CMOS solid-state image sensor as another example of the image sensor in the third embodiment is described referring to FIGS. 48A and 48B. FIG. 48A is a diagram showing a filter arrangement of the CMOS solid-state image sensor 70 in the embodiment 3-2. FIG. 48B is a diagram schematically showing a pixel structure of the CMOS solid-state image sensor 70, which is an enlarged view of an area enclosed by the broken line in FIG. 48A. Although the diagram of FIG. 48A shows pixels in eight rows and in eight columns, an actual pixel arrangement of the image sensor is the one, wherein the pixel pattern shown in FIG. 48A is sequentially repeated in column and row directions.

As shown in FIG. 48A, the CMOS solid-state image sensor 70 (hereinafter, simply called as "CMOS sensor 70") includes a number of pixels 701 arranged in a two-dimensional matrix. Each of the pixels 701 is provided with a photodiode 702 corresponding to a photoelectric conversion section for photoelectrically converting light from an object to generate a signal charge. Transparent color filters capable of transmitting light of respective color components of R, G, and B are disposed in the order of R, G, B, and G on the photodiodes 702 provided in color pixels at odd columns, and luminance filters Y are disposed on the photodiodes 702 provided in white pixels at even columns. The array of the color filters R, G, and B, and the array of the luminance filters Y are alternately arranged at every other column. Examples of the luminance filters Y are ND filters, transparent filters, white color filters, and gray filters. Also, an arrangement in which no filter is provided on the surfaces of the photodiodes 702 to allow light to be directly incident onto the photodiode surfaces is equivalent to an arrangement provided with transparent filters.

Now, the pixel structure of the CMOS sensor 70 having the above filter arrangement is described. As shown in FIG. 48B, a photodiode PD-R (not shown), a photodiode PD-G, and a photodiode PD-B on which the respective color filters R, G, and B are disposed, and photodiodes PD-Y on which the luminance filters Y are disposed, are provided on the respective pixels 701. A G-driver 706 for controllably reading out a signal charge generated in the photodiode PD-G, a B-driver 707 for controllably reading out a signal charge generated in the photodiode PD-B, and a Y-driver 705 for controllably reading out a signal charge generated in the photodiode PD-Y are provided each between the corresponding two adjacent rows of pixels. Although not shown, there are provided drivers R for controllably reading out signal charges generated in the respective photodiodes PD-R. With this arrangement, the R-drivers, the G-drivers 706, and the B-drivers 707 function as color pixel drivers, and the Y-drivers 705 functions as white pixel drivers of the image sensor in the embodiment.

Now, a construction of the photodiode 702 is described. In this embodiment, as shown in FIG. 48B, for instance, light receiving surfaces of the photodiodes PD-R, PD-G, and PD-B where the color filters R, G, and B with a lower light transmittance are disposed have sizes of 2.1 μm×2.5 μm for the photodiode PD-B and 2.0 μm×2.5 μm for the photodiode PD-G in vertical and horizontal directions, although the size of the light receiving surface of the photodiode PD-R (not shown) where the color filter R with a lower light transmittance is disposed is not shown. A light receiving surface of the photodiode PD-Y where the luminance filter Y with a higher light transmittance is disposed has a size of 1.5 μm×2.5 μm in vertical and horizontal directions. In this way, setting the size of the light receiving surface of the photodiode PD-Y of the white pixel having a higher sensitivity smaller than the size of the light receiving surface of the photodiode PD-R, PD-G, PD-B having a lower sensitivity enables to reduce a sensitivity difference between the white pixels and the color pixels, thereby generating an image signal where the luminance signal and the color signal are kept in a well balanced state.

In the following, structures of the R-driver (not shown), the G-driver 706, the B-driver 707, and the Y-driver 705 of the CMOS sensor 70 are described. In this embodiment, the sizes of the B-driver 707 for controllably reading out a signal charge generated in the photodiode PD-B, and the G-driver 706 for controllably reading out a signal charge generated in the photodiode PD-G are, as shown in FIG. 48B, e.g. 0.4 μm×2.5 μm, and 0.5 μm×2.5 μm, respectively, although the size of the R-driver (not shown) for controllably reading out a signal charge generated in the photodiode PD-R (not shown) is not shown. The size of the Y-driver 705 for controllably reading out a signal charge generated in the photodiode PD-Y is, as shown in FIG. 48B, e.g. 1.0 μm×2.5 μm. Thus, setting the size of the Y-driver 705 for controllably reading out a signal charge generated in the photodiode PD-Y of the white pixel having a higher sensitivity and a larger signal charge amount larger than the size of the drivers other than the Y-driver 705 enables to prevent so-called "whiteout", i.e. an overexposed appearance of an image, or a like drawback, without saturating the signal charges in the drivers.

An arrangement of a driver section of the CMOS sensor 70 is described referring to FIG. 13. In this embodiment, the sizes of transistors Tr1 through Tr4 constituting the Y-driver 705 for controllably reading out a signal charge generated in the photodiode PD-Y provided in the white pixel having a larger sensitivity and a larger signal charge amount are set larger than the sizes of transistors Tr1 through Tr4 constituting the R-driver (not shown), the B-driver 707, the G-driver 706 for controllably reading out a signal charge generated in the photodiode PD-R (not shown), the photodiode PD-B, the photodiode PD-G provided in the color pixel having a lower sensitivity. This enables to drive the image sensor without saturating the signal charges having a larger charge amount.

The image sensor in this embodiment has a feature that the size of the photoelectric conversion sections provided in the white pixels is set smaller than the size of the photoelectric conversion sections provided in the color pixels. In other words, reducing the size of the photoelectric conversion sections of the white pixels having a higher sensitivity suppresses a sensitivity difference between the white pixels and the color pixels, thereby generating an image signal where the luminance signal and the color signal are kept in a well balanced state.

Also, the size of the drivers for controllably reading out signal charges generated in the white pixels is set larger than the size of the drivers for controllably reading out signal charges generated in the color pixels. In other words, setting the size of the drivers for controllably reading out signal charges generated in the white pixels having a higher sensitivity and a larger signal charge amount larger than the size of the drivers for controllably reading out signal charges generated in the color pixels enables to prevent so-called "whiteout", i.e. an overexposed appearance of an image, or a like drawback, without saturating the signal charges in the drivers.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An imaging unit comprising:
   an image sensor including a number of pixels arranged in a matrix, the pixels having color pixels where color filters are disposed, and white pixels where the color filters are not disposed;
   a first sampling circuit and a second sampling circuit for sampling pixel signals generated in the image sensor;
   a main controller for controlling the image sensor and/or the first sampling circuit and the second sampling circuit to sample pixel signals generated in the white pixels or pixel signals generated in the color pixels sequentially in a time-series manner;
   a first signal path disposed between the image sensor and the first sampling circuit, and along which the pixel signals generated in the white pixels flow toward the first sampling circuit;
   a second signal path disposed between the image sensor and the second sampling circuit, and along which the pixel signals generated in the color pixels flow toward the second sampling circuit;
   a first amplifier disposed in correspondence to the first signal path, and for amplifying the pixel signals generated in the white pixels with a predetermined gain; and
   a second amplifier disposed in correspondence to the second signal path, and for amplifying the pixel signals generated in the color pixels with a gain different from the gain of the first amplifier,
   wherein the main controller controls the image sensor to output only the pixel signals generated in the white pixels along the first signal path, and to output only the pixel signals generated in the color pixels along the second signal path.

2. The imaging unit according to claim 1, wherein the image sensor includes a CCD sensor or a CMOS sensor.

3. An imaging unit, comprising:
   an image sensor including a plurality of color pixels and a plurality of white pixels, the color pixels having color filters disposed therewith, the image sensor configured to output only white pixel signals at a first output and to output pixel signals that include color pixel signals at a second output;
   a first sampling circuit configured to receive signals from the first output;
   a second sampling circuit configured to receive signals from the second output;
   a first amplifier for amplifying signals from the first output;
   a second amplifier for amplifying signals from the second output, and
   a controller for controlling the operation of the imaging unit.

* * * * *